US012731006B2

(12) United States Patent
Poupyrev et al.

(10) Patent No.: US 12,731,006 B2
(45) Date of Patent: Sep. 8, 2026

(54) UNIVERSAL TIME SERIES DATA ENCODING AND COMPRESSION

(71) Applicant: Archetype AI, Inc., San Diego, CA (US)

(72) Inventors: Ivan Poupyrev, Los Altos, CA (US); Brandon Barbello, San Jose, CA (US); Leonardo Giusti, San Francisco, CA (US); Jaime Lien, Mountain View, CA (US); Nicholas Edward Gillian, Palo Alto, CA (US)

(73) Assignee: Archetype AI, Inc., San Diego, CA (US)

( * ) Notice: Subject to any disclaimer, the term of this patent is extended or adjusted under 35 U.S.C. 154(b) by 47 days.

(21) Appl. No.: 18/815,626

(22) Filed: Aug. 26, 2024

(65) Prior Publication Data

US 2025/0068860 A1 Feb. 27, 2025

Related U.S. Application Data

(63) Continuation of application No. PCT/US2024/043741, filed on Aug. 23, 2024.

(Continued)

(51) Int. Cl.

*G06N 3/045* (2023.01)
*G06F 16/3329* (2025.01)

(Continued)

(52) U.S. Cl.

CPC ......... *G06N 3/045* (2023.01); *G06F 16/3329* (2019.01); *G06F 16/3344* (2019.01); *G06F 16/338* (2019.01); *G06F 40/40* (2020.01)

(58) Field of Classification Search

CPC .... G06F 16/338; G06F 16/3329; G06F 40/40; G06F 16/3344; G11B 27/34; G06V 10/803

See application file for complete search history.

(56) References Cited

U.S. PATENT DOCUMENTS

| | | | |
|---|---|---|---|
| 11,803,955 | B1 | 10/2023 | Pandya et al. |
| 2017/0229154 | A1 | 8/2017 | Bose et al. |

(Continued)

OTHER PUBLICATIONS

Archetype AI, Inc., PCT/US2024/043741, International Search Report and Written Opinion, Nov. 14, 2025, 15 pgs.

(Continued)

*Primary Examiner* — Md S Elahee

(74) *Attorney, Agent, or Firm* — Morgan, Lewis & Bockius LLP

(57) ABSTRACT

This application is directed to compressing sensor data. A computer system obtains the sensor data from a plurality of sensor devices disposed in a physical environment during a time duration, and each sensor device corresponds to a temporal sequence of respective sensor samples. For each of the plurality of sensor devices, the temporal sequence of respective sensor samples is processed to generate an ordered sequence of respective sensor data features defining a respective parametric representation of the temporal sequence of respective sensor samples, independently of a sensor type of the respective sensor device. The computer system detects one or more signature events within the time duration based on the respective parametric representations of the plurality of sensor devices, and generates one or more information items characterizing the one or more signature events detected in the sensor data.

20 Claims, 47 Drawing Sheets

Related U.S. Application Data

(60) Provisional application No. 63/578,460, filed on Aug. 24, 2023.

(51) Int. Cl.
*G06F 16/334* (2025.01)
*G06F 16/338* (2019.01)
*G06F 40/40* (2020.01)

(56) References Cited

U.S. PATENT DOCUMENTS

2020/0187071 A1 6/2020 Chen et al.
2020/0403818 A1 12/2020 Daredia et al.
2021/0150315 A1 5/2021 Dang et al.
2022/0004429 A1 1/2022 Bhamidipaty et al.
2022/0027712 A1 1/2022 Aimone
2022/0031105 A1 2/2022 Newcomb
2022/0067479 A1 3/2022 Lee et al.
2023/0259117 A1 8/2023 Gutierrez et al.
2024/0273882 A1* 8/2024 Duff ..................... G06V 10/803
2024/0303422 A1 9/2024 Fabian et al.
2024/0372830 A1 11/2024 Vörös et al.
2024/0428316 A1 12/2024 Chambers et al.
2025/0036695 A1 1/2025 De Barros et al.
2025/0068885 A1 2/2025 Poupyrev et al.
2025/0094454 A1 3/2025 Poupyrev et al.

OTHER PUBLICATIONS

Ivan Poupyrev et al., Non-Final Office Action, U.S. Appl. No. 18/815,639, Jan. 23, 2025, 44 pgs.
Ivan Poupyrev et al., Final Office Action, U.S. Appl. No. 18/815,639, May 13, 2025, 48 pgs.
Ivan Poupyrev et al., Non-Final Office Action, U.S. Appl. No. 18/815,639, Sep. 15, 2025, 51 pgs.
Archetype AI, Inc., PCT/US2024/043741, International Preliminary Report on Patentability, Feb. 14, 2026, 6 pgs.
Ivan Poupyrev et al., Final Office Action, U.S. Appl. No. 18/815,639, Mar 23, 2026, 59 pgs.
Ye Zhu et al., "Describing Unseen Videos via Multi-modal Cooperative Dialog Agents", Computer Vision—ECCV 2020. ECCV 2020. Lecture Notes in Computer Science, vol. 12368. Springer Nature Link, Nov. 3, 2020, pp. 153-169, 17 pgs. https://doi.org/10.1007/978-3-030-58592-1_10.

* cited by examiner

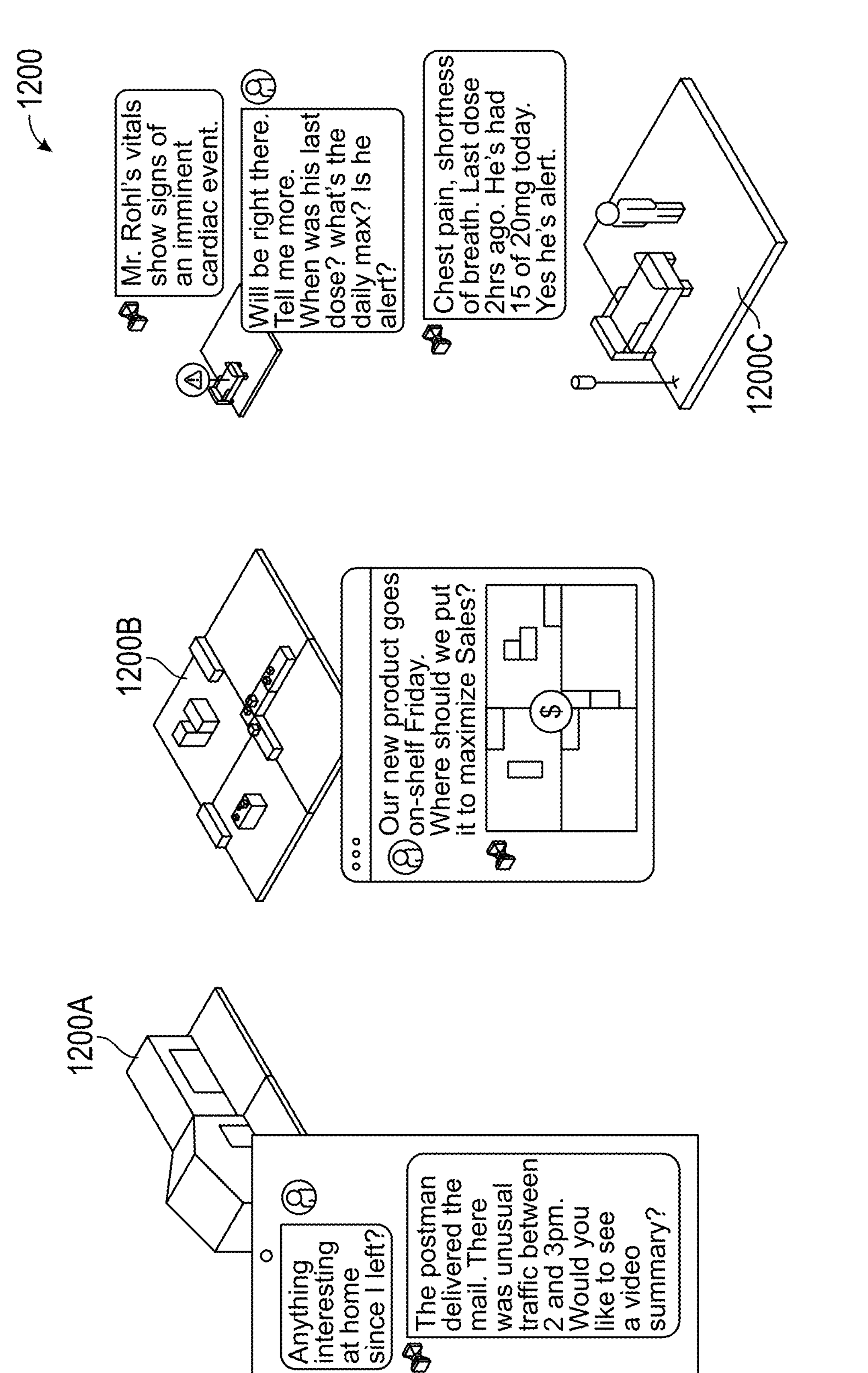
1200
Mr. Rohl's vitals show signs of an imminent cardiac event.
Will be right there. Tell me more. When was his last dose? what's the daily max? Is he alert?
Chest pain, shortness of breath. Last dose 2hrs ago. He's had 15 of 20mg today. Yes he's alert.
1200C
1200B
Our new product goes on-shelf Friday. Where should we put it to maximize Sales?
$
1200A
Anything interesting at home since I left?
The postman delivered the mail. There was unusual traffic between 2 and 3pm. Would you like to see a video summary?
FIG. 12

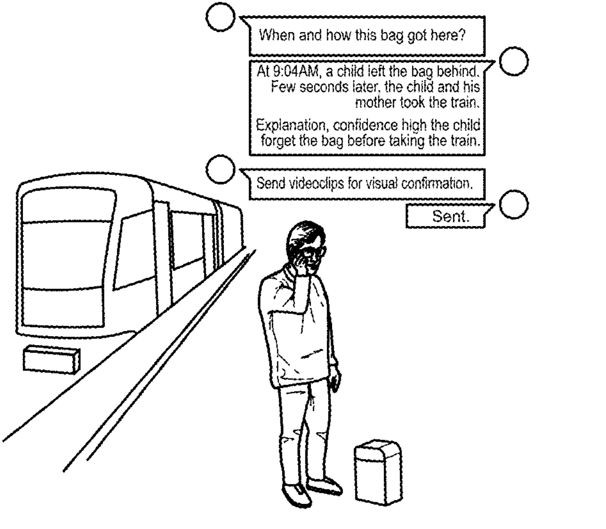

A security guard at the 42nd Street subway stop finds an unattended bag, and asks questions at the scene for quick resolution.

Explain people's behavior and anomalies 01.45 AM LINE R-BOUND TO BAY BRIDGE

Suicidal Behavior Detected [Med Confidence]

Male, estimated age 42, walking up and down the platform several times over the past 16 minutes. High-level stress detected, Match description of suicidal behaviors as described in previous MTA report and medical literature A person at the station is flagged for "suicidal behavior" -the prediction for a fatal incident is above the safety thershold. The operator dispatches a team to help the person.

Identify people's intent and anomalies

Predict human behavior

1600

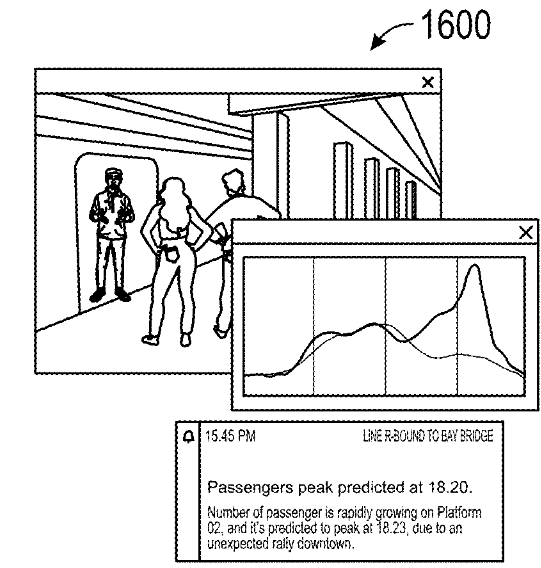

When predictions are explained with contextual information, security operators can make better decisions for how to deploy personnel.

Explain people's behavior and anomalies

Predict people's behavior

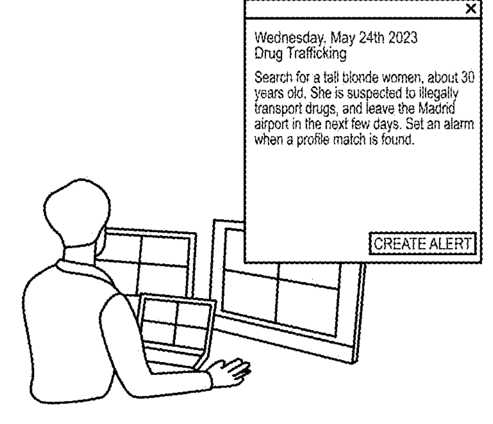

A security operator uses natural language to create an alert for the profile of a person of interest.

Program with natural language

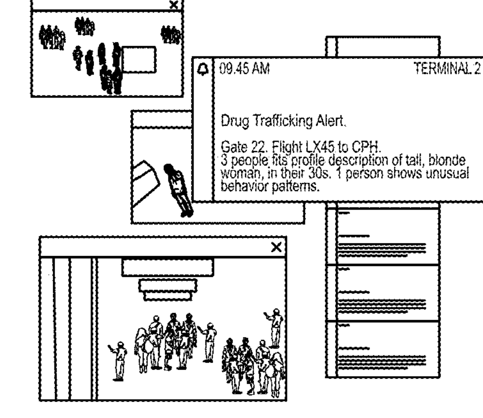

The security operator is able to monitor several locations at once, with an information feed summarizing events across thousands of sensors.

Search, summarize and classify

Predict human behavior

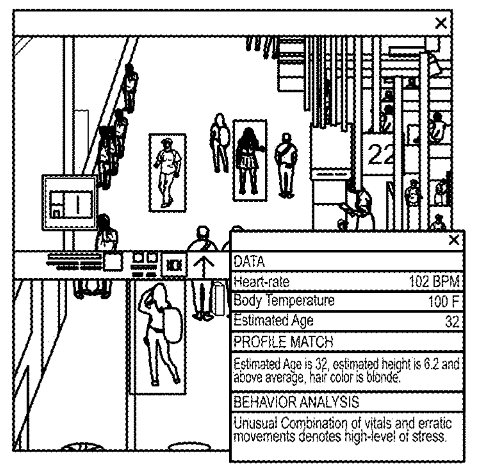

Alert: 3 people at Gate 22 match the profile. The operator asks follow up questions and discovers that 1 person's behavior is anomalous. They decide to dispatch screening personnel to the gate.

Understand people's intent and anomalies

FIG. 17

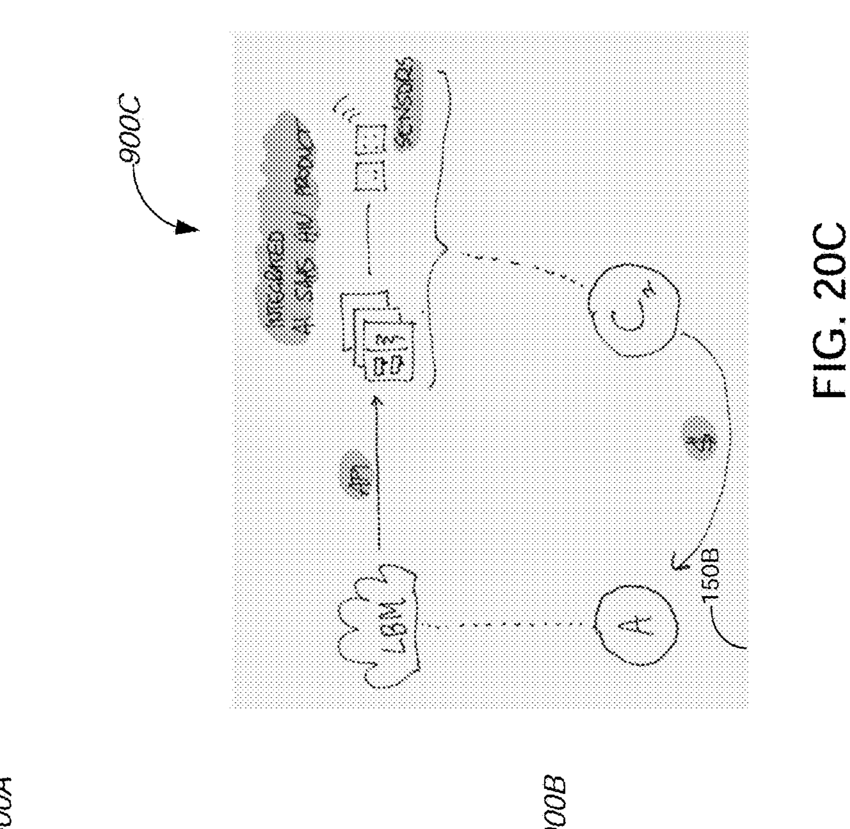
FIG. 20C
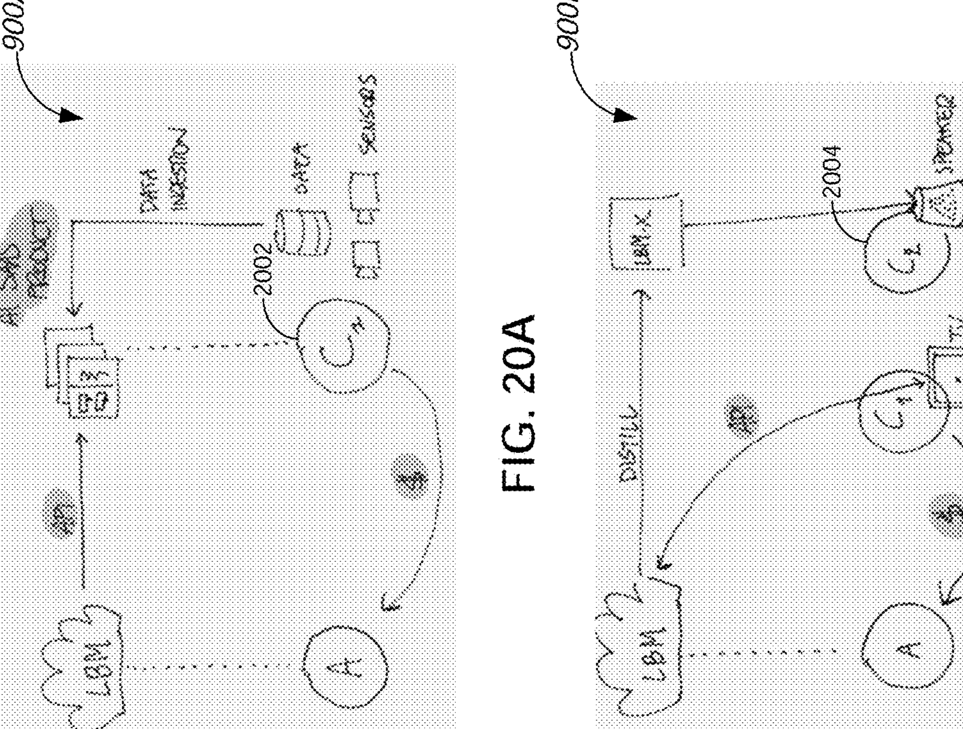
FIG. 20A
FIG. 20B

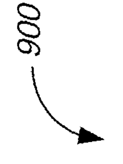
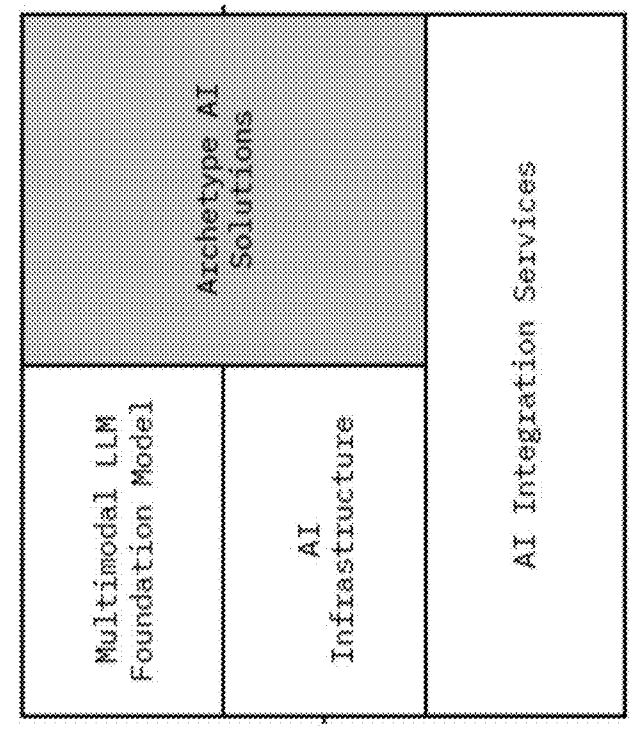
FIG. 21

The data from the accident includes dashcam videos, pictures of damage, text descriptions and other data. Fragmented and unstructured.

Solution built on Archetype AI for Summarizing the data, predicting the risk of future accidents, and generating claim reports.

The resultant claim report is generated and reviewed by the insurance agent

Figure 33:
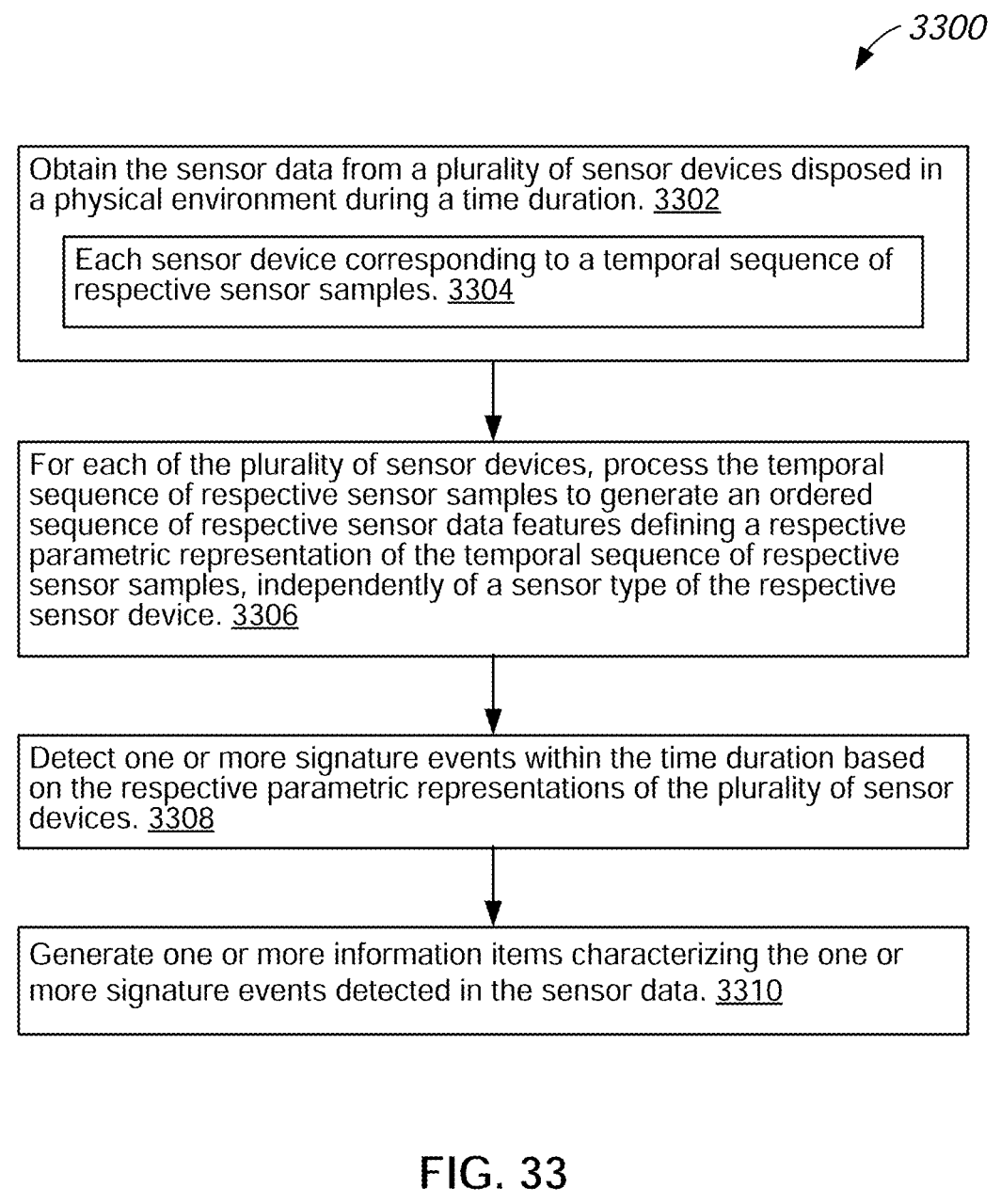

3300

Obtain the sensor data from a plurality of sensor devices disposed in a physical environment during a time duration. 3302

Each sensor device corresponding to a temporal sequence of respective sensor samples. 3304

For each of the plurality of sensor devices, process the temporal sequence of respective sensor samples to generate an ordered sequence of respective sensor data features defining a respective parametric representation of the temporal sequence of respective sensor samples, independently of a sensor type of the respective sensor device. 3306

Detect one or more signature events within the time duration based on the respective parametric representations of the plurality of sensor devices. 3308

Generate one or more information items characterizing the one or more signature events detected in the sensor data. 3310

Close Driving app

SuperB

Distance driven!

Me Close 56.18km
app_54342

Top 5 drivers 56.18km
app_54342

5.08km
app_54342

Map Camera Friends

3810

Playground

Camera feed: Global Center, 1500 Page Ave., Palo Alto, CA 95100 live data

214

Live Detections

Live Detections @ 15:28:43

People on cross Walk: 2 vehicles east left lane: 0

130 vehicles east right lane: 0 vehicles west: 0

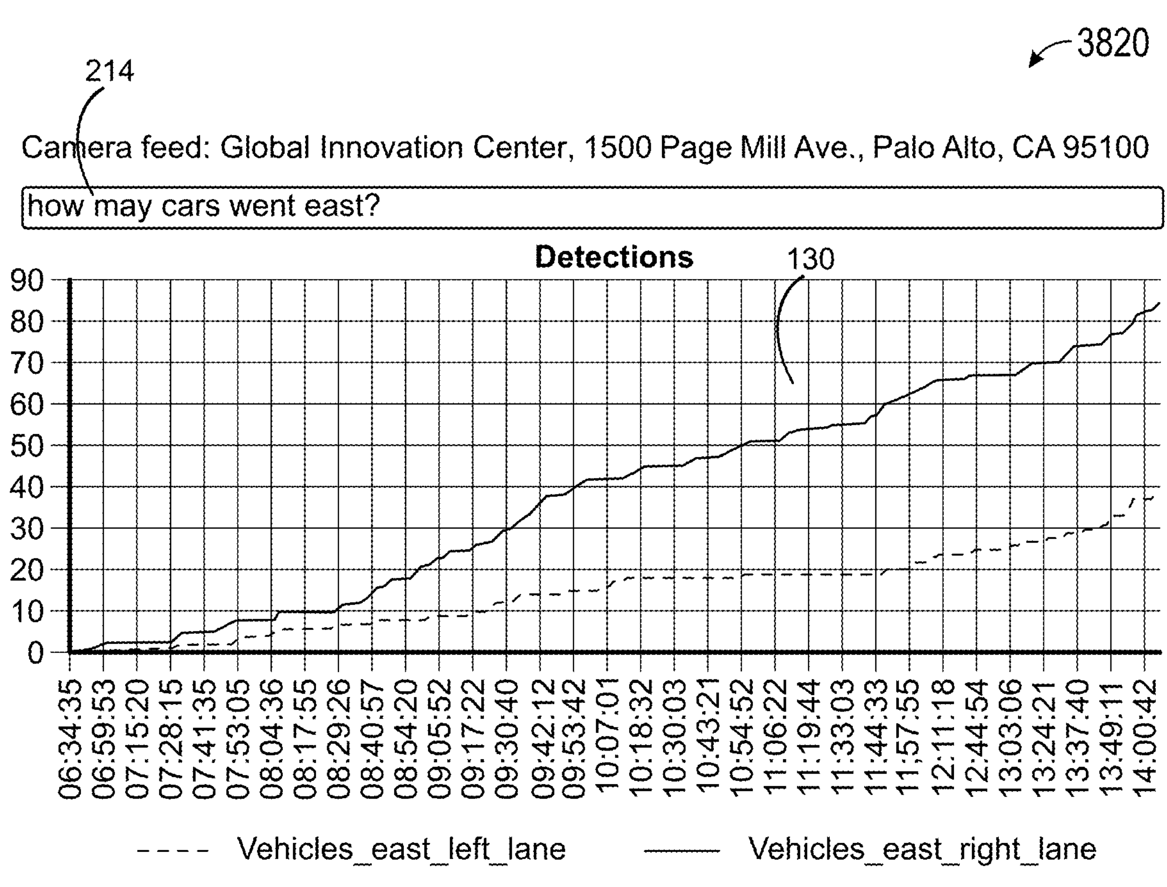
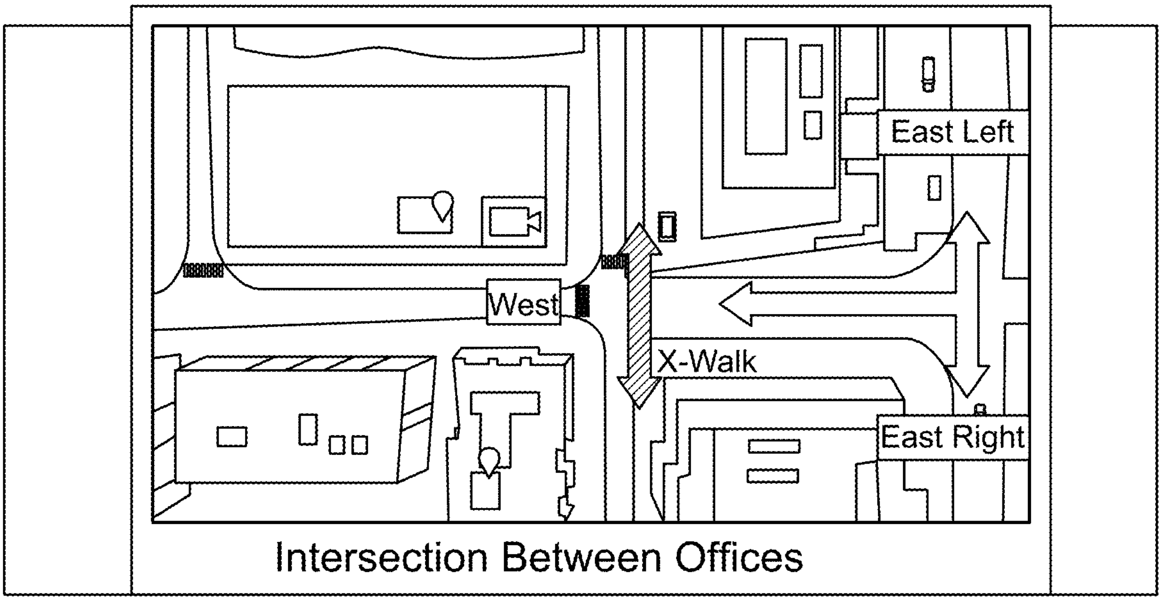
FIG. 38B

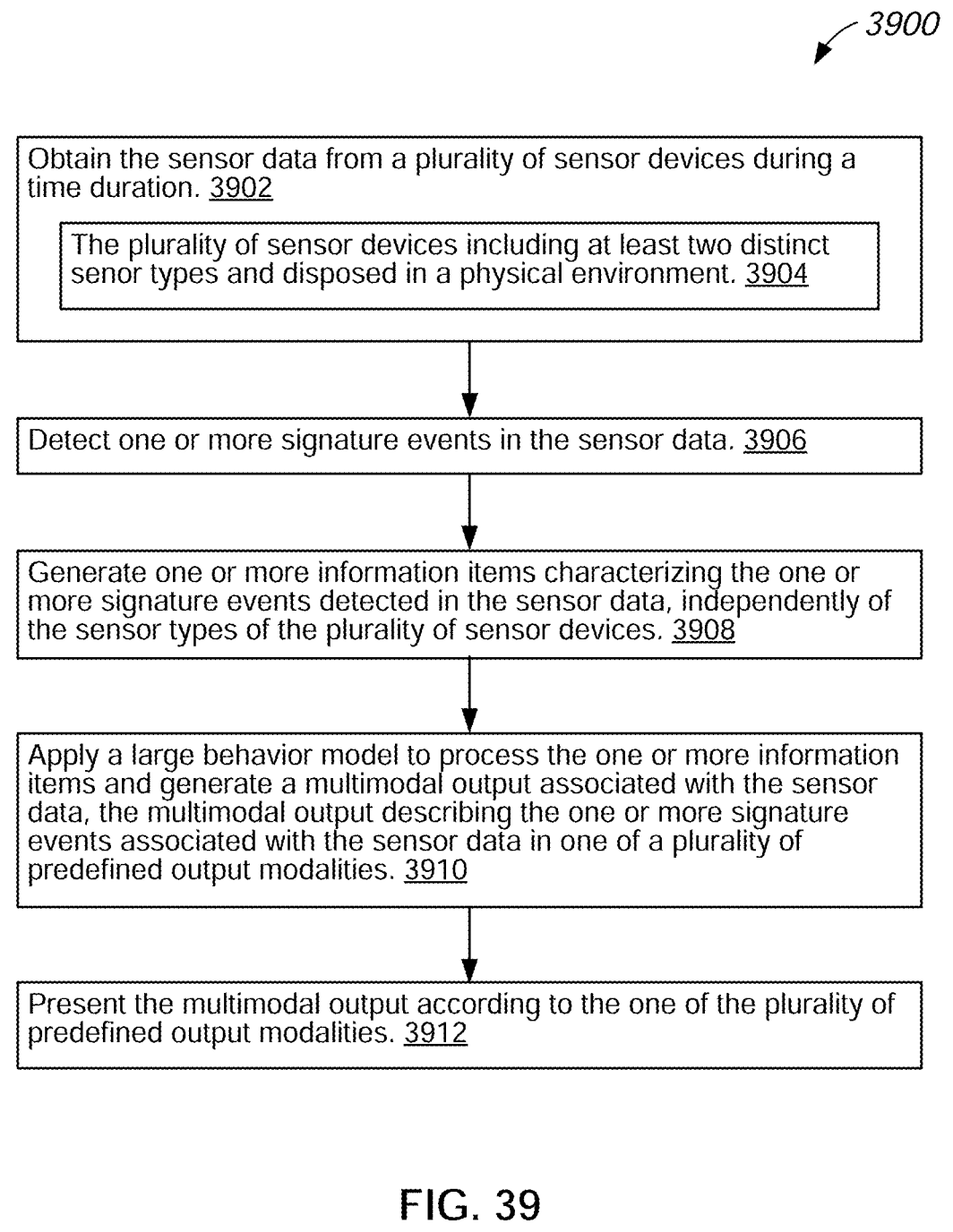

3900

Obtain the sensor data from a plurality of sensor devices during a time duration. 3902

The plurality of sensor devices including at least two distinct senor types and disposed in a physical environment. 3904

Detect one or more signature events in the sensor data. 3906

Generate one or more information items characterizing the one or more signature events detected in the sensor data, independently of the sensor types of the plurality of sensor devices. 3908

Apply a large behavior model to process the one or more information items and generate a multimodal output associated with the sensor data, the multimodal output describing the one or more signature events associated with the sensor data in one of a plurality of predefined output modalities. 3910

Present the multimodal output according to the one of the plurality of predefined output modalities. 3912

FIG. 39

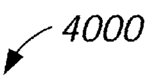
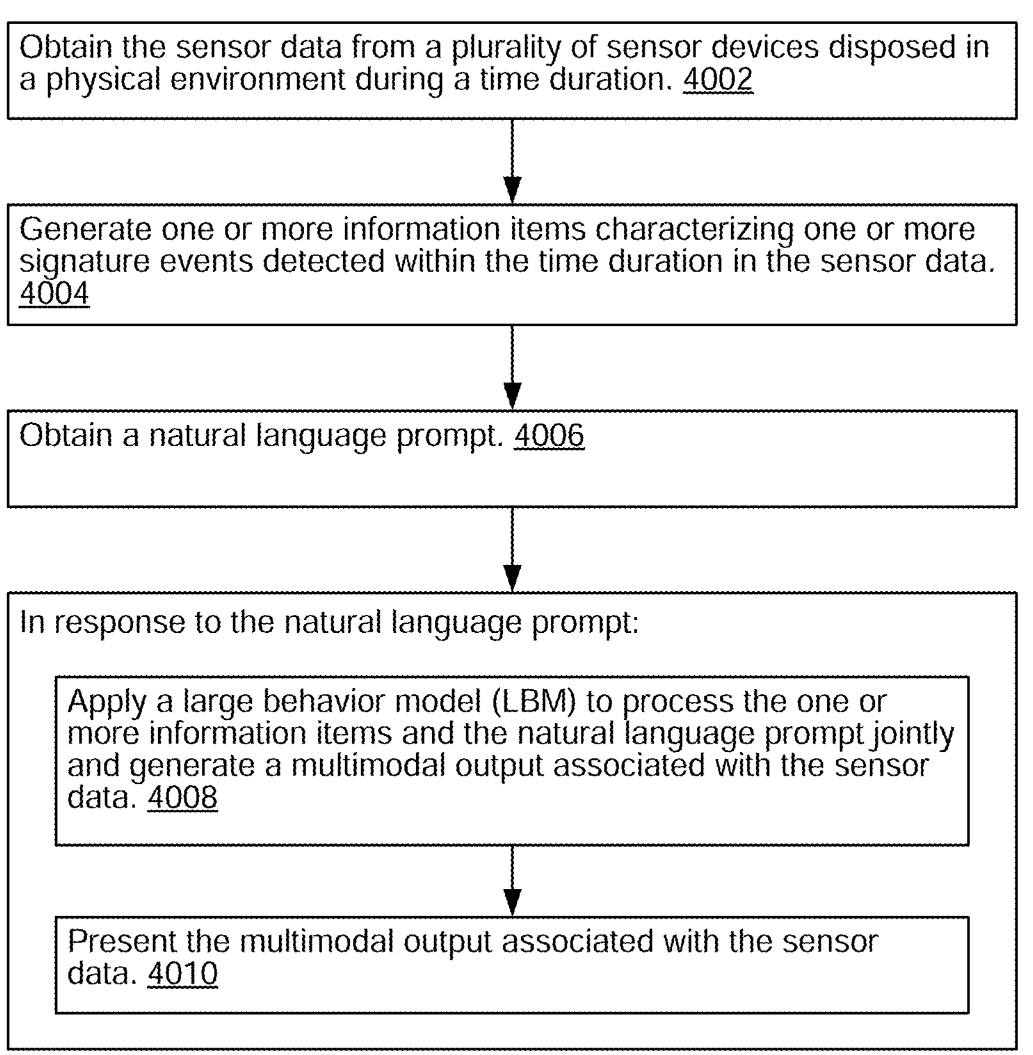
FIG. 40

UNIVERSAL TIME SERIES DATA ENCODING AND COMPRESSION

RELATED APPLICATION

This application is a continuation of International Patent Application No. PCT/US24/43741, entitled "Integrated Multimodal Neural Network Platform for Generating Content based on Scalable Sensor Data," filed Aug. 23, 2024, which claims benefit of U.S. Provisional Application No. 63/578,460, entitled "Integrated Multimodal Neural Network Platform for Generating Content based on Scalable Sensor Data," filed Aug. 24, 2023, each of which is incorporated by reference in its entirety. This application also claims benefit of U.S. Provisional Application No. 63/578,460.

This application is related to U.S. patent application Ser. No. 18/815,639, entitled "Integrated Multimodal Neural Network Platform for Generating Content based on Scalable Sensor Data," filed Aug. 26, 2024, and U.S. patent application Ser. No. 18/815,647, entitled "Interaction of Multimodal Behavior Models with Natural Language Prompts," filed Aug. 26, 2024, each of which is incorporated by reference in its entirety.

TECHNICAL FIELD

This application relates generally to data processing, including but not limited to establishing an integrated multimodal neural network platform to apply large behavior models to process multiple modalities of data (e.g., sensor data and content data) and generate multimodal outputs that are convenient for users and their client devices to percept.

SUMMARY

The present disclosure provides an integrated multimodal neural network platform to process sensor data and content data (e.g., textual, audio, image, video data) to generate a user-defined output (e.g., one or more of narrative messages, program codes, and a user interface). The integrated multimodal neural network platform includes a server system configured to collect the sensor data from one or more sensors, generate one or more information items characterizing the sensor data, and apply a neural network (e.g., a deep neural network, a large language model (LLM)) to process the one or more information items and generate a neural network (NN) output (e.g., an LLM output). The one or more sensors include one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor. In some implementations, the one or more sensors include a large number of sensors distributed at a venue or across different venues. The collected sensor data include one or more of: image data, video data, audio data, analog electrical signals, digital electrical signals, and digital data.

In this application, an LLM is used as an example of a deep neural network. In some implementations, the deep neural network includes a large transformer model.

In some implementations, the neural network, which is applied on the integrated multimodal neural network platform to process sensor data and content data and generate a user-defined output, is also called a large behavior model (LBM). The LBM is a general-purpose physical artificial intelligence (AI) foundation model configured to address physical use cases across various application verticals and sensor data types.

In one aspect of this application, a method is implemented at a computer system for compressing sensor data. The method includes obtaining the sensor data from a plurality of sensor devices disposed in a physical environment during a time duration, each sensor device corresponding to a temporal sequence of respective sensor samples; for each of the plurality of sensor devices, processing the temporal sequence of respective sensor samples to generate an ordered sequence of respective sensor data features defining a respective parametric representation of the temporal sequence of respective sensor samples, independently of a sensor type of the respective sensor device; detecting one or more signature events within the time duration based on the respective parametric representations of the plurality of sensor devices; and generating one or more information items characterizing the one or more signature events detected in the sensor data.

In another aspect of this application, a method is implemented at a computer system for presenting sensor data. The method includes obtaining the sensor data from a plurality of sensor devices during a time duration, the plurality of sensor devices including at least two distinct senor types and disposed in a physical environment; detecting one or more signature events in the sensor data; generating one or more information items characterizing the one or more signature events detected in the sensor data, independently of the sensor types of the plurality of sensor devices; applying a large behavior model to process the one or more information items and generate a multimodal output associated with the sensor data, the multimodal output describing the one or more signature events associated with the sensor data in one of a plurality of predefined output modalities; and presenting the multimodal output according to the one of the plurality of predefined output modalities.

In yet another aspect of this application, a method is implemented at a computer system for presenting sensor data. The method includes obtaining the sensor data from a plurality of sensor devices disposed in a physical environment during a time duration; generating one or more information items characterizing one or more signature events detected within the time duration in the sensor data; and obtaining a natural language prompt. The method further includes, in response to the natural language prompt, applying a large behavior model (LBM) to process the one or more information items and the natural language prompt jointly and generate a multimodal output associated with the sensor data. The method further includes presenting the multimodal output associated with the sensor data.

In some implementations, the LBM receives a user prompt that is optionally a voice message, a textual query, and an image or a video clip including a gesture. In some implementations, the LBM receives additional content data (e.g., textual, video, image, and audio). The LBM processes different types of data including the sensor data to generate the user-defined output. In some implementations, the output includes a narrative message, e.g., describing feature events in the sensor data. Alternatively, in some implementations, the output includes software code corresponding to one or more instructions for controlling additional electronic devices. In some implementations, the output includes a graphical user interface (GUI) to be displayed on a screen of a client device, and the GUI is applied to visualize the sensor data and/or interact with a user. By these means, the LBM is applied to process sensor data to output user-friendly information that can be directly used by a user.

In some implementations, the integrated multimodal neural network platform offers a comprehensive solution to convert the sensor data to user-friendly information. The LBM is retrained to process the sensor data that is optionally preprocessed with or without alternative inputs (e.g., different types of user prompt or content data) and generate the user-defined output. Conversely, in some implementations, the LBM is provided by a third-party model supplier. For example, the third-party LBM is an open source neural network model (e.g., an LLM) requiring inputs as a predefined format (e.g., a user prompt entered via a key board). The integrated multimodal neural network platform is focused on sensor data collection and preprocessing and has no or limited control over the third-party LBM. The sensor data is optionally preprocessed to generate data having the predefined format (e.g., one or more descriptive tags), which is required for an input in the third-party LBM. The sensor data or the preprocessed data having the predefined format are provided to a remote LBM server of the third-party model supplier to generate the output, which is returned to the integrated multimodal neural network platform for further processing locally at the integrated multimodal neural network platform.

In accordance with one aspect of the application, a method for controlling user experience (UX) operation is implemented at an electronic device having one or more processors and memory. In another aspect, an electronic device is configured to perform any of the methods described herein. In another aspect, a non-transitory computer-readable storage medium stores one or more programs. The one or more programs comprise instructions, which when executed by an electronic device, cause the computer system to perform any of the methods described herein.

In some implementations, machine learning techniques are performed on device and/or in the cloud. In some implementations, digital signal processing (DSP) techniques are performed on a client device 104 and/or a server system 106 (i.e., in the cloud). In an example, the DSP techniques are executed on the client device 104 to provide results promptly.

In some implementations, on-device processing of sensor inputs is employed where feasible to reduce the transmission of information collected from home and work environments to the cloud, which benefits user privacy.

In various implementations of this application, the LBM is updated with multimodal learning. Input data of different types (e.g., sensor data, textual prompt) are fed into the LBM to provide an output. The output has a type selected from a plurality of data types (e.g., a user interface, software code, narrative message), and is optionally different from the input data.

Some implementations of this application are directed to a computer system including one or more processors and memory having instructions stored thereon, which when executed by the one or more processors cause the processors to perform any of the above methods.

Some implementations of this application are directed to a non-transitory computer-readable storage medium, having instructions stored thereon, which when executed by one or more processors cause the one or more processors to perform any of the above methods.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 12 illustrates three use cases in which sensors are disposed in a venue (e.g., a house, a grocery store, and a hospital room), in accordance with some implementations.

FIG. 16 illustrates a user case associated with a day at a subway station, in accordance with some implementations.

FIG. 17 illustrates a user case of checking drug trafficking at an airport, in accordance with some implementations.

FIGS. 20A-20C are block diagrams of example multimodal neural network platform for a data-focused customer, a sensor manufacturer, and an integrated sensor customer, in accordance with some implementations.

FIG. 21 is a block diagram of a multimodal neural network platform 900 implemented as an AI-as-a-Service, in accordance with some implementations.

FIG. 33 is a flow diagram of an example method for compressing sensor data, in accordance with some implementations.

FIGS. 38A and 38B are two example user interfaces for analyzing traffic conditions or traffic patterns of regions of interest, in accordance with some implementations.

FIG. 39 is a flow diagram of an example method for presenting sensor data with one of a plurality of predefined output modalities, in accordance with some implementations.

FIG. 40 is a flow diagram of an example method for presenting sensor data in response to a natural language prompt, in accordance with some implementations.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Reference herein to the term "LBM" in the description and figures shall be generally interpreted as being interchangeable with the term "LLM" or the term "neural network" for the purposes of explaining the inventions in this application. For example, the LLM in FIGS. 1 and 6 refers to the LBM or a neural network in an interchangeable manner.

Figure 1:
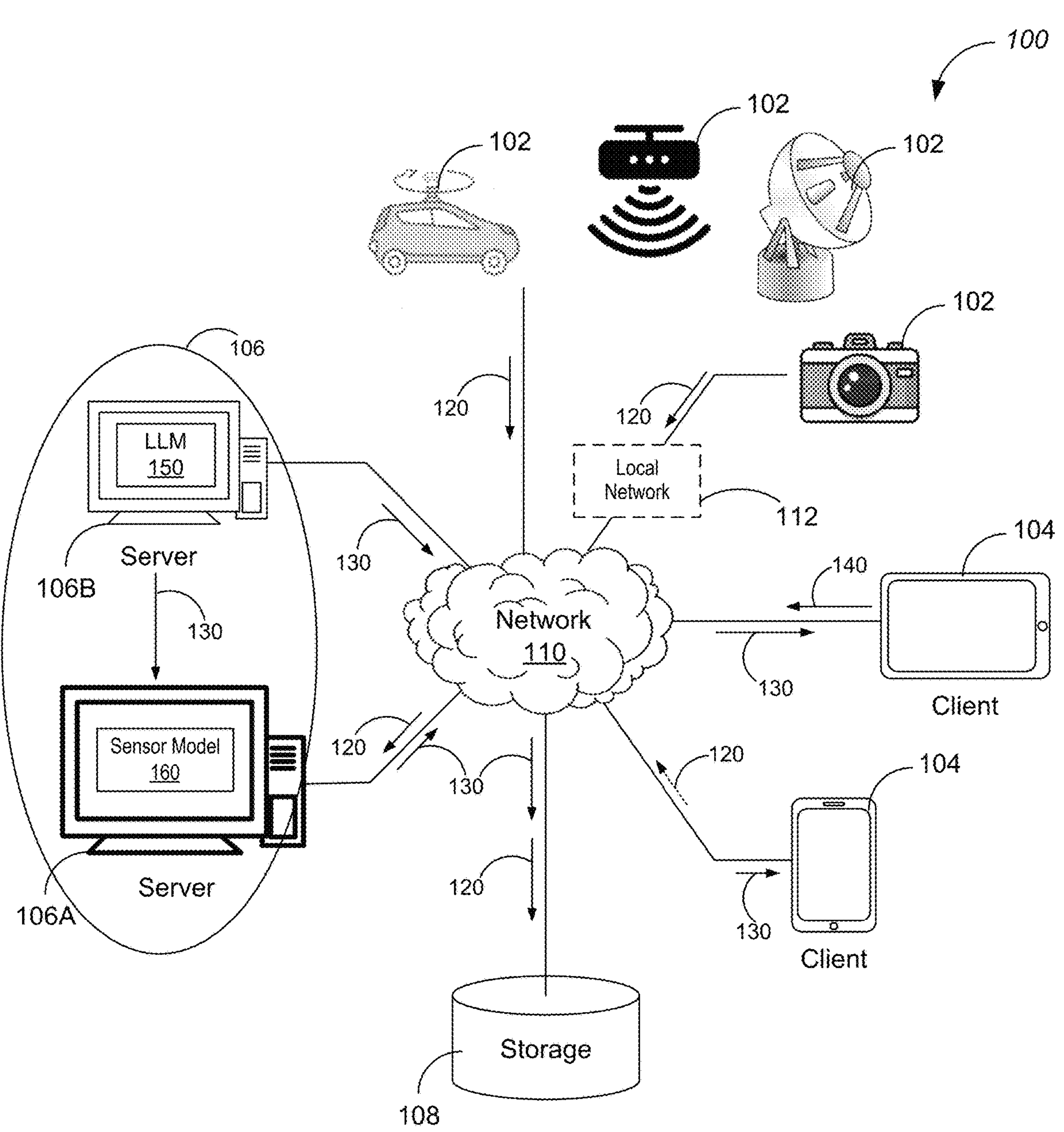
FIG. 1 is an example network environment in which a plurality of sensors interact with one or more client devices and a s server system, in accordance with some implementations.

FIG. 1 is an example network environment 100 in which a plurality of sensors 102 interact with one or more client devices 104 and a s server system 106, in accordance with some implementations. The server system 106 hosts an integrated multimodal neural network platform and acts as a hub to connect a plurality of sensors 102 with the one or more client devices 104. The server system 106 is configured to collect sensor data 120 from the plurality of sensors 102, implement an LLM 150 that processes the sensor data 120, and generate a user-friendly output 130 (e.g., text, video, audio, program, user interface) based on the sensor data 120. In some implementations, the server system 106 pre-processes the collected sensor data 120, e.g., using a sensor data processing model 160, before the sensor data 120 is processed by the LLM 150. In some implementations, the server system 106 is configured to execute a user application via which the sensor data 120 is processed by the LLM to generate the output 130 associated with the sensor data 120 on a server side. The one or more client devices 104 may be, for example, desktop computers 104A, tablet computers 104B, or mobile phones 104C, and are used to interact with the server system 106 to provide instructions and settings regarding collection of the sensor data 120 and to receive the output 130 associated with the sensor data 120. Each client device 104 collects user inputs 140, executes the user application on a client side, and present the output 130 associated with the sensor data 120 on its user interface. In some implementations, a client device 104 is applied to collect a subset of the sensor data 120. The sensor data 120 or user inputs 140 collected by the client device 104 can be pre-processed locally at the client device 104, before being provided to the server system 106. Additionally, in some implementations, the server system 106 provides system data (e.g., boot files, operating system images, and user applications) to the client devices 104, and process the data and user inputs 140 received from the client device(s) 104 when the user application is executed on the client devices 104. In some implementations, the network environment 100 further includes a storage 108 for storing data related to the sensors 102, client devices 104, server system 106, and applications executed on the server system 106 and client devices 104.

The server system 106 is remote from the sensors 102 and client devices 104, and enables real-time data communication with the sensors 102 and client devices 104. The server system 106 implements data processing tasks that cannot be or are preferably not completed locally by the sensors 102 or client devices 104. Specifically, the server system 106 applies an LLM 150 to process the sensor data 120 collected from the sensors and generate the user-defined output 130 associated with the sensor data 120. The LLM 150 is trained and executed on the server system 106. For example, the largest GPT-3 model uses 175 billion parameters, 96 self-attention layers, 2048 tokens window size of a mask, and 96 heads of self-attention per multi-head self-attention layer. In some implementations, the server system 106 offers a comprehensive solution to convert the sensor data 120 to the user-defined output 130. The LLM 150 is hosted and retrained by the server system 106 to process the sensor data 120 that is optionally preprocessed, with or without alternative inputs (e.g., different types of user prompt or content data). Conversely, in some implementations, the LLM 150 is provided by a third-party model supplier. For example, the third-party LLM 150 is an open source neural network model requiring inputs as a predefined format. The server system 106 includes a sensor server 106A and an LLM server 106B, which is controlled by the third-party model supplier. The sensor server 106A is focused on sensor data 120 collection and preprocessing and has no or limited control over the third-party LLM 150. The sensor data 120 is optionally preprocessed to generate data having the predefined format (e.g., one or more descriptive tags) required for an input in the third-party LLM 150. The sensor data 120 or the preprocessed data having the predefined format are provided to the LLM server 106B to generate the output 130, which is returned to the sensor server 106A for further processing or presentation to the client devices 104.

The sensors 102, one or more client devices 104, server system 106, and storage 108 are communicatively coupled to each other via one or more communication networks 110, which are the medium used to provide communications links between these devices and computers connected together within the network environment 100. The one or more communication networks 110 may include connections, such as wire, wireless communication links, or fiber optic cables. Examples of the one or more communication networks 110 include local area networks (LAN), wide area networks (WAN) such as the Internet, or a combination thereof. The one or more communication networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol. A connection to the one or more communication networks 110 may be established either directly (e.g., using 3G/4G connectivity to a wireless carrier), or through a network interface 112 (e.g., a router, switch, gateway, hub, or an intelligent, dedicated whole-home control node), or through any combination thereof. As such, the one or more communication networks 110 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages.

In some implementations, the sensors 102 include one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor. In some implementations associated with a smart home environment, the sensors 102 include one or more of: personal client devices 104 (e.g., tablets, laptops or mobile phones), display devices, media casting or streaming devices, thermostats, home protection devices (e.g., smoke, fire and carbon dioxide detector), home security devices (e.g., motion detectors, window and door sensors and alarms) including connected doorbell or cameras, connected locksets, alarm systems and cameras, connected wall switches transponders, connected home appliances, WiFi communication devices (e.g., hubs, routers, extenders), connected home cleaning devices (e.g., vacuum or floor cleaner), smart home communication and control hubs, voice assistant devices, and display assistant devices. Further, examples of the multi-sensing, network-connected appliances (hereinafter referred to as "smart appliances") include, but are not limited to, refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The sensors 102 in the network environment 100 may additionally or alternatively include one or more other occupancy sensors (e.g., touch screens, IR sensors, ambient light sensors and motion detectors). In some implementations, the sensors in the network environment 100 include radio-frequency identification (RFID) readers (e.g., in each room or a portion thereof) that determine occupancy based on RFID tags located on or embedded in occupants. For example, RFID readers may be integrated into the smart hazard detectors.

In some implementations, in addition to containing sensing capabilities, the sensors 102 are capable of data communications and information sharing with other sensors 102, the server or cloud-computing system, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Figure 2:
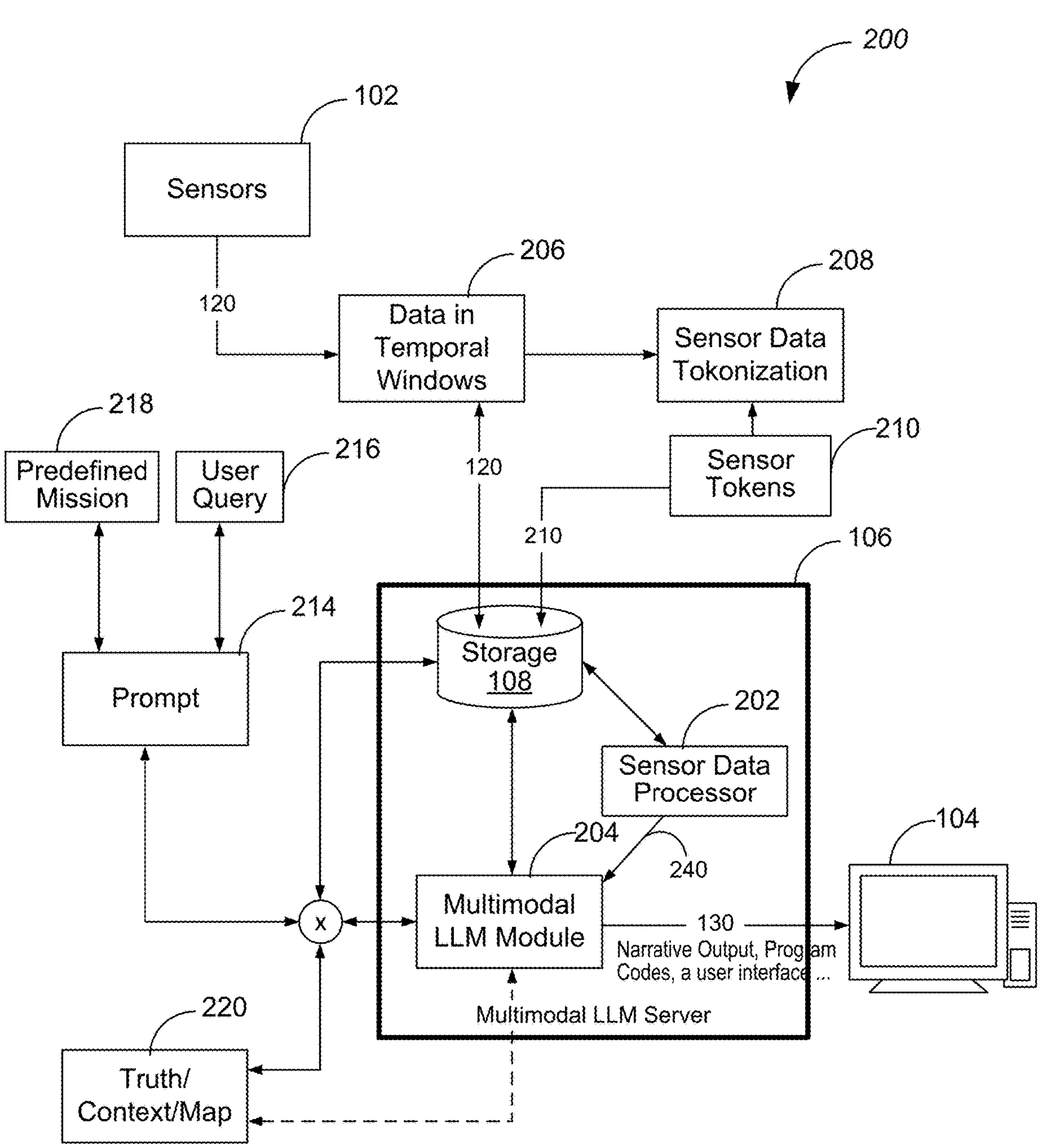
FIG. 2 illustrates an architecture of an integrated multimodal neural network platform hosted by a server system, in accordance with some implementations.

FIG. 2 illustrates an architecture of an integrated multimodal neural network platform 200 hosted by a server system 106, in accordance with some implementations. The server system 106 acts as a hub to connect a plurality of sensors 102 with one or more client devices 104 and includes a sensor data processor 202 and a multimodal NN module 204. In some implementations, the server system 106 includes a storage 108 for storing data processing models (e.g., a sensor data processing model 160, an LLM 150), sensor data 120, and LLM output 130. In some implementations, the sensor data processing model 160 includes a neural network compression model for reducing a size of sensor data. The server system 106 obtains a stream of sensor data 120 measured continuously by one or more sensors 102. The stream of sensor data includes a temporal sequence of sensor data grouped (206) based on a temporal window configured to move with a time axis. Each sensor data item of the temporal sequence of sensor data is associated with a timestamp. In some implementations, a subset of sensor data 120 in each temporal window is processed (208) to generate a sensor token 210. The raw sensor data 120 and sensor tokens 210 are stored in the storage 108. In some implementations, the sensor data processor 202 further processes the sensor data 120 and/or sensor tokens 210 to generate pre-processed data 212, e.g., to detect one or more signature events. For example, the pre-processed data 212 includes descriptive information associated with the one or more signature events, and the descriptive information is optionally stored in association with respective timestamps in the storage 108.

The NN module 204 obtains one or more information items 240 (e.g., the sensor data 120, sensor tokens 210, pre-processed data 212), and generates an LLM output 130. In some implementations, the NN module 204 further obtains a prompt 214 that includes a user query 216 made of a plurality of natural language words. In response to the user query 216, the NN module 204 applies an LLM 150 to process the sensor data 120, sensor tokens 210, or pre-processed data 212 to generate the LLM output 130 on demand. Alternatively, in some implementations, the NN module 204 further receives a prompt 214 that includes a mission 218, and the mission 218 is defined in advance before the sensor data 120 is collected. In accordance with the predefined mission 218, the NN module 204 applies an LLM 150 to process the sensor data 120, sensor tokens 210, or pre-processed data 212 continuously and generate the LLM output 130 on the fly. In some implementations, the LLM output 130 includes one or more of: an narrative output, software code, an instruction, and a user interface. Specifically, in different example scenarios, the narrative output of the LLM output 130 includes one or more of: narrative description, timestamp, numeral information, statistic summary, warning message, and recommended action associated with the one or more signature events.

The server system 106 is coupled to one or more client devices 104. In some implementations, the server system 106 is configured to execute a user application on the integrated multimodal neural network platform 200 to manage the plurality of sensors 102 and collected sensor data 120. The server system 106 supports a plurality of user accounts on the platform 200. A client device 104 is installed with the user application, and logs onto a corresponding user account on the user application to manage the sensors 102 and/or receive the LLM output 130 generated based on the sensor data 120. Under different circumstances, the client device 104 optionally displays the narrative output on a screen, broadcasts the narrative output via a speaker, implements the software code, executes the instruction, or display the user interface.

In some implementations, the server system 106 trains the LLM 150 using a plurality of training inputs 220. For example, each training input 220 includes a training query, a set of test sensor data, and respective ground truth. The ground truth includes a sample narrative output preferred for the training query and the test sensor data. Based on a predefined loss function, the LLM 150 is trained in a supervised manner using the plurality of training inputs and associated ground truths. In another example associated with unsupervised training, each training input 220 includes only a set of test sensor data without the training query or ground truth. During training, the LLM 150 is applied to generate an output 130 and adjusted to optimize the output 130, e.g., until a quality score of the output 130 is maximized or exceeds a threshold score.

Figure 3:
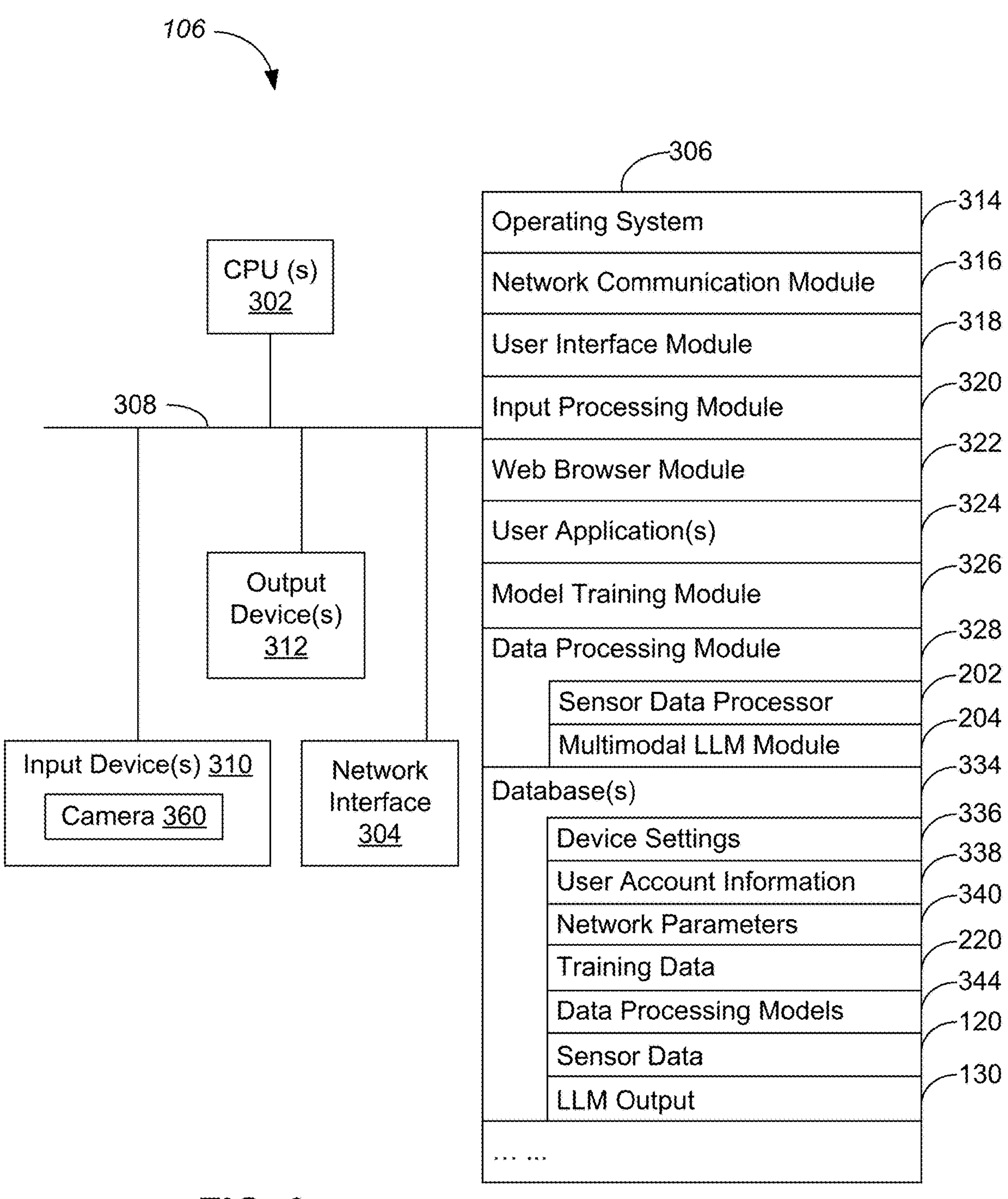
FIG. 3 is a block diagram illustrating an example server system in accordance with some implementations.

FIG. 3 is a block diagram illustrating an example server system 106 in accordance with some implementations. The server system 164 includes one or more processor(s) (e.g., CPUs) 302, one or more network interfaces 304 (e.g., including an I/O interface to one or more client devices 104), memory 306, and one or more communication buses 308 for interconnecting these components (sometimes called a chipset). In some implementations, the server system 106 includes one or more input devices 310 that facilitate user input, such as a keyboard, a mouse, a microphone, a touch screen display, a touch-sensitive input pad, a camera 360, or other input buttons or controls. In some implementations, the server system 106 includes one or more output devices 312 that enable presentation of user interfaces and display content, including one or more speakers and/or one or more visual displays.

The memory 306 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processor(s) 302. The memory 306, or alternatively the non-volatile memory within memory 306, includes a non-transitory computer-readable storage medium. In some implementations, the memory 306, or the non-transitory computer-readable storage medium of the memory 306, stores the following programs, modules, and data structures, or a subset or superset thereof:

- an operating system 314 including procedures for handling various basic system services and for performing hardware dependent tasks;
- a network communication module 316 for connecting the server system 106 to other systems and devices (e.g., client devices 104) via one or more network interfaces 304 (wired or wireless);
- User interface module 318 for enabling presentation of information (e.g., a graphical user interface for application(s) 324, widgets, websites and web pages thereof, and/or games, audio and/or video content, text, etc.) at each client device 104 via one or more output devices 312 (e.g., displays, speakers, etc.);
- Input processing module 320 for detecting one or more user inputs 140 or interactions from one of the one or more input devices 310 and interpreting the detected input or interaction;
- Web browser module 322 for navigating, requesting (e.g., via HTTP), and displaying websites and web pages thereof, including a web interface for logging into a user account associated with a client device 104 or another electronic device, controlling the client or electronic device if associated with the user account, and editing and reviewing settings and data that are associated with the user account;
- One or more user applications 324 for execution by the server system 106 (e.g., games, social network applications, smart home applications, and/or other web or non-web based applications for controlling another electronic device and reviewing data captured by such devices);

- Model training module 326 for applying training data 342 to train data processing models 344 (e.g., a sensor data processing model 160, an LLM 150);
- Data processing module 328 for pre-processing sensor data 120 and applying an LLM 150 to process the sensor data 120 that is optionally pre-processed, wherein in some implementations, the data processing module 328 further includes at least one of a sensor data processor 202 for pre-processing sensor data 120 and a multimodal NN module 204 for processing the sensor data 120 using an LLM and generating an LLM output 130;
- One or more databases 334 for storing at least data including one or more of:
  - Device settings 336 including common device settings (e.g., service tier, device model, storage capacity, processing capabilities, communication capabilities, etc.) of the server system 106;
  - User account information 338 for the one or more user applications 324, e.g., user names, security questions, account history data, user preferences, and predefined account settings;
  - Network parameters 340 for the one or more communication networks 110, e.g., IP address, subnet mask, default gateway, DNS server and host name;
  - Training data 342 for training one or more data processing models 328;
  - Data processing model(s) 344 for processing sensor data with or without other types of data (e.g., video, image, audio, or textual data) using deep learning techniques, where in some implementations, the data processing models 344 include a sensor data processing model 160 and an LLM 150; and
  - Sensor data 120 collected from a plurality of sensors 102; and
  - LLM output 130 that is generated by the data processing module 328 based on the sensor data 120 and using at least an LLM 150.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 306, optionally, stores a subset of the modules and data structures identified above. Furthermore, the memory 306, optionally, stores additional modules and data structures not described above (e.g., an account management module for linking client devices, smart devices, and smart home environments).

Figure 4:
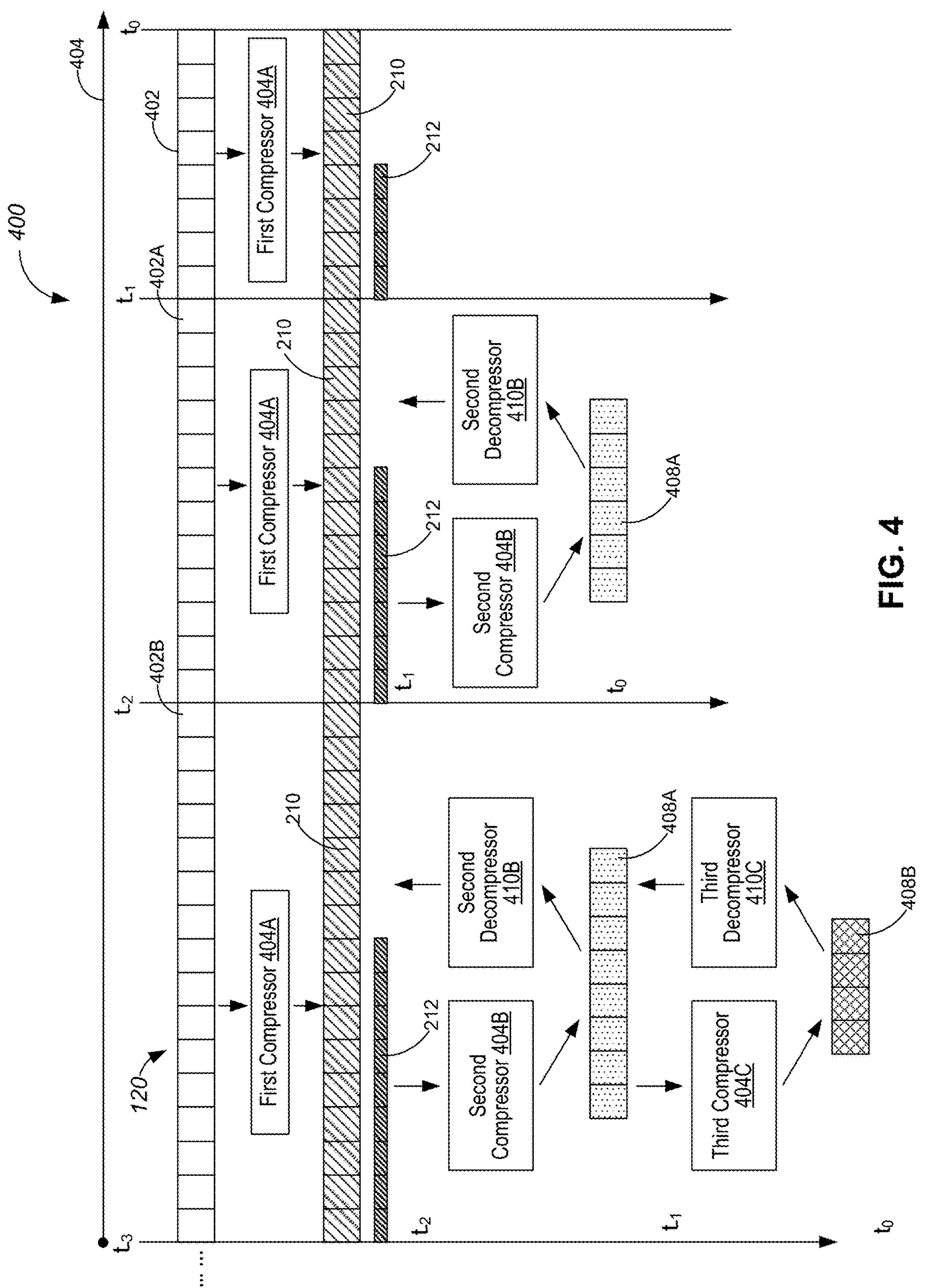
FIG. 4 is a diagram illustrating an example data compression scheme applied by a server system to compress sensor data recorded by one or more sensors, in accordance with some implementations.

FIG. 4 is a diagram illustrating an example data compression scheme applied by a server system 106 to compress sensor data 120 recorded by one or more sensors 102, in accordance with some implementations. The server system 106 obtains a stream of sensor data 120 measured continuously by one or more sensors 102. The stream of sensor data includes a temporal sequence of sensor data grouped based on a temporal window 402. Each temporal window 402 moves backward along a time axis 404, as a subset of corresponding sensor data 120 ages. Each sensor data item of the temporal sequence of sensor data 120 is associated with a timestamp. In some implementations, the subset of sensor data 120 in each temporal window 402 is processed by a first compressor 406A to generate a sensor token 210. The raw sensor data 120 and sensor tokens 210 are stored in the storage 108. In some implementations, the sensor data processor 202 further processes the sensor data 120 and/or sensor tokens 210 to generate pre-processed data 212, e.g., to detect one or more signature events. For example, the pre-processed data 212 includes descriptive information associated with the one or more signature events, and the descriptive information is optionally stored in association with respective timestamps in the storage 108. In some implementations, the pre-processed data 212 is stored with the sensor data 120 and the sensor tokens 210 in the storage 108 of the server system 106.

In some implementations, as the subset of sensor data 120 in a temporal window 402A ages and after at least a first time duration (e.g., t0–t−1, where t0 and t−1 are a current time and a time of capturing the sensor data 120), the subset of sensor data 120, corresponding sensor tokens 210, corresponding pre-processed data 212, or a subset thereof is compressed by a second compressor 406B to generate a first compressed sensor data 408A. Optionally, the first compressed sensor data 408A has a size smaller than that, and is stored in place, of the subset of sensor data 120, corresponding sensor tokens 210, corresponding pre-processed data 212, or the subset thereof. Further, in some implementations, the first compressed sensor data 408A is configured to be decompressed by a second decompressor 410B to recover the subset of sensor data 120, corresponding sensor tokens 210, corresponding pre-processed data 212, or a subset thereof.

In some implementations, as the subset of sensor data 120 in a temporal window 402B ages and after at least a second time duration (e.g., t0–t−2, where to and t−1 are a current time and a time of capturing the sensor data 120 in the temporal window 402B), the first compressed sensor data 408A is further compressed by a third compressor 406C to generate a second compressed sensor data 408B. Optionally, the second compressed sensor data 408B has a size smaller than that, and is stored in place, of the first compressed sensor data 408A from which the second compressed sensor data 408B is generated. Further, in some implementations, the second compressed sensor data 408B is configured to be decompressed by a third decompressor 410C to recover the corresponding first compressed sensor data 408A. In some implementations, as the subset of sensor data 120 in a temporal window 402B continues to age, the second compressed sensor data 408B is compressed successively by one or more compressors to generate additional compressed sensor data.

In some implementations, at the current time to, the storage 108 of the server system 106 stores (1) the subset of sensor data 120 captured during the first time duration (e.g., t0–t−1), corresponding sensor tokens 210, and/or corresponding pre-processed data 212; (2) the first compressed sensor data 408A corresponding to the subset of sensor data 120 captured during a time duration (e.g., t−1–t−2); (3) the second compressed sensor data 408B corresponding to the subset of sensor data 120 captured during a time duration (e.g., t−2–t−3); and (4) additional compressed sensor data corresponding to the subset of sensor data 120 captured before the time t−3. A memory storage density is measured by a size of the subset of sensor data 120 corresponding to a fixed memory unit. The memory storage density associated with the second compressed sensor data 408B is higher than that of the first compressed sensor data 408A, and the memory storage density associated with the first compressed sensor data 408A is higher than that of the subset of sensor data 120 captured during the first time duration (e.g., t0–t−1), corresponding sensor tokens 210, and/or corresponding pre-processed data 212. Further, in some implementations, the above data 120, 210, 212, 408A, and 408B is collectively referred to as one or more information items 240, which is provided to the multimodal NN module 204 of the server system 106 for further processing.

In some implementations, each of the second compressor 404B and the second decompressor 410B includes a respective a neural network compression model. Furth, in an example, the first compressed sensor data 408A includes a first feature vector, and the corresponding sensor data 120, sensor tokens 210, and/or pre-processed data 212 is compressed to the first feature vector that occupies a smaller storage memory space than the corresponding data 120, 210 and/or 212. In some implementations, each of the third compressor 404C and the third decompressor 410C includes a respective a neural network compression model. Further, in an example, the second compressed sensor data 408B includes a second feature vector, and the corresponding sensor data 120, sensor tokens 210, and/or pre-processed data 212 is compressed to the second feature vector that occupies a smaller storage memory space than the corresponding first compressed sensor data 408A, which occupies a smaller storage memory space than the corresponding data 120, 210 and/or 212.

Figure 5:
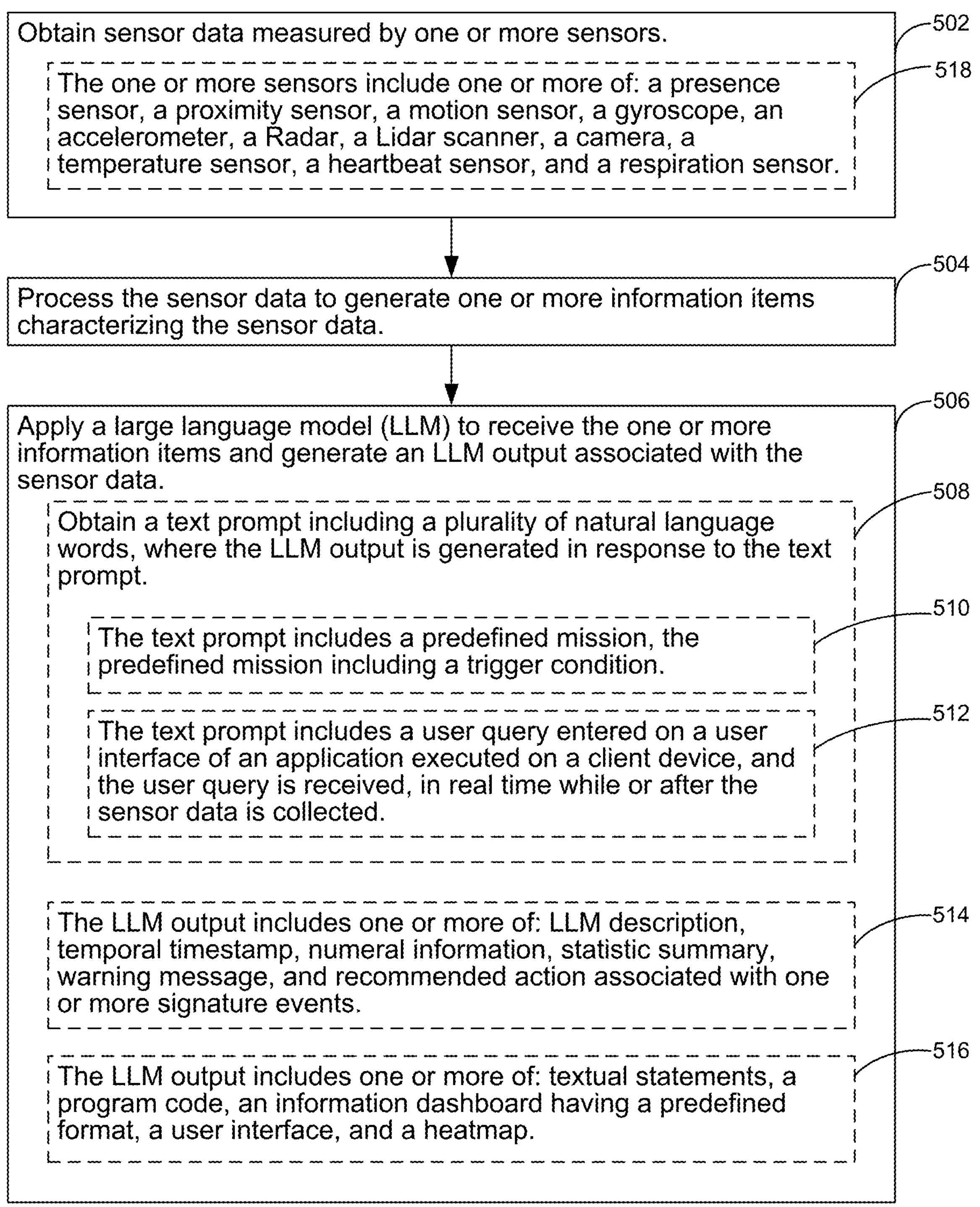
FIG. 5 is a flow chart of another representative method of controlling UX operations in accordance with some implementations.

FIG. 5 is a flow chart of another representative method 500 of controlling UX operations in accordance with some implementations. Method 500 is performed by a server system 106, and is, optionally, governed by instructions that are stored in a non-transitory computer readable storage medium and that are executed by one or more processors of the electronic device. Each of the operations shown in FIG. 5 may correspond to instructions stored in a computer memory or non-transitory computer readable storage medium (e.g., memory 306 of system 106 in FIG. 3). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 500 may be combined and/or the order of some operations may be changed.

The server system 106 (e.g., sensor data processor 202 in FIG. 2) obtains (502) sensor data 120 measured by one or more sensors 102 and processes (504) the sensor data 120 to generate one or more information items 240 characterizing the sensor data 120. In some implementations, the server system 106 applies a sensor data processing model 160 to process the sensor data 120. The server system 106 applies (506) a LLM 150 to receive the one or more information items 240 and generate an LLM output 130 associated with the sensor data 120. In some implementations, the LLM 150 is trained offline. In some implementations, the LLM 150 is coupled to the sensor data processing model 160 to process the sensor data 120 jointly.

In some implementations, the sensor data 120 is measured simultaneously from multiple different types of sensors 102. While the sensor data 120 is measured, the sensor data 120 is processed by the server system 106, dynamically and in real time, to generate the information items 240 and the LLM output 130. The sensor data 120 is optionally tokenized or pre-processed. The sensor data 120 (e.g., corresponding recent temporal windows 402) is stored in a storage 108, optionally with the sensor tokens 210 and/or pre-processed data 212. As the sensor data 120 ages, the sensor data 120, sensor tokens 210, and/or pre-processed data 212 are compressed for storage in the storage 108. Additionally, in some implementations, compressed sensor data 408 is iteratively compressed as an age of the compressed sensor data 408 increases for a plurality of times.

In some implementations, the one or more information items 240 include one or more of: partially processed sensor data 120 (e.g., sensor tokens 210 and pre-processed data 212), a feature vector including a plurality of feature values, and semantic descriptive tags. In an example, the information items 240 includes a feature vector including a set of probabilities corresponding to a plurality of descriptive information tags (e.g., a modality of sensor data, a spatial location). In some implementations, the LLM output 130 includes, but is not limited to, narrative output (e.g., an automatic alert message), software code (e.g., instructions to control a thermostat), and a user interface (that can interact with a user).

In some implementations, the sensor data 120 includes a temporal sequence of sensor data 120. The server system obtains a stream of sensor data 120 measured continuously by the one or more sensors. The stream of sensor data 120 includes the temporal sequence of sensor data 120 grouped based on a temporal window 402. The temporal window 402 is configured to move with a time axis 404 (FIG. 4). The server system associates each sensor data item of the temporal sequence of sensor data 120 according to a timestamp.

In some implementations, the sensor data 120 is grouped based on a temporal window 402. For each temporal window 402 corresponding a subset of sensor data 120, the server system 106 processes the subset of sensor data 120, e.g., using machine learning or a feature recognition algorithm, to detect one or more signature events within the respective temporal window 402 and determine the one or more information items associated with the one or more signature events, and stores the one or more information items associated with the one or more signature events. The one or more information items includes a timestamp and a location of each of the one or more signature events. Further, in some implementations, the server system 106 determines a behavior pattern based on the one or more signature events for each temporal window 402 of a subset of sensor data 120, generates a subset of the one or more information items describing the behavior pattern, and provides the subset of the one or more information items of the behavior pattern in at least the subset of sensor data 120.

In some implementations, the server system 106 obtains (508) a text prompt 214. The text prompt 214 includes a plurality of natural language words. The LLM output 130 is generated in response to the text prompt 214. Further, in some implementations, the server system applies the LLM by providing, to a large language model (LLM) 150, the text prompt 214 and the one or more information items associated with one or more signature events; and in response to the text prompt 214, obtaining, from the LLM 150, the LLM output 130 describing the one or more signature events associated with the sensor data 120.

In some implementations, the text prompt 214 includes (510) a predefined mission 218, the predefined mission 218 including a trigger condition. Further, in some implementations, the one or more sensors are configured to monitor a condition of a patient. The predefined mission 218 is defined in advance before the sensor data 120 is obtained, the trigger condition including a first health condition associated with a first pattern of the sensor data 120. Additionally, in some implementations, the server system 106 analyzes the sensor data 120 to identify the first pattern and detects the first health condition based on the first pattern. In response to detection of the first health condition, the text prompt 214 and the one or more information items are provided to the LLM 150. In some implementations, the LLM output 130 includes treatment suggestions of the first health condition.

In some implementations, the text prompt 214 includes (512) a user query 216 entered on a user interface of an application executed on a client device. The user query 216 is received, in real time while or after the sensor data 120 is collected. Further, in some implementations, the user query 216 includes information defining a duration of time. The server system 106 determines the duration of time based on the user query 216, and extracts the one or more information items characterizing the sensor data 120 for each temporal window 402 that are included in the duration of time. The user query 216, the one or more information items in the duration of time, and respective timestamps are provided to the LLM 150. Example queries include "how many people have you seen?," "what time have you seen the last person?". In some situations, the text query includes location information of a camera, and the camera is selected accordingly.

Further, in some implementations, the user query 216 includes information defining a location. The server system 106 selects one of the one or more sensors based on the user query 216, identifies a subset of sensor data 120 captured the selected one of the one or more sensors, and extracts the one or more information items characterizing the sensor data 120 associated with the selected one of the one or more sensors. Additionally, in some implementations, the user query 216 includes information defining a location. The server system 106 identifies a region of interest (ROI) corresponding to the location in the sensor data 120 captured by a first sensor, and extracts the one or more information items characterizing the sensor data 120 associated with the region of interest.

In some implementations, in response to the user query 216, the server system 106 extracts the one or more information items characterizing the sensor data 120. The user query 216, the extracted one or more information items, and respective timestamps are provided to the LLM 150. Moreover, in some implementations, the user query 216 is entered in a query language. The server system 106 provides the user query 216 to the LLM 150, which is configured to translate the user query 216 to English, and obtains a translated user query 216 from the LLM 150, wherein the one or more information items associated with the sensor data 120 is extracted in response to the translated user query 216.

In some implementations, the LLM output 130 includes (514) one or more of: LLM description, timestamp, numeral information, statistic summary, warning message, and recommended action associated with one or more signature events. In some implementations, the LLM output 130 includes (516) one or more of: textual statements, a program code, an information dashboard having a predefined format, a user interface, an API hook, and a heatmap.

In some implementations, the server system 106 obtains a plurality of training inputs. Each training input includes a training text prompt 214 and an information item associated with a signature event. The server system 106 obtains ground truth corresponding to each training input, and the ground truth includes a sample LLM output 130 preferred for the training input. Based on a predefined loss function, the LLM 150 is trained using the plurality of training inputs and associated ground truths.

In some implementations, the server system 106 obtains a plurality of training inputs, each training input including one or more test tags of a sequence of signature events, the one or more test tags having a predefined description format in which one or more information items and an associated timestamps of each signature event is organized.

In some implementations, for a temporal window 402 corresponding to a subset of sensor data 120, the server system 106 uses machine learning to process the subset of sensor data 120 within the respective temporal window 402 and detect one or more signature events.

In some implementations, the server system 106 is configured to manage the sensor data 120 measured by the one or more sensors. The server system 106 is coupled to the one or more sensors and includes a sensor server 106A and an LLM server 106B. The sensor server 106A generates the one or more information items and provides the one or more information items to the LLM server 106B. The LLM server 106B returns the LLM output 130 to the sensor server 106A, which provides the LLM output 130 further to a client device.

In some implementations, the server system 106 is coupled to a client device that executes an application. The server system 106 enables display of a user interface on the application of the client device. Specifically, the server system 106 receives the text prompt 214 via the user interface and provides the LLM output 130 characterizing the sensor data 120 to be displayed on the user interface. In an example, the user application 324 is configured to monitor energy efficiency of consumer or industrial devices. In another example, the user application 324 is configured to monitor chronic health condition of a patient.

In some implementations, the text prompt 214 defines a reply language, and the LLM output 130 is provided by the LLM 150 in the reply language. An example text prompt 214 is "can you tell me in Italian if you have seen any person?".

In some implementations, the one or more sensors include (518) one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor.

In some implementations, the server system 106 stores the one or more information items and/or the LLM output 130 in a database, in place of the sensor data 120 measured by the one or more sensors.

Further, in some implementations, after the sensor data 120 is measured, the server system 106 processes the sensor data 120 to generate one or more sets of intermediate items successively and iteratively, until generating the one or more information items.

Additionally, in some implementations, the server system 106 processes the sensor data 120 to generate a first set of intermediate items at a first time, stores the first set of intermediate items in the database, processes the first set of intermediate items to generate one or more second sets of intermediate items successively at one or more successive second times following the first time, successively stores the one or more second sets of intermediate items in the database, deleting the first set of intermediate items from the database, and processes a most recent intermediate set of the one or more second sets of intermediate items to generate the one or more information data items at a third time following the one or more successive second times. The sensor data 120 is compressed to different level based on the age of the sensor data 120.

It should be understood that the particular order in which the operations in FIG. 5 have been described are merely exemplary and are not intended to indicate that the described order is the only order in which the operations could be performed. One of ordinary skill in the art would recognize various ways to using multimodal learning to process a combination of various modalities of data (e.g., sensor data 120, narrative query) as described herein. Additionally, it should be noted that details of other processes described herein with respect to other figures (e.g., FIGS. 1-4 and 6-26) are also applicable in an analogous manner to method 500 described above with respect to FIG. 5. For brevity, these details are not repeated here.

Broadly, in some implementations, the server system 106 (e.g., sensor data processor 202 in FIG. 2) obtains (502) sensor data 120 measured by one or more sensors 102 and processes (504) the sensor data 120 to generate one or more information items 240 characterizing the sensor data 120. In some implementations, the server system 106 applies a sensor data processing model 160 to process the sensor data 120. The server system 106 applies (506) a neural network to receive the one or more information items 240 and generate an NN output associated with the sensor data 120. In some implementations, the neural network is trained offline. In some implementations, the neural network is coupled to the sensor data processing model 160 to process the sensor data 120 jointly.

In some implementations, the sensor data 120 is measured simultaneously from multiple different types of sensors 102. While the sensor data 120 is measured, the sensor data 120 is processed by the server system 106, dynamically and in real time, to generate the information items 240 and the NN output. The sensor data 120 is optionally tokenized or pre-processed. The sensor data 120 (e.g., corresponding recent temporal windows 402) is stored in a storage 108, optionally with the sensor tokens 210 and/or pre-processed data 212. As the sensor data 120 ages, the sensor data 120, sensor tokens 210, and/or pre-processed data 212 are compressed for storage in the storage 108. Additionally, in some implementations, compressed sensor data 408 is iteratively compressed as an age of the compressed sensor data 408 increases for a plurality of times.

In some implementations, the one or more information items 240 include one or more of: partially processed sensor data 120 (e.g., sensor tokens 210 and pre-processed data 212), a feature vector including a plurality of feature values, and semantic descriptive tags. In an example, the information items 240 includes a feature vector including a set of probabilities corresponding to a plurality of descriptive information tags (e.g., a modality of sensor data, a spatial location). In some implementations, the NN output includes, but is not limited to, narrative output (e.g., an automatic alert message), software code (e.g., instructions to control a thermostat), and a user interface (that can interact with a user).

In some implementations, the sensor data 120 includes a temporal sequence of sensor data 120. The server system obtains a stream of sensor data 120 measured continuously by the one or more sensors. The stream of sensor data 120 includes the temporal sequence of sensor data 120 grouped based on a temporal window 402. The temporal window 402 is configured to move with a time axis 404 (FIG. 4). The server system associates each sensor data item of the temporal sequence of sensor data 120 according to a timestamp. In some implementations, the sensor data 120 is grouped based on a temporal window 402. For each temporal window 402 corresponding a subset of sensor data 120, the server system 106 processes the subset of sensor data 120, e.g., using machine learning or a feature recognition algorithm, to detect one or more signature events within the respective temporal window 402 and determine the one or more information items associated with the one or more signature events, and stores the one or more information items associated with the one or more signature events. The one or more information items includes a timestamp and a location of each of the one or more signature events. Further, in some implementations, the server system 106 determines a behavior pattern based on the one or more signature events for each temporal window 402 of a subset of sensor data 120, generates a subset of the one or more information items describing the behavior pattern, and provides the subset of the one or more information items of the behavior pattern in at least the subset of sensor data 120.

In some implementations, the server system 106 obtains (508) a text prompt 214. The text prompt 214 includes a plurality of natural language words. The NN output is generated in response to the text prompt 214. Further, in some implementations, the server system applies the neural network by providing, to a neural network (e.g., LLM 150), the text prompt 214 and the one or more information items associated with one or more signature events; and in response to the text prompt 214, obtaining, from the neural network, the NN output describing the one or more signature events associated with the sensor data 120. In some implementations, the text prompt 214 includes (510) a predefined mission 218, the predefined mission 218 including a trigger condition. Further, in some implementations, the one or more sensors are configured to monitor a condition of a patient. The predefined mission 218 is defined in advance before the sensor data 120 is obtained, the trigger condition including a first health condition associated with a first pattern of the sensor data 120. Additionally, in some implementations, the server system 106 analyzes the sensor data 120 to identify the first pattern and detects the first health condition based on the first pattern. In response to detection of the first health condition, the text prompt 214 and the one or more information items are provided to the neural network. In some implementations, the NN output includes treatment suggestions of the first health condition.

In some implementations, the text prompt 214 includes (512) a user query 216 entered on a user interface of an application executed on a client device. The user query 216 is received, in real time while or after the sensor data 120 is collected. Further, in some implementations, the user query 216 includes information defining a duration of time. The server system 106 determines the duration of time based on the user query 216, and extracts the one or more information items characterizing the sensor data 120 for each temporal window 402 that are included in the duration of time. The user query 216, the one or more information items in the duration of time, and respective timestamps are provided to the neural network. Example queries include "how many people have you seen?," "what time have you seen the last person?". In some situations, the text query includes location information of a camera, and the camera is selected accordingly.

Further, in some implementations, the user query 216 includes information defining a location. The server system 106 selects one of the one or more sensors based on the user query 216, identifies a subset of sensor data 120 captured the selected one of the one or more sensors, and extracts the one or more information items characterizing the sensor data 120 associated with the selected one of the one or more sensors. Additionally, in some implementations, the user query 216 includes information defining a location. The server system 106 identifies a region of interest (ROI) corresponding to the location in the sensor data 120 captured by a first sensor, and extracts the one or more information items characterizing the sensor data 120 associated with the region of interest. In some implementations, in response to the user query 216, the server system 106 extracts the one or more information items characterizing the sensor data 120. The user query 216, the extracted one or more information items, and respective timestamps are provided to the neural network. Moreover, in some implementations, the user query 216 is entered in a query language. The server system 106 provides the user query 216 to the neural network, which is configured to translate the user query 216 to English, and obtains a translated user query 216 from the neural network, wherein the one or more information items associated with the sensor data 120 is extracted in response to the translated user query 216.

In some implementations, the NN output includes (514) one or more of: description, timestamp, numeral information, statistic summary, warning message, and recommended action associated with one or more signature events. In some implementations, the NN output includes (516) one or more of: textual statements, a program code, an information dashboard having a predefined format, a user interface, a user interface, an API hook, and a heatmap.

In some implementations, the server system 106 obtains a plurality of training inputs. Each training input includes a training text prompt 214 and an information item associated with a signature event. The server system 106 obtains ground truth corresponding to each training input, and the ground truth includes a sample NN output preferred for the training input. Based on a predefined loss function, the neural network is trained using the plurality of training inputs and associated ground truths. In some implementations, the server system 106 obtains a plurality of training inputs, each training input including one or more test tags of a sequence of signature events, the one or more test tags having a predefined description format in which one or more information items and an associated timestamps of each signature event is organized.

In some implementations, for a temporal window 402 corresponding to a subset of sensor data 120, the server system 106 uses machine learning to process the subset of sensor data 120 within the respective temporal window 402 and detect one or more signature events. In some implementations, the server system 106 is configured to manage the sensor data 120 measured by the one or more sensors. The server system 106 is coupled to the one or more sensors and includes a sensor server 106A and an neural network server 106B. The sensor server 106A generates the one or more information items and provides the one or more information items to the neural network server 106B. The neural network server 106B returns the NN output to the sensor server 106A, which provides the NN output further to a client device. In some implementations, the server system 106 is coupled to a client device that executes an application. The server system 106 enables display of a user interface on the application of the client device. Specifically, the server system 106 receives the text prompt 214 via the user interface and provides the NN output characterizing the sensor data 120 to be displayed on the user interface. In an example, the user application 324 is configured to monitor energy efficiency of consumer or industrial devices. In another example, the user application 324 is configured to monitor chronic health condition of a patient. In some implementations, the text prompt 214 defines a reply language, and the NN output is provided by the neural network in the reply language. An example text prompt 214 is "can you tell me in Italian if you have seen any person?".

In some implementations, the one or more sensors include (518) one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor.

In some implementations, the server system 106 stores the one or more information items and/or the NN output in a database, in place of the sensor data 120 measured by the one or more sensors. Further, in some implementations, after the sensor data 120 is measured, the server system 106 processes the sensor data 120 to generate one or more sets of intermediate items successively and iteratively, until generating the one or more information items. Additionally, in some implementations, the server system 106 processes the sensor data 120 to generate a first set of intermediate items at a first time, stores the first set of intermediate items in the database, processes the first set of intermediate items to generate one or more second sets of intermediate items successively at one or more successive second times following the first time, successively stores the one or more second sets of intermediate items in the database, deleting the first set of intermediate items from the database, and processes a most recent intermediate set of the one or more second sets of intermediate items to generate the one or more information data items at a third time following the one or more successive second times. The sensor data 120 is compressed to different level based on the age of the sensor data 120.

Figure 6:
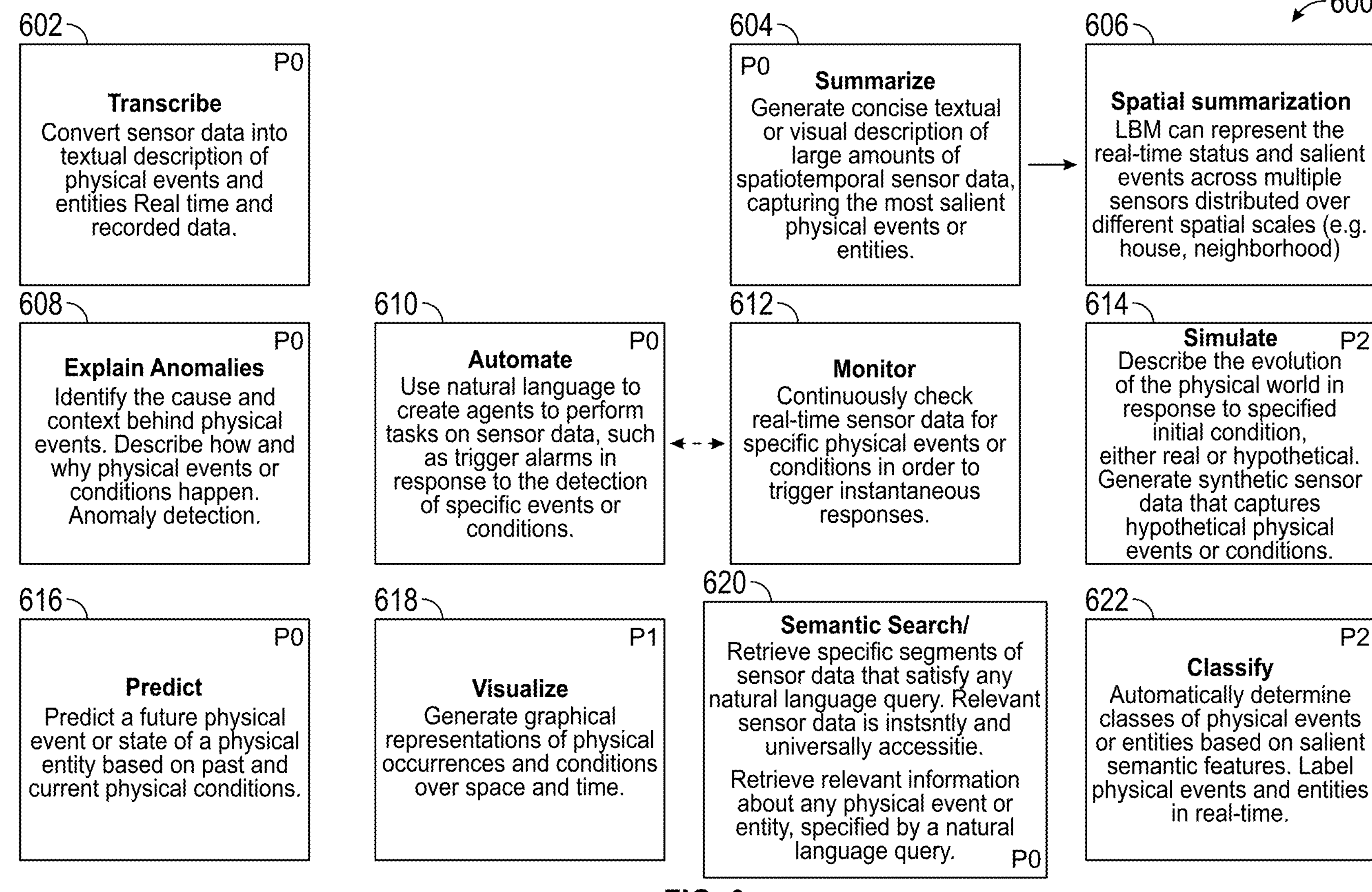
FIG. 6 illustrates examples of applying an LLM to process sensor data, in accordance with some implementations.

FIG. 6 illustrates examples 600 of applying an LLM 150 to process sensor data 120, in accordance with some implementations. For example, the LLM 150 is applied to transcribe, summarize, explain anomalies in, automatically perform a task on, monitor, simulate, predict information from, visualize, perform a semantic search on, and/or classify sensor data 120. In some implementations, the sensor data 120 is converted (602) into an LLM output 130 including textual description of physical events and entities in real time. In some implementations, the server system 106 generates (604) an LLM output 130 including concise textual or visual descriptions of large amounts of spatiotemporal sensor data 120, capturing the most salient physical events or entities. Further, in some implementations, a learning base model represents (606) the real-time status and salient events across multiple sensors distributed over different spatial scales (e.g., house, neighborhood). In some implementations, the server system 106 applies the LLM 150 to detect an anomaly, identify a cause and context behind physical events, and generate the LLM output 130 describing how and why physical events or conditions happen.

In some implementations, the server system uses (610) a text prompt 214 to create agents to perform tasks on the sensor data 120 and applies the LLM 150 to detect, in the sensor data 120, specific events and conditions identified in the text prompt. The LLM output 130 optionally includes alarm signals. Further, in some situations, the server system 106 continuously checks (612) real-time sensor data 120 for specific events or conditions defined in the text query 214 to trigger instantaneous responses. In some implementations, the server system 106 receives a text prompt 214 describing evolution of a physical world in response to an initial condition, either real or hypothetical, and applies (614) the LLM 150 to generate synthetic sensor data that captures hypothetical physical events or conditions.

In some implementations, the server system 106 applies (616) the LLM model 150 to predict a future physical event or state of a physical entity based on past and current physical conditions. In some situations, the past and current physical conditions are detected based on the sensor data 120, and the LLM output 130 includes narrative messages describing the predicted future physical event or state of the physical entity. For example, the server system 106 detects a fall of a patient and provides the LLM output 130 to remind a doctor of following up with an X-ray check focused on a left ankle of the patient.

In some implementations, the server system 106 generates (618) an LLM output 130 including graphical representations of physical occurrences and conditions over space and time. In some implementations, the server system 106 retrieves (620) specific segments of sensor data 120 that satisfy a user query 216 inputted with natural language. Relevant sensor data 120 is instantly and universally accessible. In some situations, the LLM output 130 further includes relevant information about a physical event or entity specified by the user query 216. In some implementations, the server system 106 applies the LLM 150 to automatically determine classes of physical events or entities based on salient semantic features and label physical events and entities in real time. The LLM output 130 includes information of the classes of physical events or entities.

Figure 7:
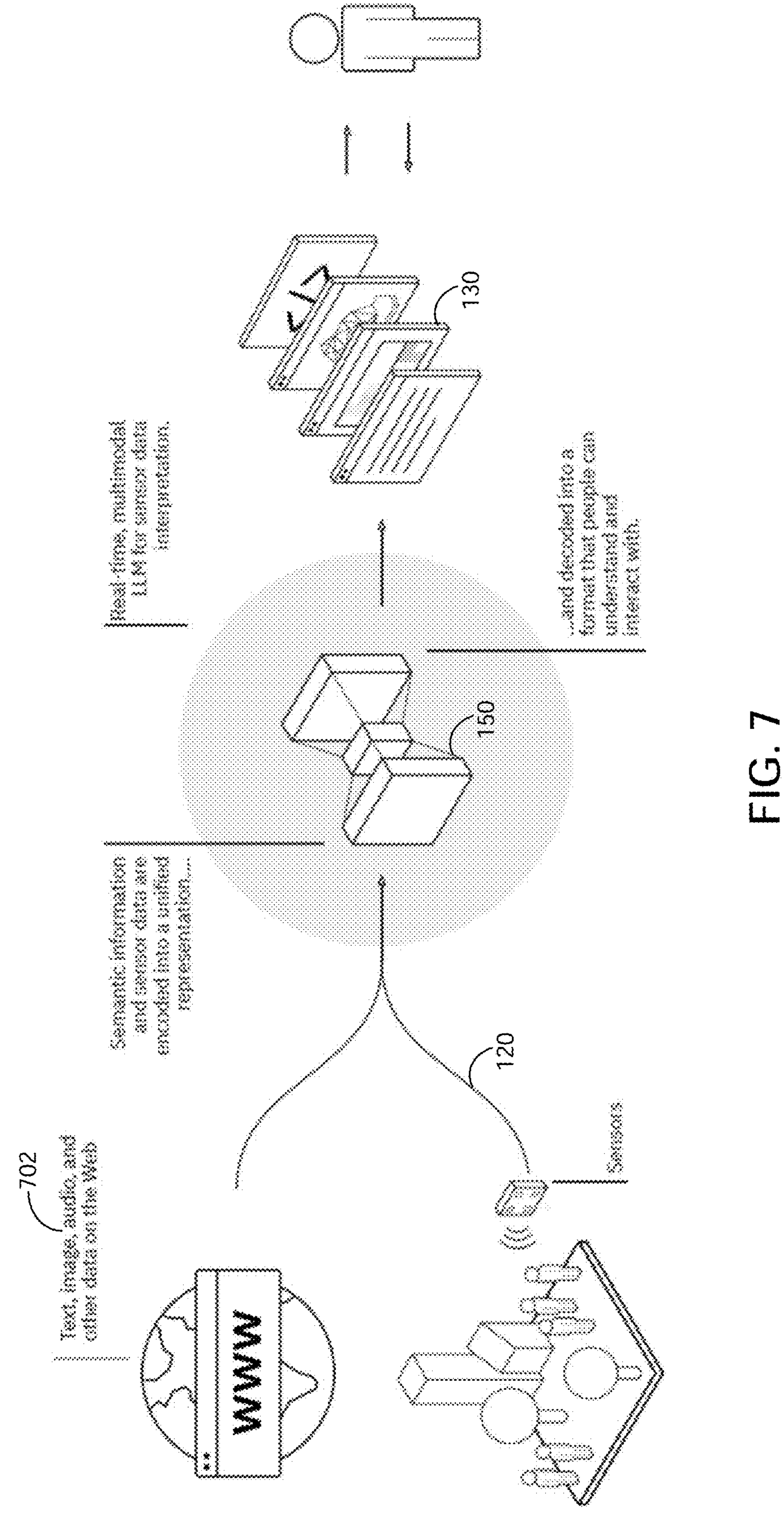
FIG. 7 is a diagram illustrating a multimodal neural network architecture of an LLM applied to process a plurality of modalities of data, in accordance with some implementations.

FIG. 7 is a diagram illustrating a multimodal neural network architecture of an LLM 150 applied to process a plurality of modalities of data, in accordance with some implementations. The LLM 150 encodes world concepts into a single latent space. The LLM 150 is configured to receive semantic information 702 (e.g., text, image, audio, and other data) from the Internet and collect sensor data 120 from a plurality of sensors 102. The sensor data 120 are collected by the sensors 102 to record physical context, events, and hand activities. The LLM 150 is a real-time multimodal neural network that encodes the semantic information 702 and sensor data 120 into a unified representation for sensor data interpretation. The LLM output 130 generated by the LLM 150 has a format that a user can understand and interact with. By these means, the LLM 150 organizes the sensor data 120 and allow the user to use the sensor data to search, summarize, explain, and predict events happening in the physical world.

FIGS. 8A-8D are four user interfaces 800, 820, 840, and 860 of a user application 324 associated with a conversational security camera, in accordance with some implementations. Each of the user interfaces 800 and 820 includes an image 802 or 804 captured by the security camera and a conversation panel 806 including respective user queries 216 and LLM outputs 130 provided in response to the user queries 216. Each of the user interfaces 840 and 860 includes a conversational panel including respective user queries 216 and LLM outputs 130 provided in response to the user queries 216. The server system 106 enables display of these user interfaces on the application, including receiving the user query 216 via these user interface and providing the LLM output 130 characterizing the sensor data 120 displayed on the user interfaces.

Figure 8A:
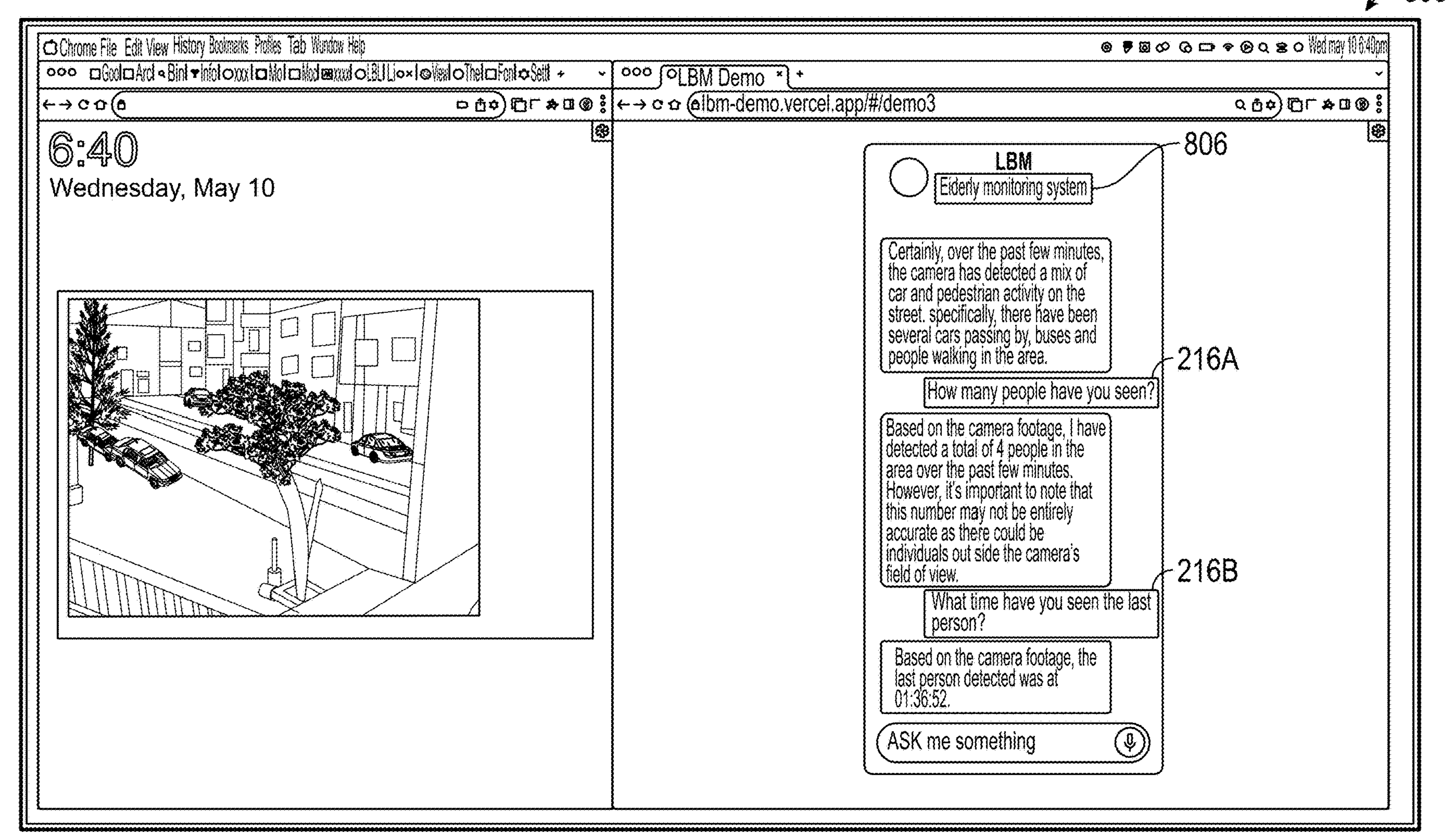
FIGS. 8A-8D are four user interfaces of a user application associated with a conversational security camera, in accordance with some implementations.
Figure 8B:
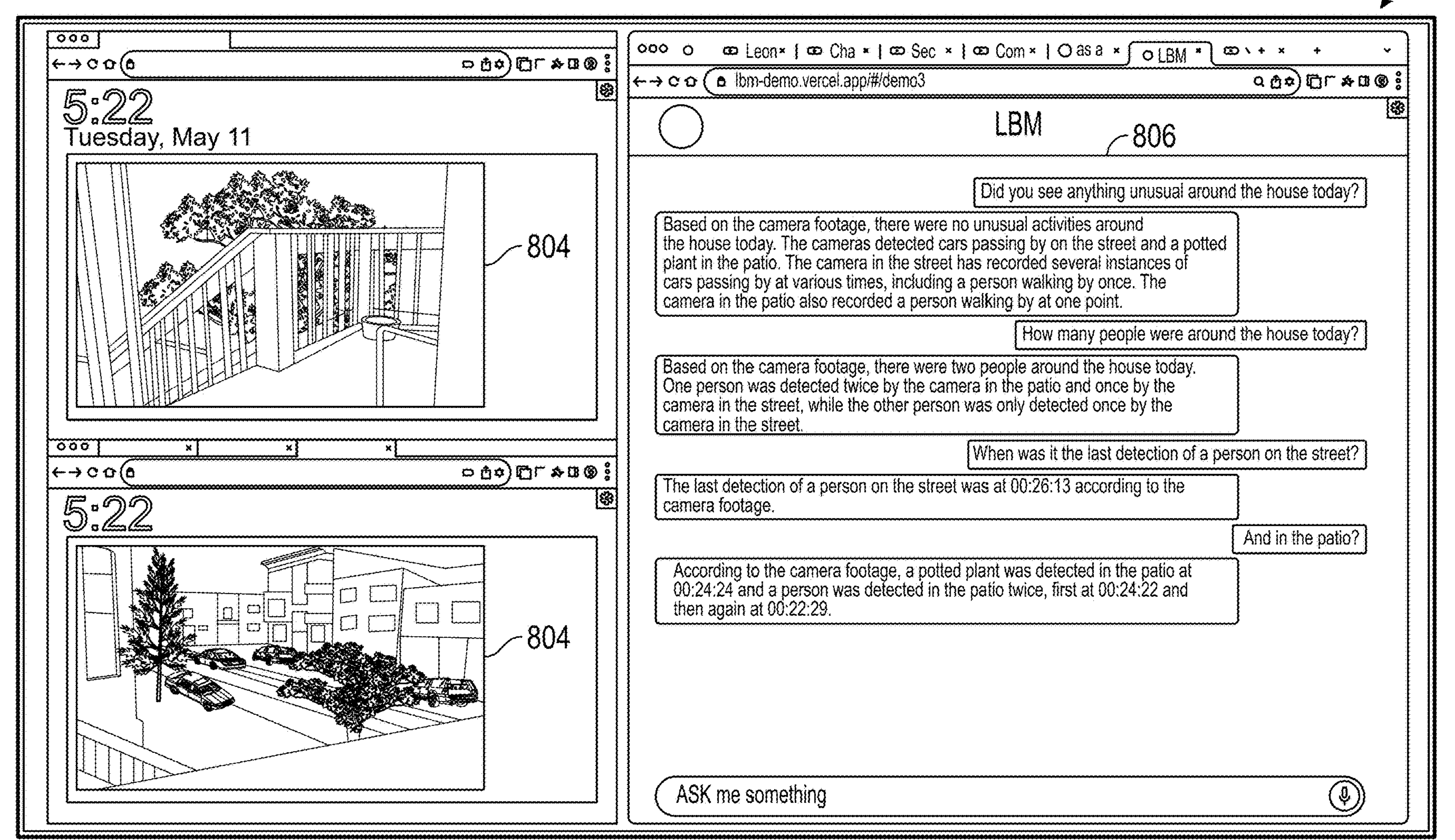
Figure 8D:
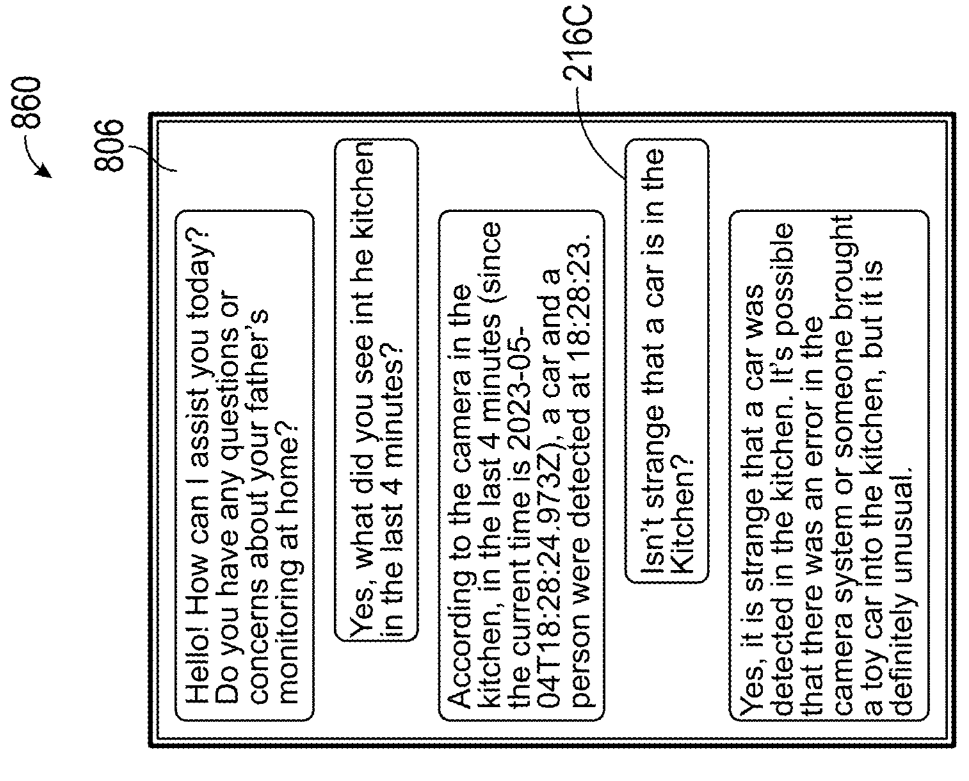
Figure 8C:
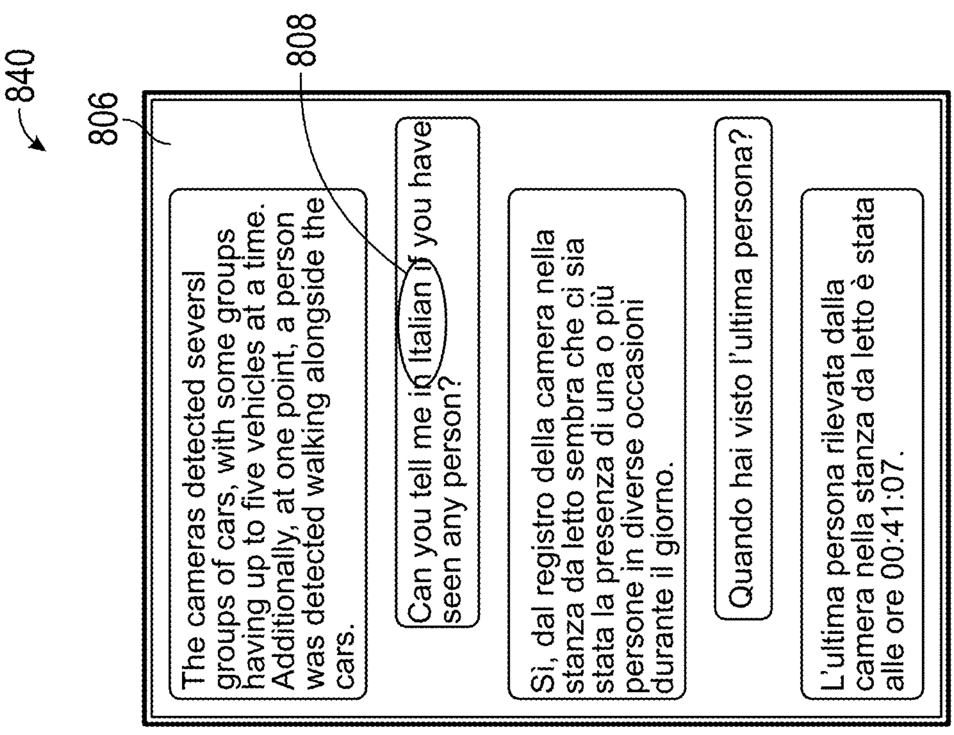

Referring to FIG. 8A, the LLM output 130 summarizes what happened in a field of view of the security camera in a duration of time, provides detailed information (e.g., a number of people, a specific time of an event) in response the user queries 216A and 216B. Referring to FIG. 8B, the sensor data 120 are obtained from two locations, and the LLM output 130 describes an anomaly and summarizes detailed information (e.g., a number of people around a location today). Particularly, each user query 216 includes location information, and the LLM output 130 is generated based on a subset of sensor data 120 associated with a corresponding location determined based on the location information. Referring to FIG. 8C, in some implementations, the user query 216 defines a reply language (e.g., Italian), and the LLM output 130 is provided by the LLM 150 in the reply language. Referring to FIG. 8D, in some implementations, the user query 216C requests subject comments from the LLM 150. The LLM output 130 explains (608, FIG. 6) the abnormality detected in the sensor data.

Figure 9A:
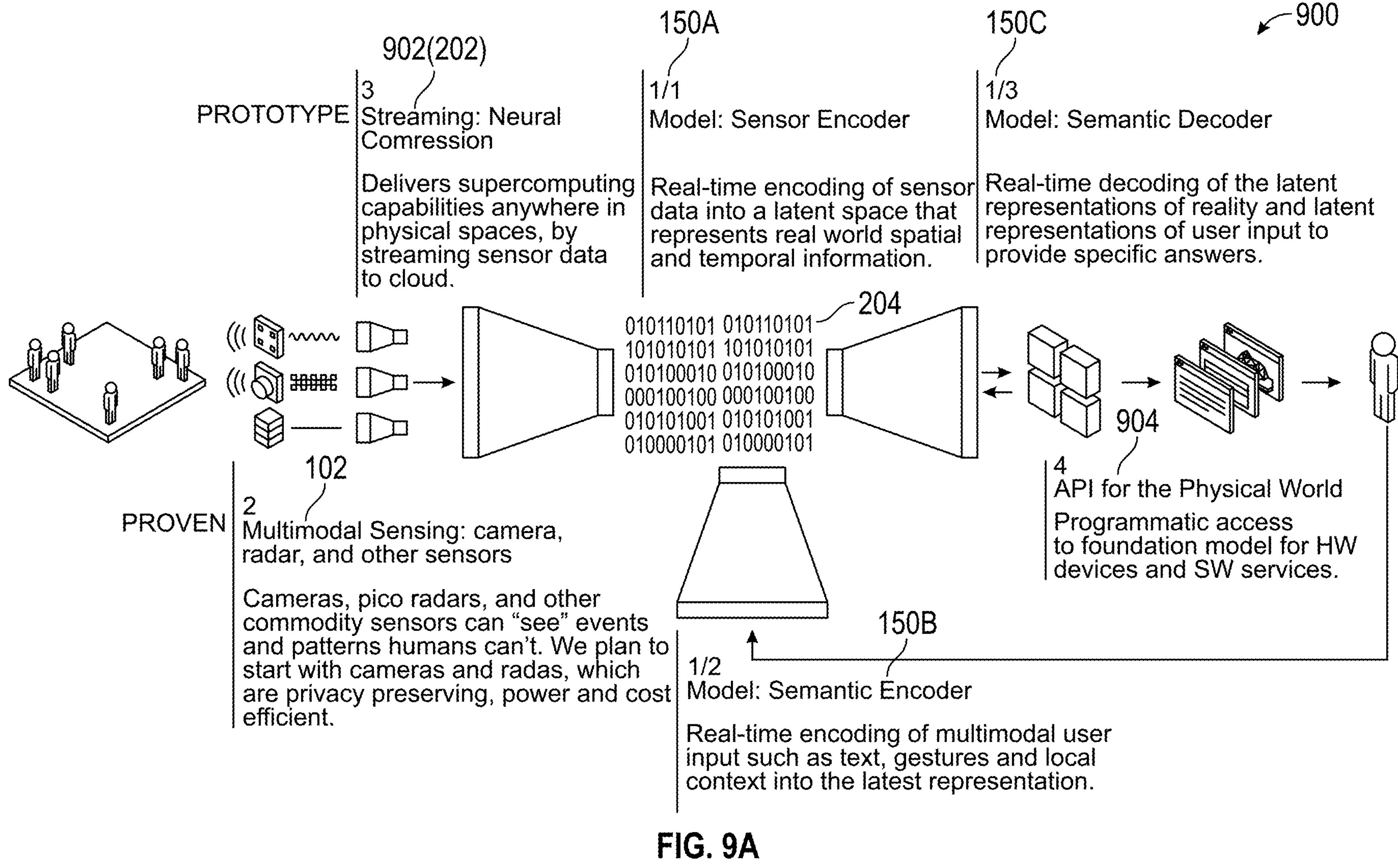
FIG. 9A is a block diagram of a physical AI multimodal neural network platform (which is an example of a multimodal neural network platform in FIG. 2), in accordance with some implementations.

FIG. 9A is a block diagram of a physical AI multimodal neural network platform 900 (which is an example of a multimodal neural network platform 200 in FIG. 2), in accordance with some implementations. The platform 900 includes four core blocks an NN module 204, sensors 102, a neural compressor 902 (also called sensor data processor 202), an output module 904. In some implementations, the sensors 102 have a plurality of different sensor types. The sensors 102 are configured to monitor events and patterns human cannot. In an example, the sensors 102 include a plurality of cameras and a plurality of radars, and are privacy preserving and efficient in power and cost. The neural compressor 902 delivers supercomputing capabilities anywhere in physical spaces, by streaming sensor data to cloud. An LLM 150 applied by the NN module 204 includes a sensor encoder 150A, a semantic encoder 150B, and a semantic decoder 150C. The sensor encoder 150A encodes the sensor data 120 in real time into a latent space that represents real world spatial and temporal information. The semantic encoder 150B encodes multimodal user input such as text, gestures, and local context into the latent representation in real time. The semantic decoder 150C decodes the latent representations of reality and latent representation of user input to provide specific answers in real time. The output module 904 includes an Application Programming Interface (API) for the physical world, and provides a programmatic access to foundation model for hardware devices and software services.

Figure 9B:
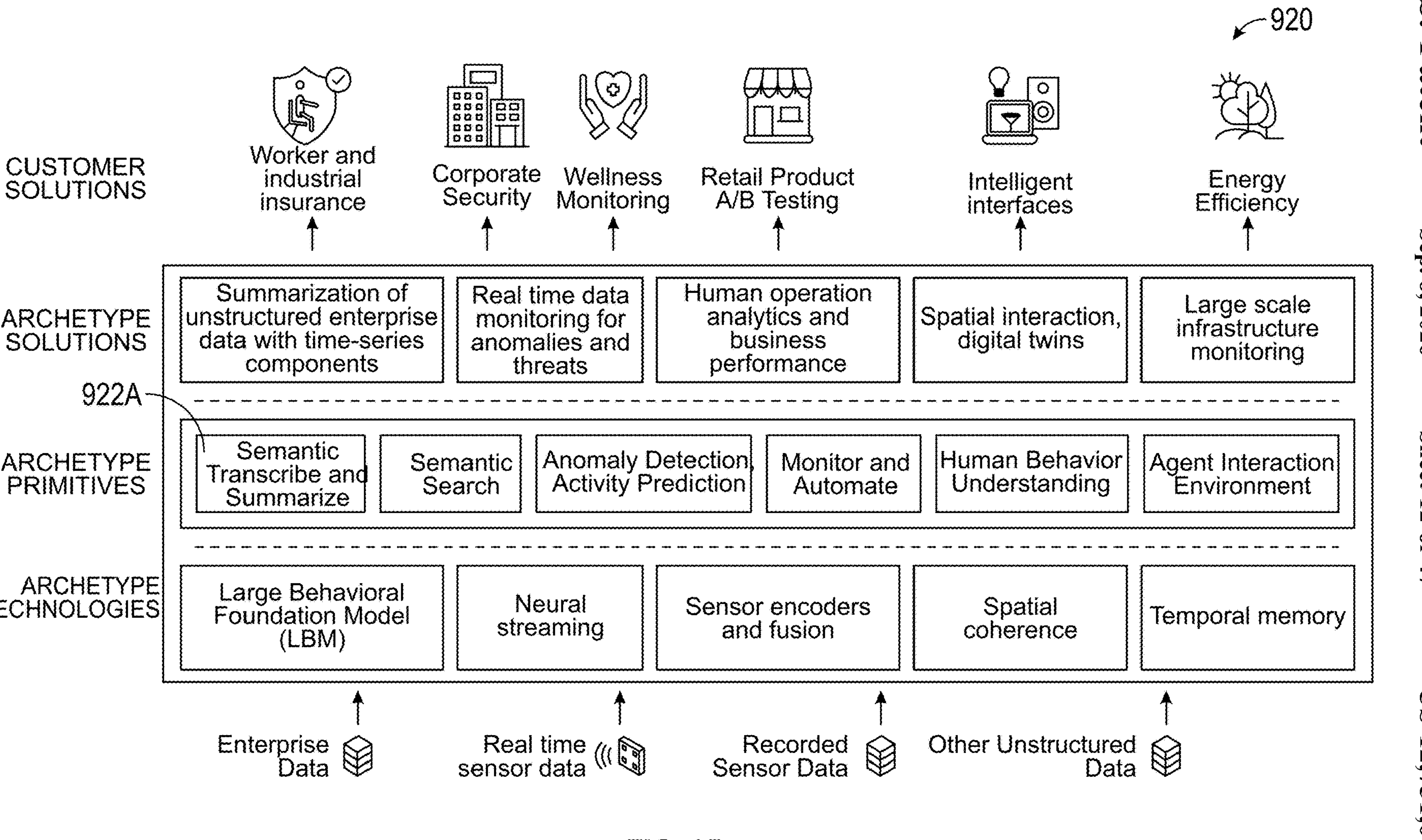
FIG. 9B is another block diagram of a multimodal neural network platform, in accordance with some implementations.

FIG. 9B is another block diagram of a multimodal neural network platform 920, in accordance with some implementations. The multimodal neural network platform 920 includes primitives 922 that are layered on top of technology components 924. In some implementations, the primitives 922 includes one or more functions described in FIG. 6. These primitives 922 are configured to be used by customers as building blocks (including multiple primitives together) to build use case solutions 926, as shown in the top row.

Figure 9C:
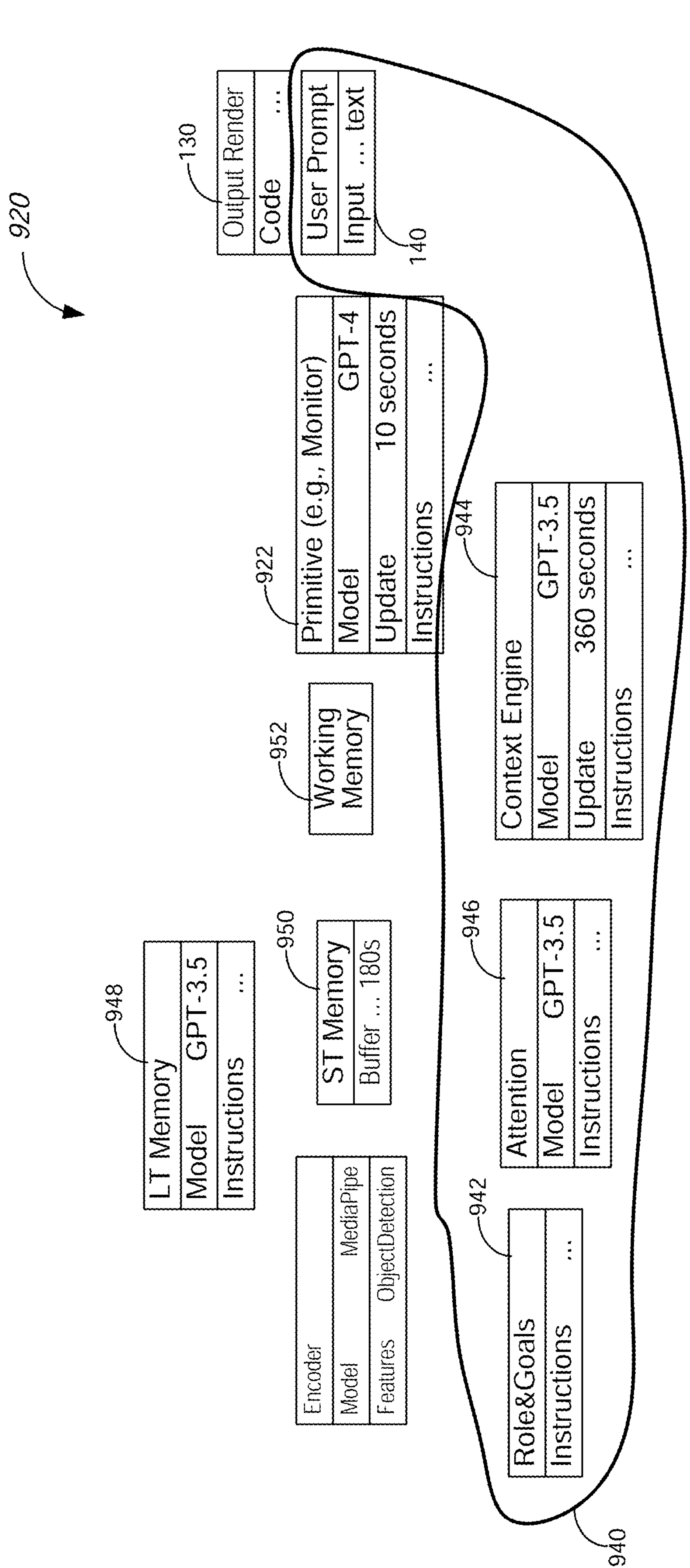
FIG. 9C is a block diagram of a multimodal neural network platform using an agent module configured to control content generation on a multimodal neural network platform, in accordance with some implementations.

FIG. 9C is a block diagram of a multimodal neural network platform 920 using an agent module 940 configured to control content generation on a multimodal neural network platform, in accordance with some implementations. A user defines a virtual agent to control a task via the agent module 940. In some implementations, the agent module 940 is defined by a role and a mission 942, has an ability to extrapolate context from sensor data 120 associated with the physical world by a context engine 944, and/or directs attention 946 toward a subset of sensor data 120. The agent module 940 is configured to receive the input 140 (FIG. 1) from a user (text), update the attention 946 (what the agent is paying attention to in the physical world/sensor stream), compare detected events (e.g., filtered by the attention 946) against the context extrapolated by the context engine 944, and make a decision regarding the sensor data 120 in the physical world. The LLM output 130 is generated based on the decision made by the agent module 940. In some implementations, the context engine 944 obtains context information from an external source (e.g., the Internet) to complement the context extrapolated from the sensor data 120.

The multimodal neural network platform 920 includes a plurality of memory modules, e.g., short term memory 948, long term memory 950, and working memory 952.

Figure 10:
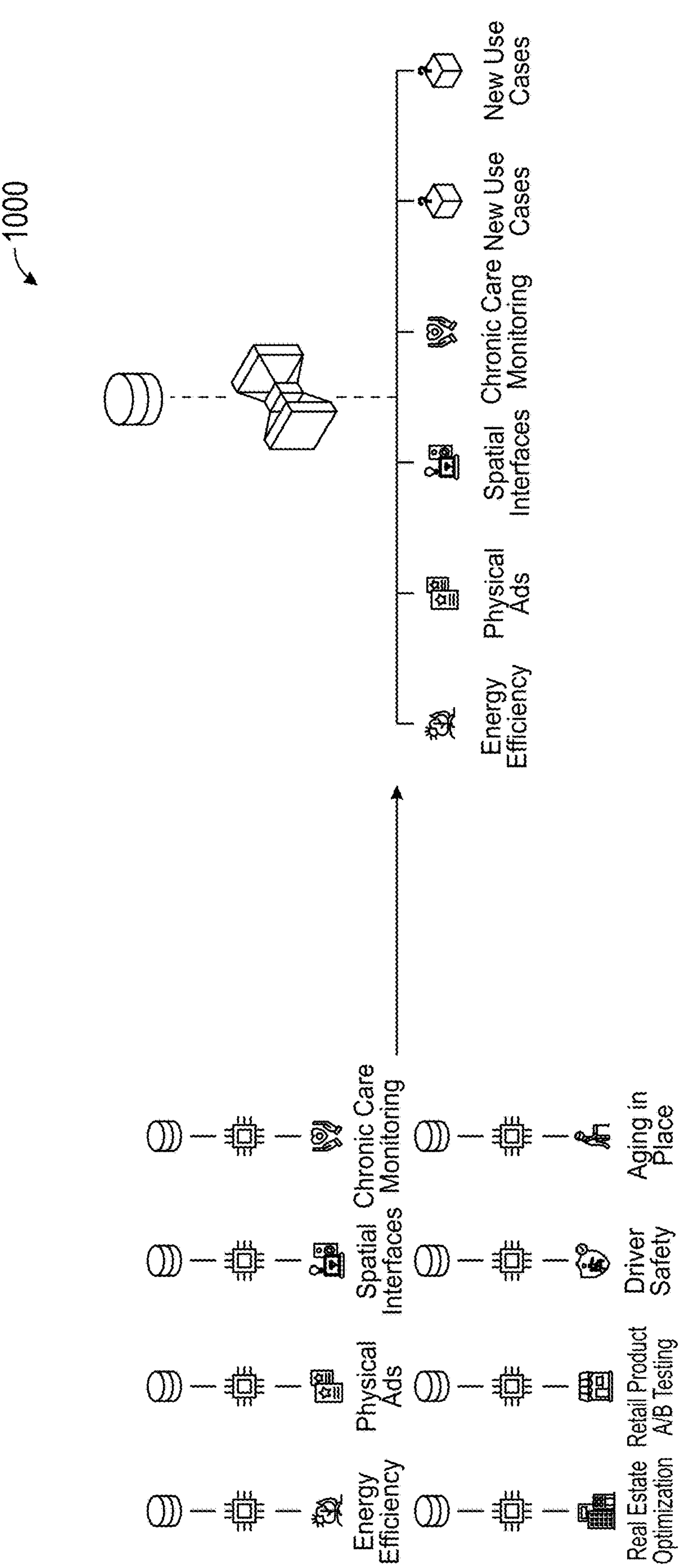
FIG. 10 illustrates different use cases that apply a multimodal neural network platform shown in FIG. 9, in accordance with some implementations.

FIG. 10 illustrates different use cases 1,000 that apply a multimodal neural network platform 900 shown in FIG. 9, in accordance with some implementations. The use cases 1,000 include, but are not limited to, energy efficiency management, physical ads spatial interfaces, chronic care monitoring, real estate optimization, retail product testing, driver safety, and aging in place. A generic LLM model 150 is applied in these user cases 1,000, and there is no need to develop a model for each specific sensor 102. The generic LLM model 150 can be applied in new use cases with re-training, while no new model is required for the new use cases. Such re-training requires a small incremental cost to ship the new use case, compared with creating a brand new LLM. The LLM 150 maintains foundation model capabilities on commodity hardware and allows emergent use cases based on sensor fusion, transfer learning, multimodal input/output, and non-human intelligence.

Figure 11:
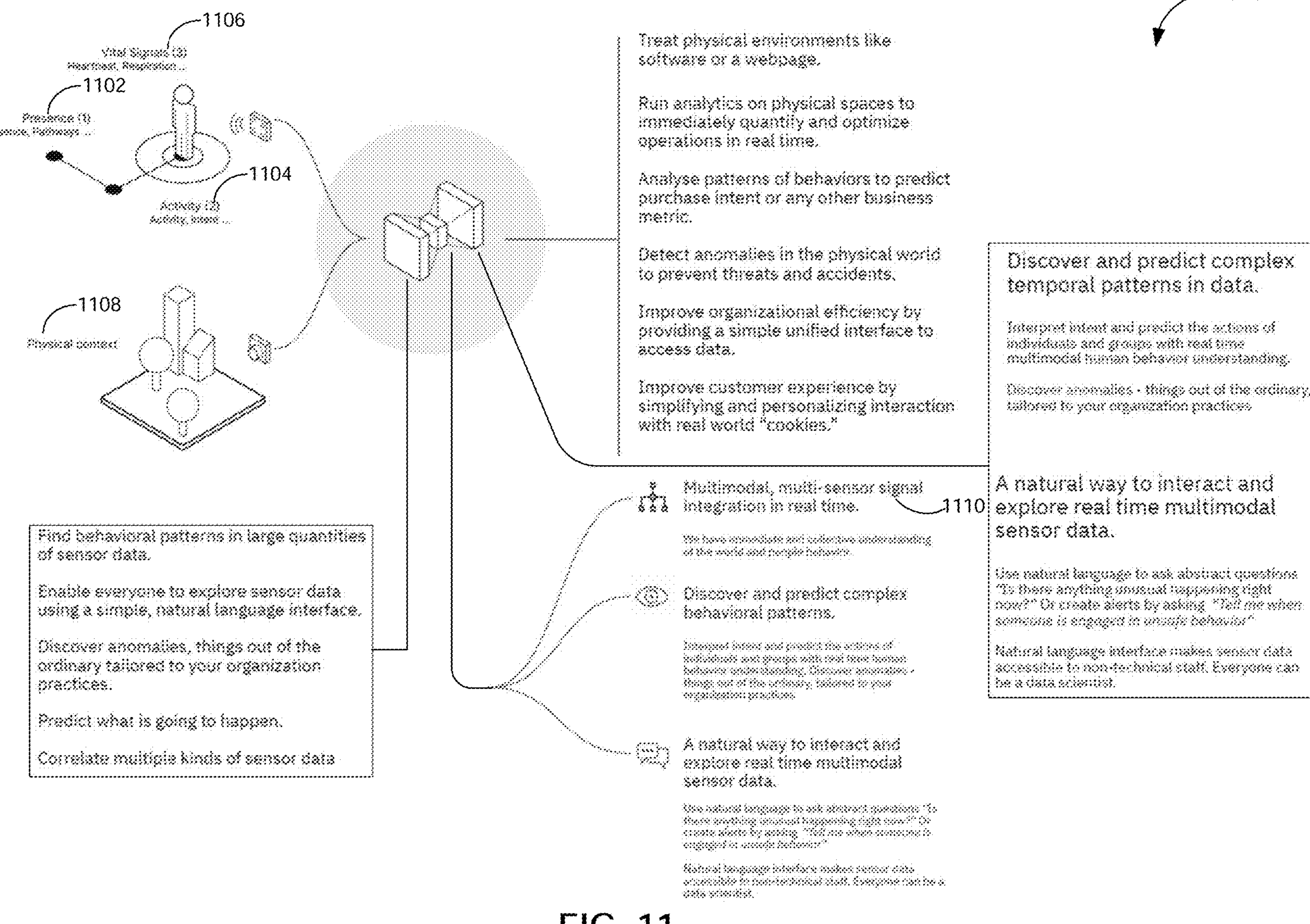
FIG. 11 illustrates benefits of a multimodal neural network platform shown in FIG. 9, in accordance with some implementations.

FIG. 11 illustrates benefits 1100 of a multimodal neural network platform 900 shown in FIG. 9, in accordance with some implementations. The multimodal neural network platform 900 uses artificial intelligence (e.g., the LLM 150) to understand human behavior and predict intent in the physical world. Presence data 1102, activity data 1104, vital signal 1106, and context information 1108 is collected using a plurality of sensors 102. Multimodal, multi-sensor signal integration 1110 is implemented in real time to understand human behavior. Specifically, the multimodal neural network platform 900 is configured to find behavioral patterns in large quantities of sensor data, enable everyone to explore sensor data using a simple, natural language interface, discover anomalies, things out of the ordinary tailored to your organization practices, predict what is going to happen, and correlate multiple kinds of sensor data 120.

FIG. 12 illustrates three use cases 1200 in which sensors 102 are disposed in a venue (e.g., a house 1200A, a grocery store 1200B, and a hospital room 1200C), in accordance with some implementations. In some implementations, a user query 216 is entered to request an LLM output 130 querying and summarizing real time events captured by security cameras at home or the office. In some implementations, the NN module 204 predicts customer behavior, allowing a user to optimize product placement based on the store's spatial analytics data. In some implementations, the LLM 150 combines vitals sensor data with general medical knowledge and generates the LLM output 130 to explain current patient symptoms.

Figure 13:
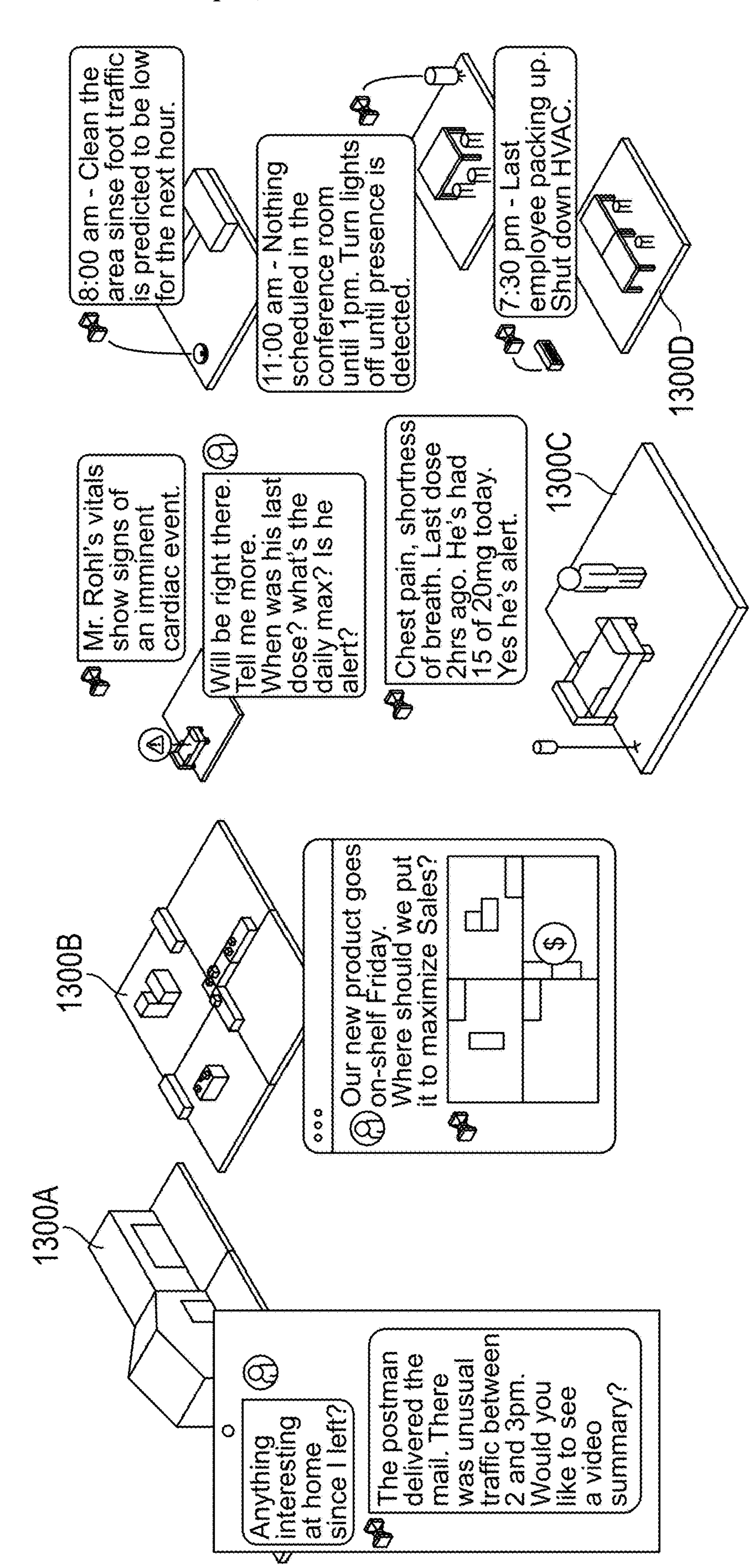
FIG. 13 illustrates four additional use cases in which sensors are disposed in a venue (e.g., a house, a large space, a hospital room, and a room), in accordance with some implementations.

FIG. 13 illustrates four additional use cases 1300 in which sensors 102 are disposed in a venue (e.g., a house 1300A, a large space 1300B, a hospital room 1300C, and a room 1300D), in accordance with some implementations. In some implementations, for personal and enterprise security, the LLM output 130 provides on-demand summaries across multiple home security cameras. In some implementations, for real estate use optimization, the LLM output 130 maximizes sales conversion rates for product placement based on foot traffic, store layouts, local events of the large space 1300B. In some implementations, the LLM output 130 includes an alert message (e.g., calling for a doctor or nurse), which is generated based on patients' vitals, behavior, medical history, and this reduces "Failure-to-Rescue" event in the hospital room 1300C. In some implementations, the LLM output 130 includes software code or instructions to control home appliance in the room 1300D, and is generated to automatically save energy, improve comfort, and reduce interruptions.

Figure 14:
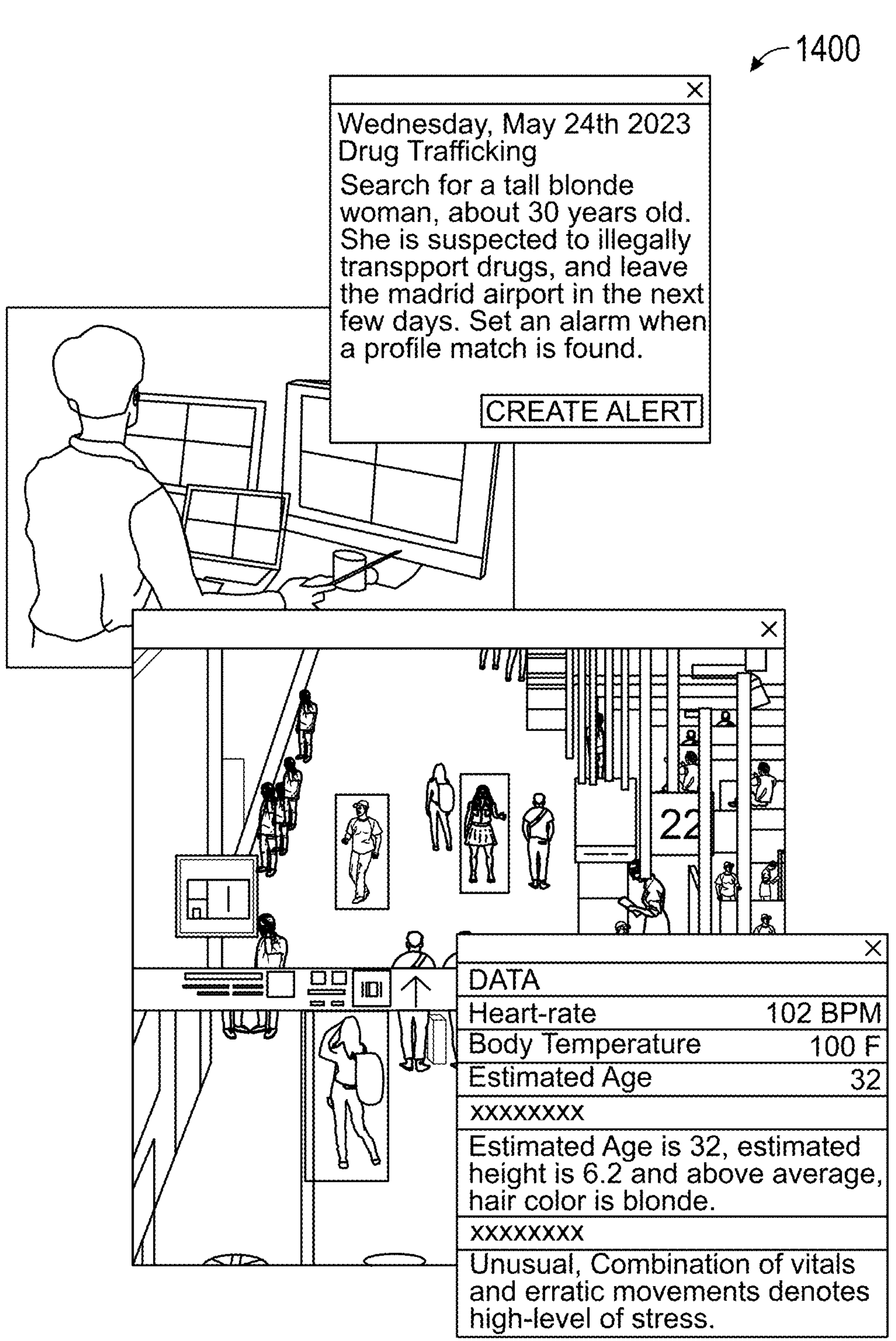
FIG. 14 illustrates a use case of physical security, in accordance with some implementations.

FIG. 14 illustrates a use case 1400 of physical security, in accordance with some implementations. The multimodal neural network platform 900 obtains large amount of accessible multimodal sensor data 120 that are recorded in real time from sensors 102. The sensor data 120 includes video, audio, specific absorption rate (SAR), radar, infrared, satellite imagery, motion, access control, and/or environmental sensor signals. The multimodal neural network platform 900 expands into adjacent verticals including Safety, operations, distracted driving, spatial computing and human machine interface (HMI), and robotics.

Figure 15:
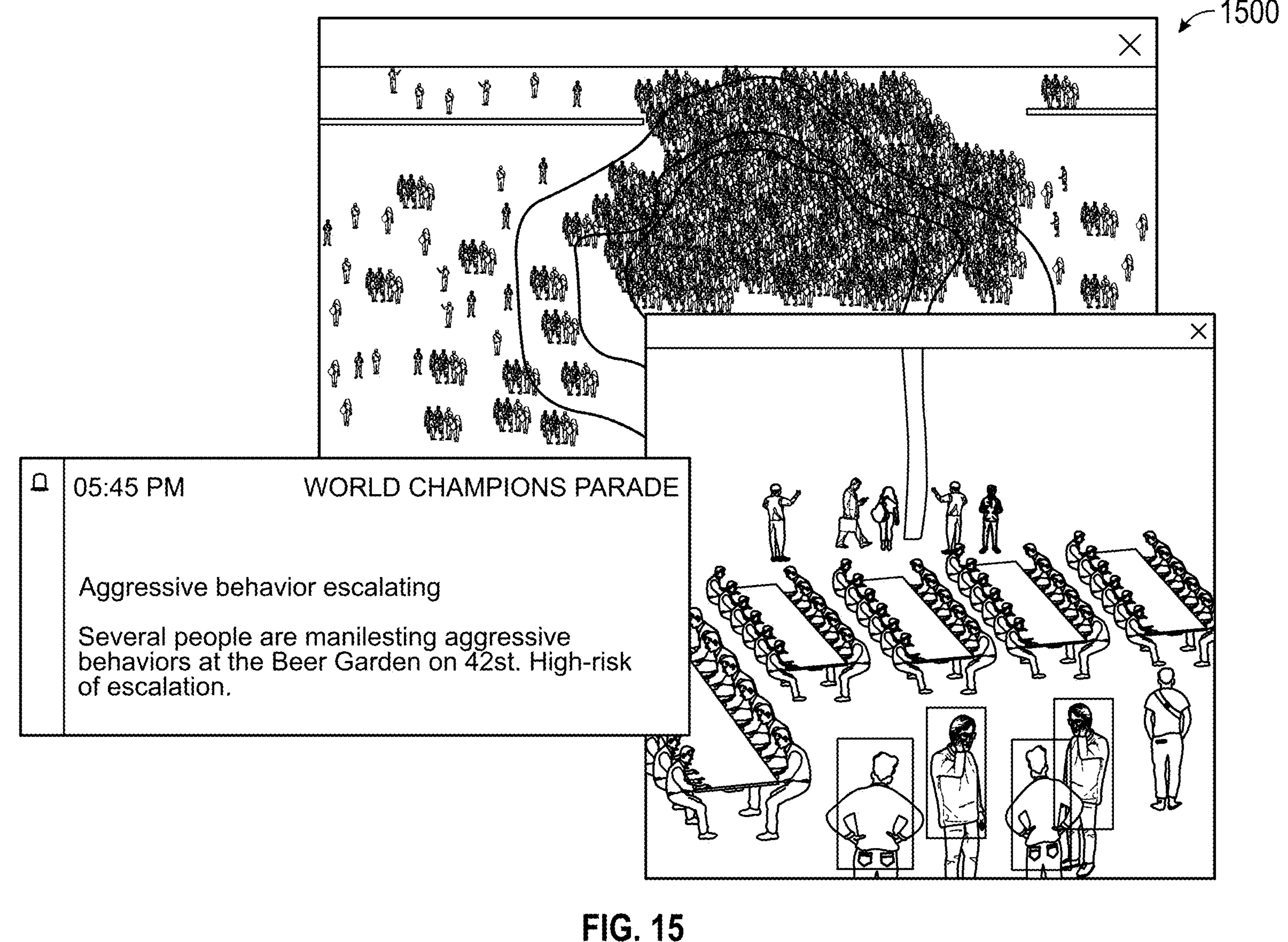
FIG. 15 illustrates another use case of physical security, in accordance with some implementations.

FIG. 15 illustrates another use case 1500 of physical security, in accordance with some implementations. The multimodal neural network platform 900 is applied for behavioral threat prediction, anomaly discovery, and simple semantic search. In some implementations, the LLM 150 is applied to interpret intent and predict the actions of individuals and groups with real time multimodal human behavior understanding. In some implementations, the LLM 150 is applied to discover anomalies by learning patterns over time, noticing deviations, and putting them in context based on lead up events. In some implementations, the LLM 150 is applied to interact by asking abstract questions like "Is anything unusual happening in the streets right now?" or create freeform alerts like "Tell me when someone's clothes don't match the weather.

Figure 18:
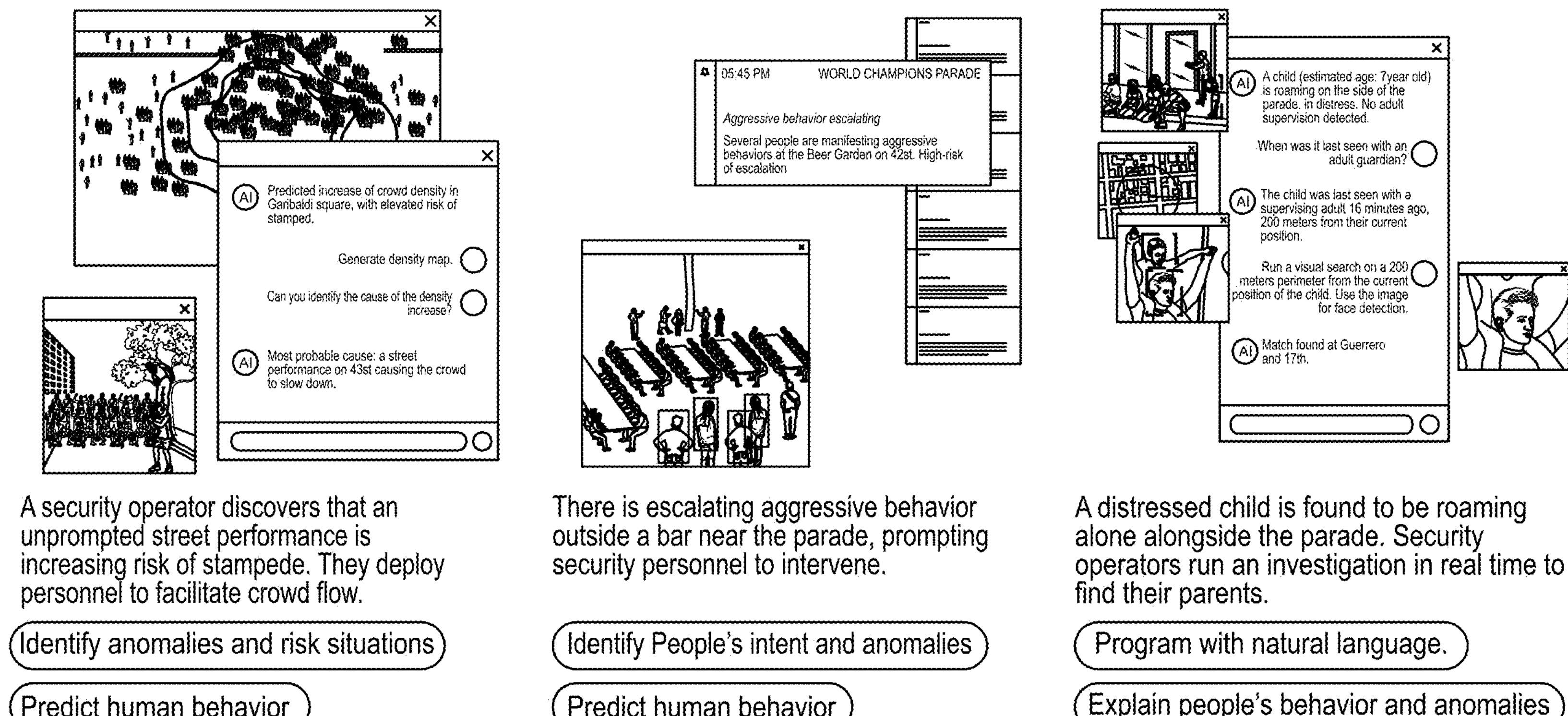
FIG. 18 illustrates a user case of keeping everyone safe at a parade, in accordance with some implementations.

FIG. 16 illustrates a user case 1600 associated with a day at a subway station, in accordance with some implementations. FIG. 17 illustrates a user case 1700 of checking drug trafficking at an airport, in accordance with some implementations. FIG. 18 illustrates a user case 1800 of keeping everyone safe at a parade, in accordance with some implementations.

Figure 19:
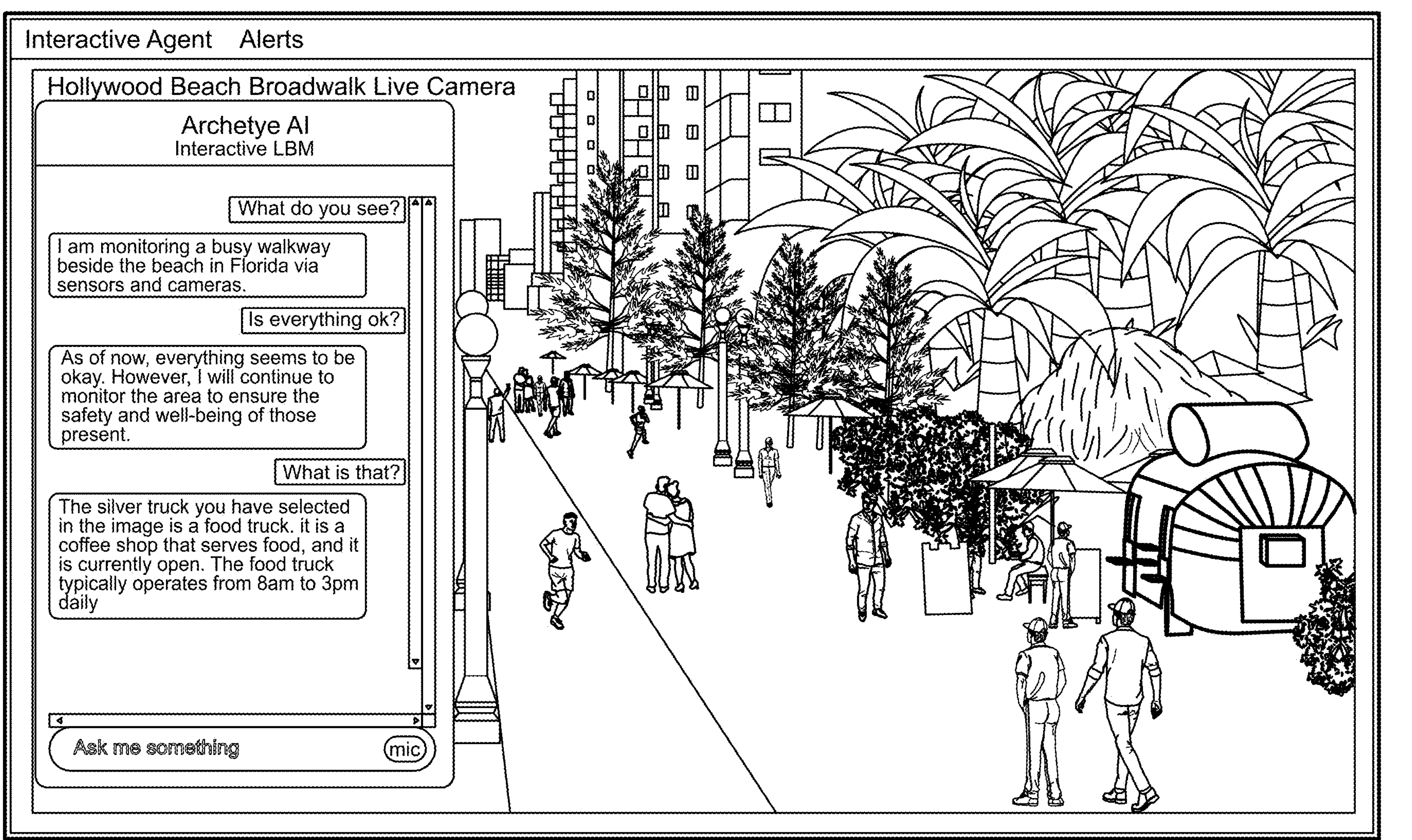
FIG. 19 illustrates a user case of monitoring safety of a street using a surveillance camera, in accordance with some implementations.

FIG. 19 illustrates a user case 1800 of monitoring safety of a street using a surveillance camera, in accordance with some implementations. In some implementations, a user query 216 includes information defining a location or an object. The LLM 150 identifies a region of interest corresponding to the location or object in the sensor data captured by a first sensor, and extracts one or more information items characterizing the sensor data associated with the region of interest.

FIGS. 20A-20C are block diagrams of example multimodal neural network platform 900A, 900B, and 900C for a data-focused customer 2002, a sensor manufacturer 2004, and an integrated sensor customer 2006, in accordance with some implementations. Referring to FIG. 20A, in some implementations, the customer 2002 is overwhelmed with unstructured data that is recorded in real time, and needs help with data analytics. The server system 106 is configured to provide a user application 324 including a sensor data processor 202 and an NN module 204 to the customer 2002 who already has sensor data 120. The user application 324 is developed using an AI SaaS Tool, and the LLM 150 is deployed to interpret the sensor data 120 and makes it accessible to a user associated with the customer. The user application 324 deploying the LLM 150 increases productivity by making it possible for non-technical team members to work effectively with sensors 102. Referring to FIG. 20B, in some implementations, the sensor manufacturer 2004 requires AI-based smart sensor solutions. The server system 106 is configured to provide a user application 324 including a sensor data processor 202 and an NN module 204 to the sensor manufacturer 2004 who sells the sensors 102. The user application 324 is used as an AI-as-a-Service and provides disruptive vertical solutions by integrating into an edge device coupled to the sensors 102 as distillation models or via cloud API. Referring to FIG. 20C, in some implementations, the customer 2006 needs to acquire both sensor hardware and associated software. The server system 106 is configured to provide a user application 324 including a sensor data processor 202 and an NN module 204 to the customer 2006 in the software sold withe sensor hardware. The user application 324 is sold with the sensors 102, and deploy the LLM 150 to interpret the sensor data 120 and make it accessible to a user associated with the customer, thereby offering a low cost commodity hardware solution and serving customer 2006 the AI Saas product. The multimodal neural network platform 900C is an affordable integrated AI solution with a natural language interface that makes it possible for anyone to collect and interpret sensor data and control devices.

FIG. 21 is a block diagram of a multimodal neural network platform 900 implemented as an AI-as-a-Service, in accordance with some implementations. The multimodal neural network platform 900A is configured to serve direct customers (e.g., a hospital), government hospitals, sensor vendors, cloud providers, and integrators.

Figure 22:
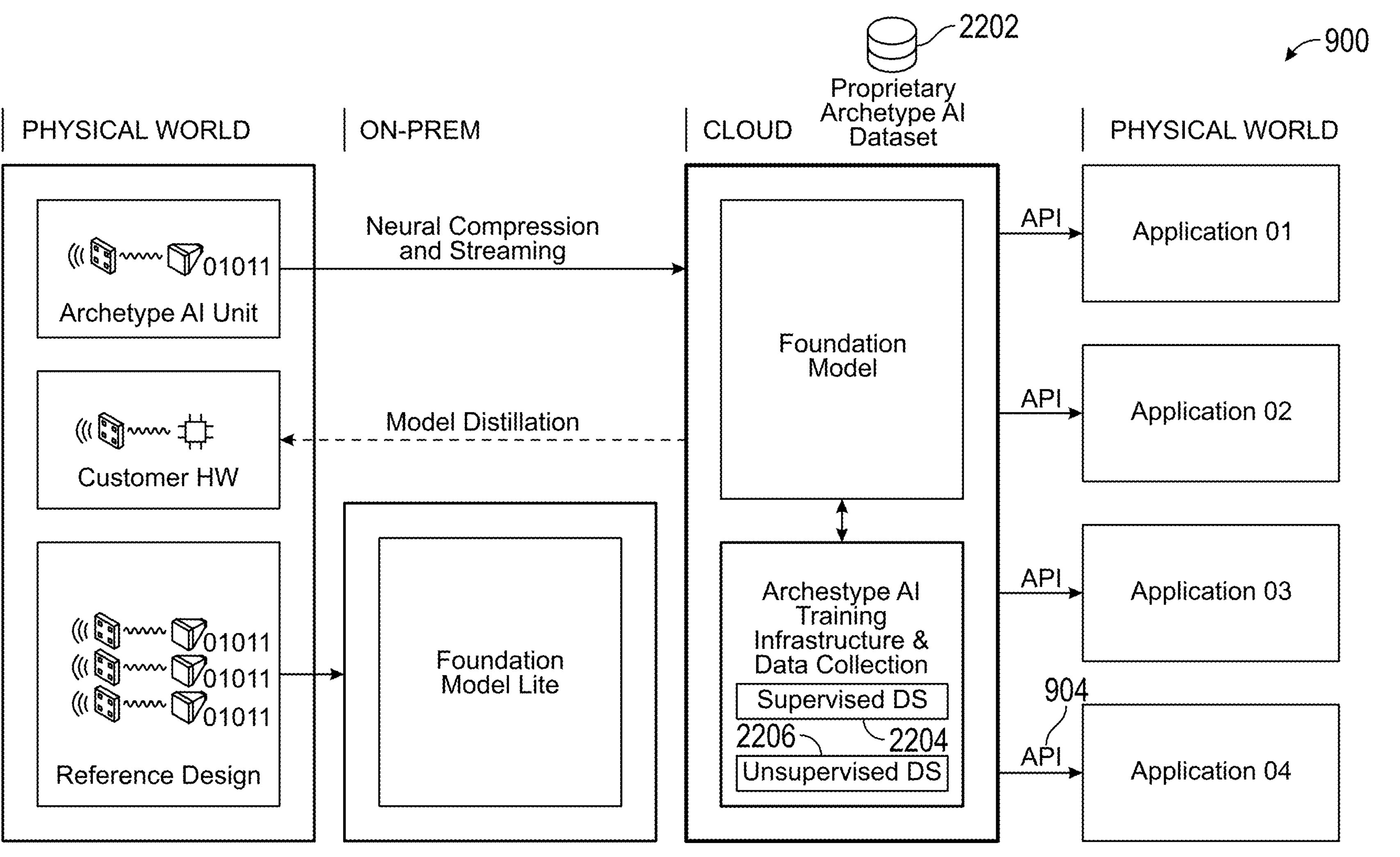
FIG. 22 is a block diagram of another example multimodal neural network platform 900, in accordance with some implementations.

FIG. 22 is a block diagram of another example multimodal neural network platform 900, in accordance with some implementations. The platform 900 is deployed differently for different customers to enable use cases at various scales. The platform 900 is distributed across edge sensor nodes, on-premises computer, and the cloud as needed. Neural compression and streaming includes continuous data compression, encoding, and streaming, and is implemented by a sensor data processor 202 (FIG. 2). The LLM 150 can continually improve while deployed. An output module 904 allows customers to interact with the LLM through client devices 104 and software.

In some implementations, the platform 900 includes a proprietary AI data set 2202 storing a subset or all of the following data:

- Supervised data 2204 (e.g., human behavioral data collected in controlled environments and labelled manually or automatically);
- Unsupervised data 2206 (e.g., unlabeled human behavioral data collected in free form environments);
- Public data (e.g., augmented proprietary data by training on public datasets, both open-source and commercial);
- Robotic data (e.g., simulated human behaviors with robots and label algorithmically); and
- Synthetic data (e.g., synthesized sensor data using human behavior simulation).

In some implementations, data stored in the proprietary AI data set 2202 is directly collected using internal resources and contractors. In some implementations, data stored in the proprietary AI data set 2202 is collected universities for research and made publicly available. In some implementations, data stored in the proprietary AI data set 2202 is collected by customers specific for their use cases and environments. In some implementations, data stored in the proprietary AI data set 2202 is collected by vendors and the third parities (e.g., companies and members of the general public).

In some implementations, the LLM 150 applied in the platform 900 is trained using the supervised data 2204 in a use case. In some implementations, the LLM 150 applied in the platform 900 is trained using a combination of the supervised data 2204 (e.g., 80%) and the unsupervised data 2206 (e.g., 20%) in a use case. In some implementations, the LLM 150 applied in the platform 900 is trained to have generalized capabilities for the user case using a combination of the supervised data 2204 (e.g., 50%) and the unsupervised data 2206 (e.g., 50%) in a use case. Data collection is expanded to a plurality of behavior classes. In some implementations, the LLM 150 is scaled to solve additional use cases across customers, such that each new customer only incurs a low incremental cost. A portion of the unsupervised data 2206 (e.g., 80%) used to train the LLM 150 exceeds a portion of the supervised data 2204 (e.g., 20%). In the above implementations, a number of sensors 102, a number of behavior classes, a number of customers, and a number of data collection sites increase, as the portion of the unsupervised data 2206 increases from 0% to a dominant portion (e.g., >75%).

Figure 23:
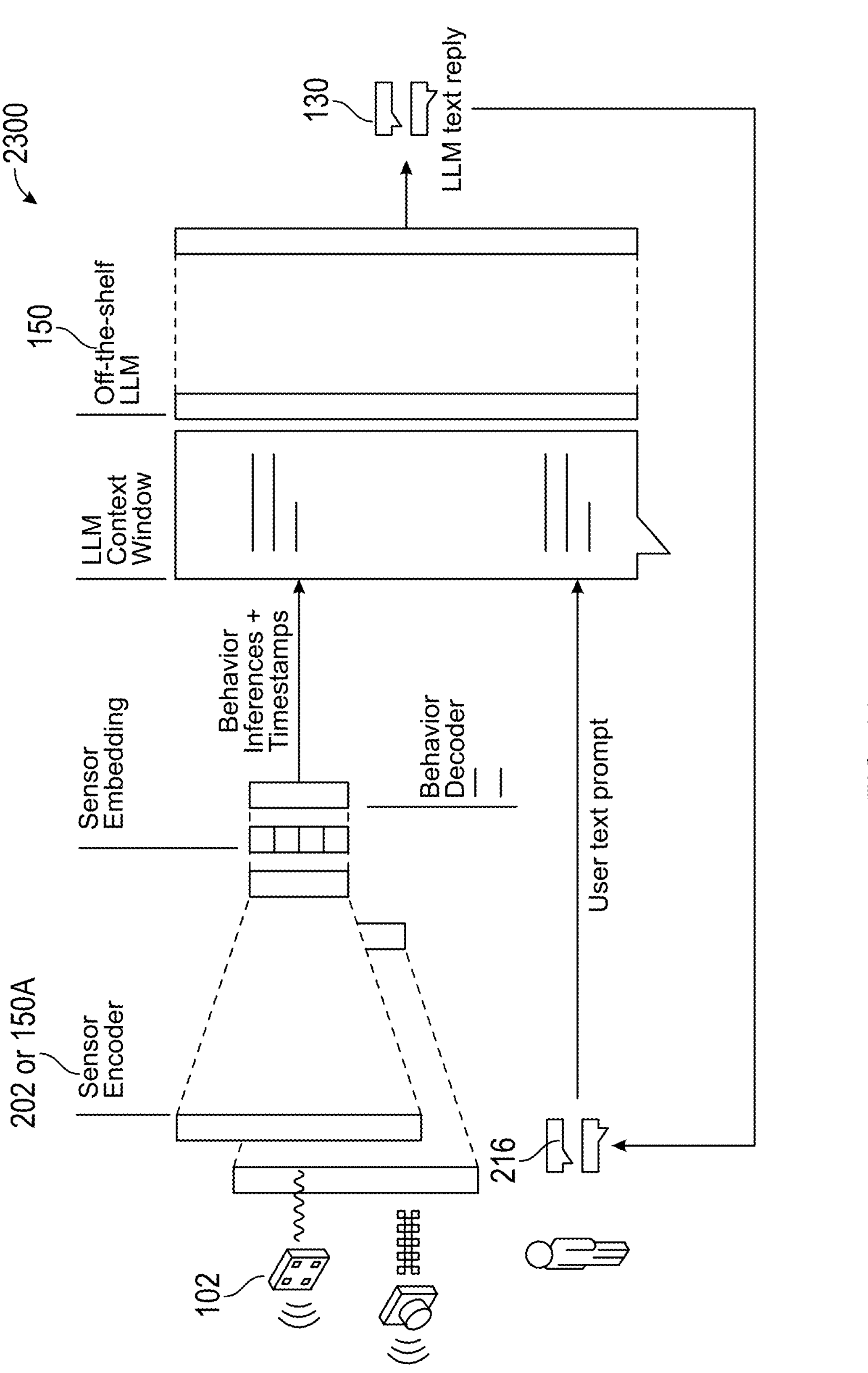
FIG. 23 is a block diagram of a neural network structure applied in an example multimodal neural network platform, in accordance with some implementations.

FIG. 23 is a block diagram of a neural network structure 2300 applied in an example multimodal neural network platform 900, in accordance with some implementations. In some implementations, the sensor data processor 202 includes a robust sensor encoder 2302. The sensor encoder 202 or 150A is paired with an off-the-shelf LLM 150. The sensor encoder 202 or 150A is pretrained using proprietary self-supervised learning techniques, then fine-tuned on supervised behavior labels (e.g. ground truth camera). The training data includes unsupervised targeted sensor data 2206 (e.g. 100 hours) and supervised training sensor data subset 2204 (e.g. 10 hours). The LLM 150 is trained independently by a provider of the LLM 150, independently of any input from the sensors 102.

Figure 24:
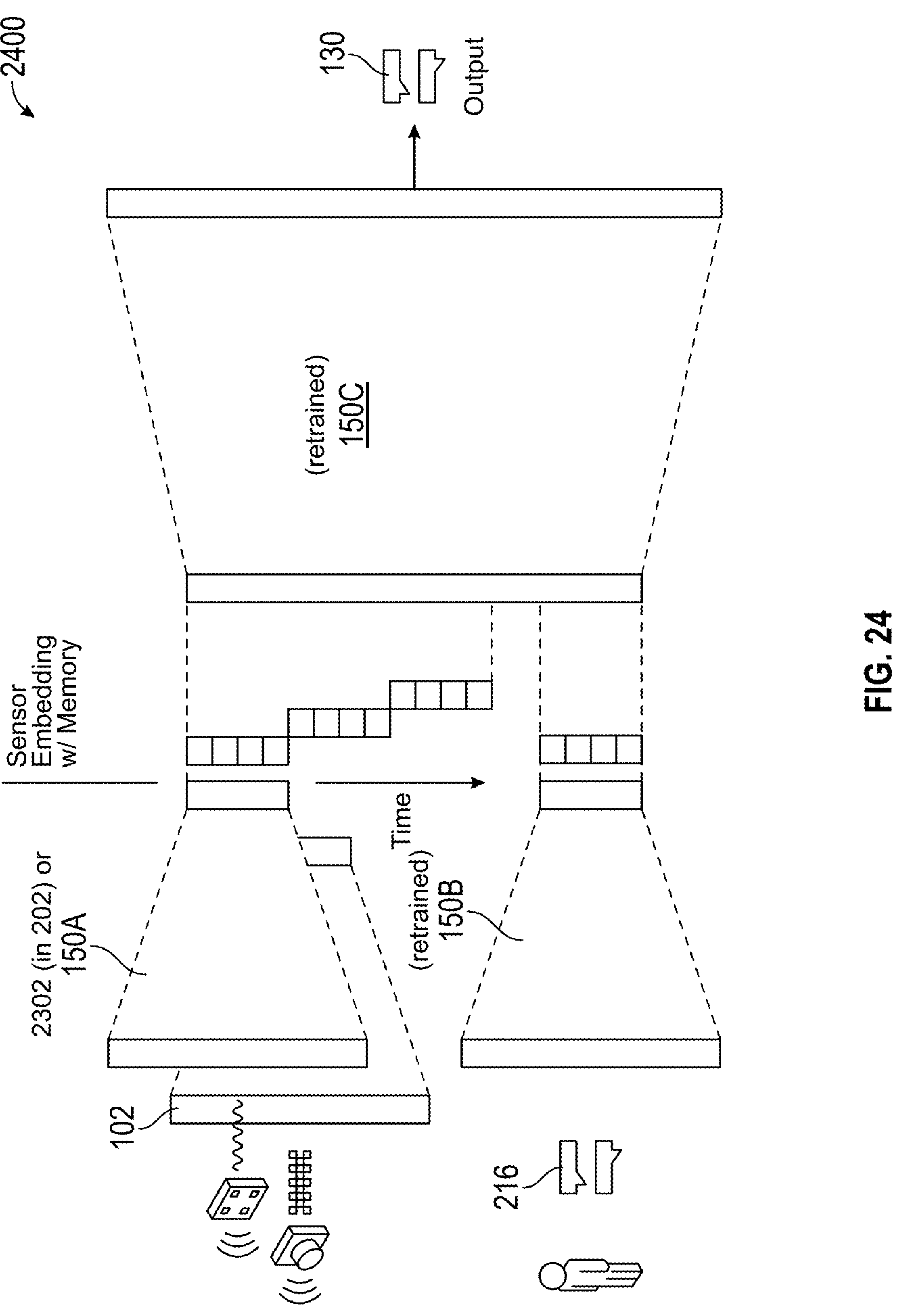
FIG. 24 is a block diagram of another neural network structure applied in an example multimodal neural network platform, in accordance with some implementations.

FIG. 24 is a block diagram of another neural network structure 2400 applied in an example multimodal neural network platform 900, in accordance with some implementations. In some situations, fundamental scaffolding of the neural network structure 2400 is established. In some situations, the neural network structure 2400 is expanded with temporal memory with summarization and decay functions. The sensor encoder 202 or 150A is pretrained on an expanded unsupervised data 2206. The LLM encoder 150B is pretrained starting from an off-the-shelf LLM 150. A foundation model decoder 150C is pretrained using same off-the-shelf LLM training data. In some implementations, all components are fine tuned as one integrated system. In an example, the training data includes unsupervised targeted sensor data 2206 (e.g. 100 hours), sensor data text pairs (e.g., 1,000), data sets (e.g., 500) of sensor data, text and ground truth, and augmented data with public, robotic, and synthetic data.

Figure 25:
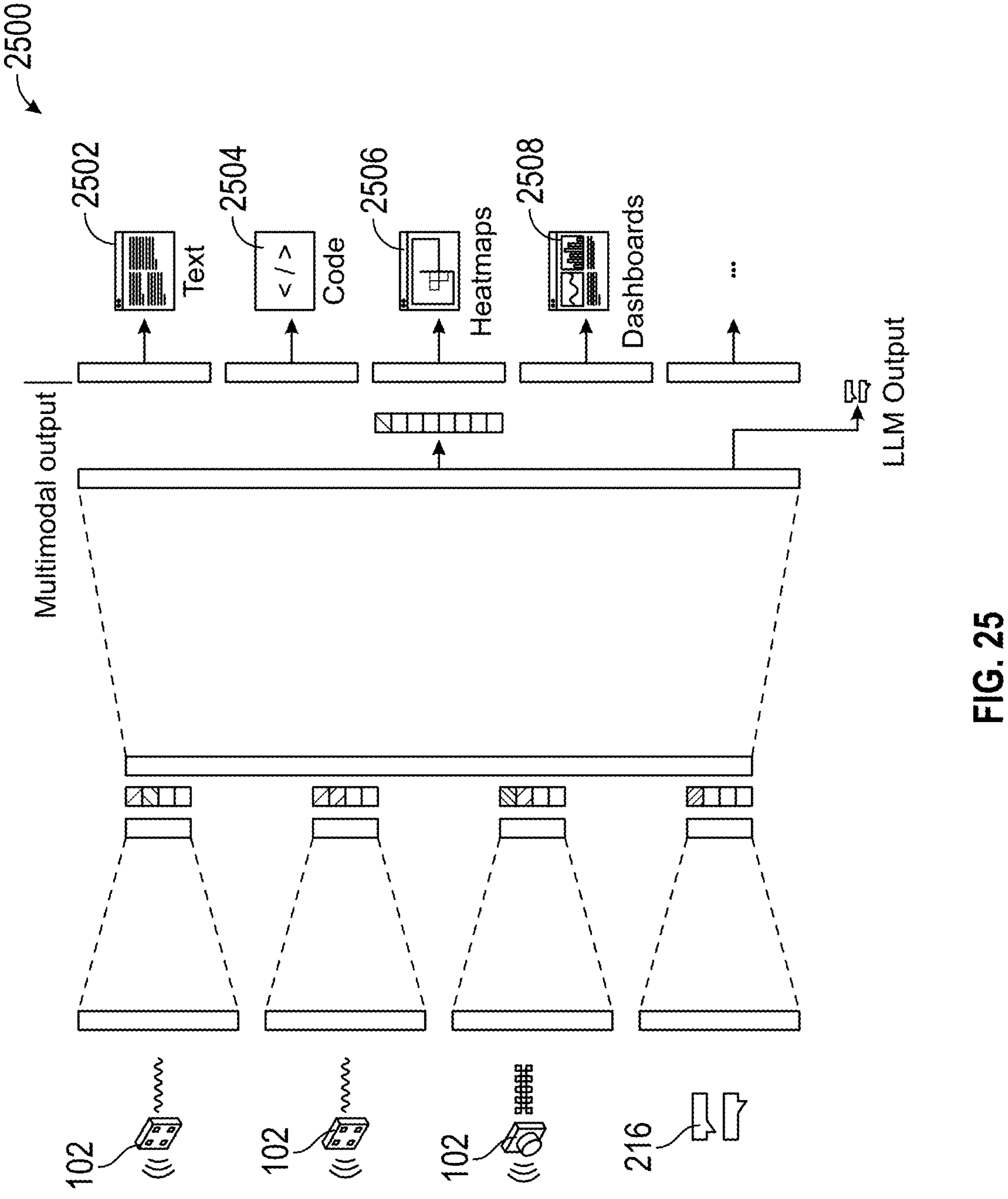
FIG. 25 is a block diagram of another neural network structure applied in an example multimodal neural network platform, in accordance with some implementations.

FIG. 25 is a block diagram of another neural network structure 2500 applied in an example multimodal neural network platform 900, in accordance with some implementations. In some situations, multimodal spatial awareness is added to the neural network structure 2500. The neural network structure 2400 is expanded with spatial awareness from multiple simultaneous locations. The sensor encoder 202 or 150A is pretrained on an expanded unsupervised data 2206. The LLM encoder 150B is pretrained starting from an off-the-shelf LLM 150. Specifically, a foundation model decoder 150C is pretrained using same off-the-shelf LLM training data. In some implementations, all components are fine-tuned as one integrated system. In an example, the training data includes unsupervised targeted sensor data 2206 (e.g. 1K-10K hours), multimodal sensor data text pairs (e.g., 10K-1,000K), data sets (e.g., 1K-10K) of sensor data, text and ground truth, and augmented data with public, robotic, and synthetic data. In some implementations, the LLM output 130 includes one or more of: textual statements 2502, a program code 2504, an information dashboard 2506 having a predefined format, a user interface, an API hook, and a heatmap 2508.

Figure 26:
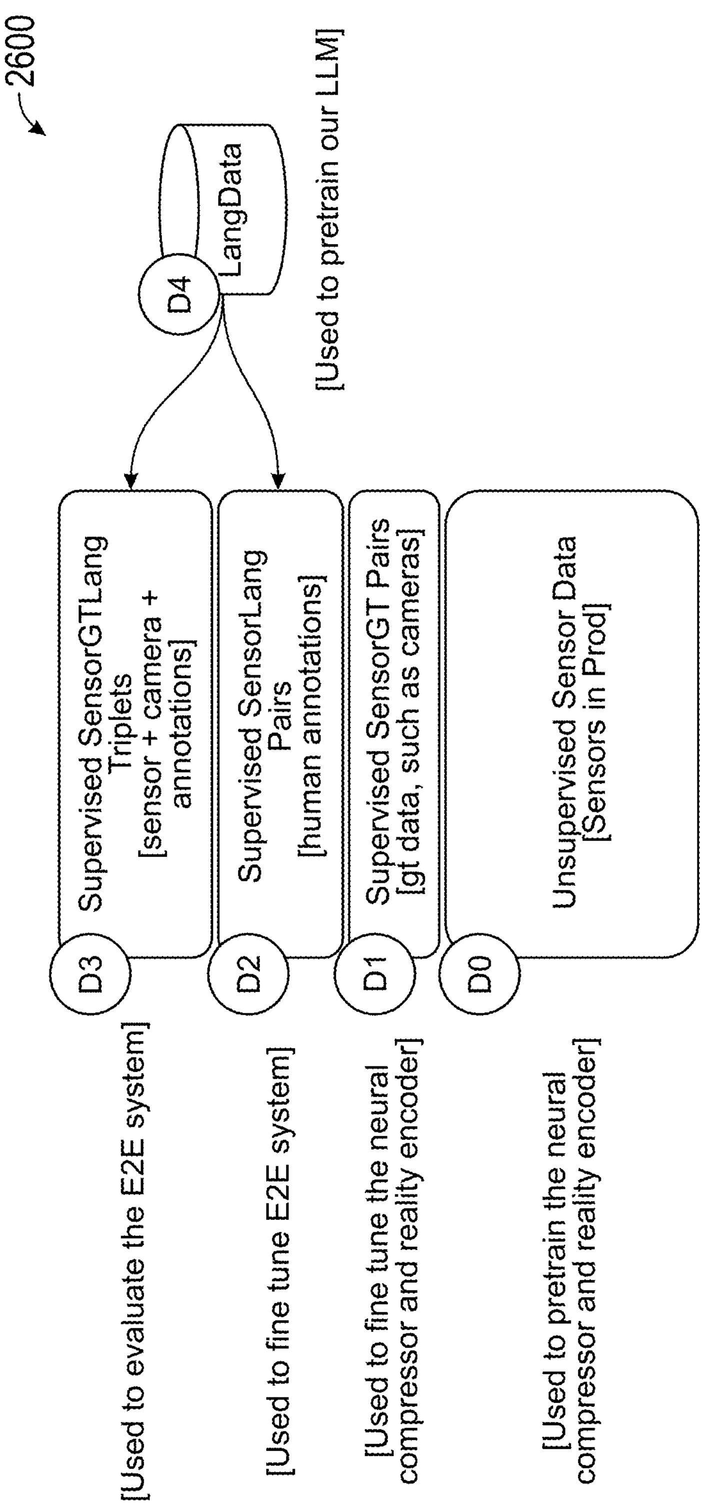
FIG. 26 is a block diagram of a database storing proprietary AI data sets, in accordance with some implementations.

FIG. 26 is a block diagram of a database 2600 storing proprietary AI data sets 2202, in accordance with some implementations. The proprietary AI data sets 2202 includes different types of data applied for different purposes during the course of establishing a multimodal neural network platform 900.

Figure 27:
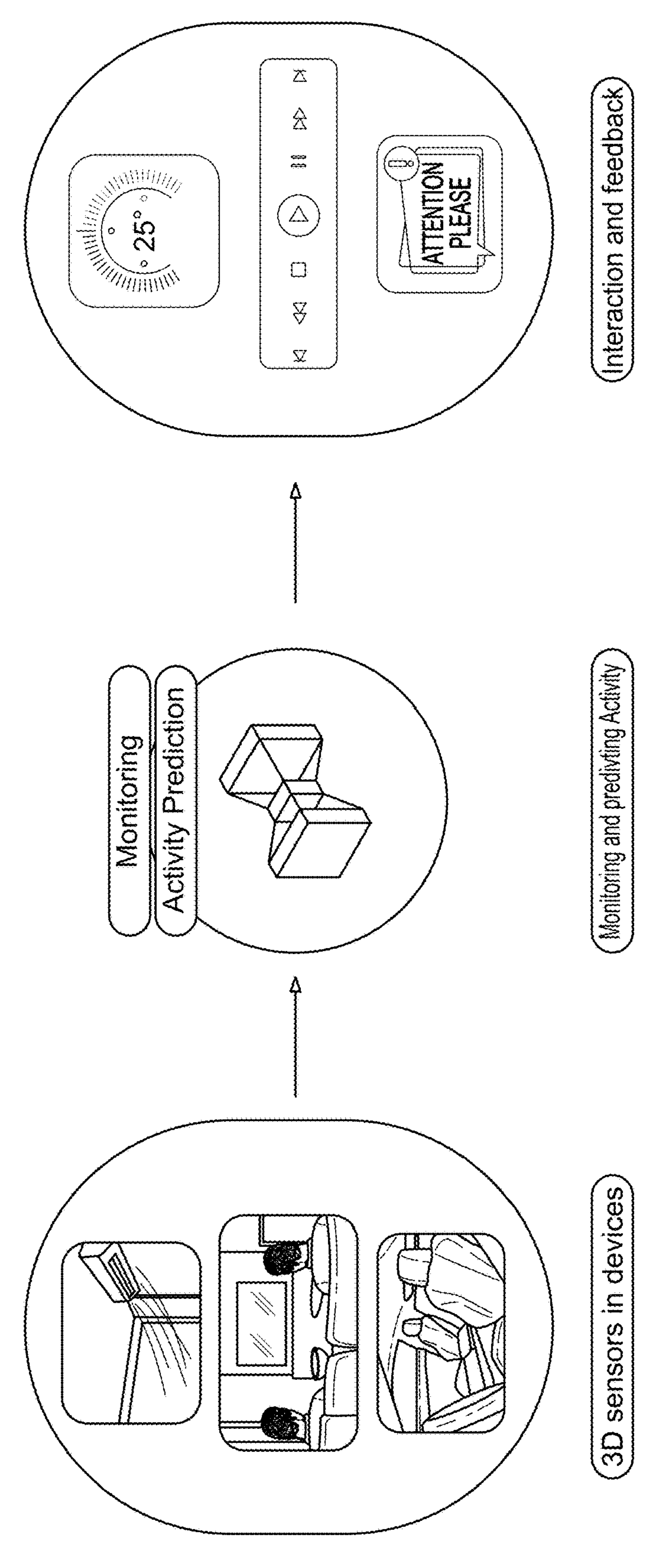
FIG. 27 illustrates a use case for monitoring for spatial computing and context AI, in accordance with some implementations.
Figure 28:
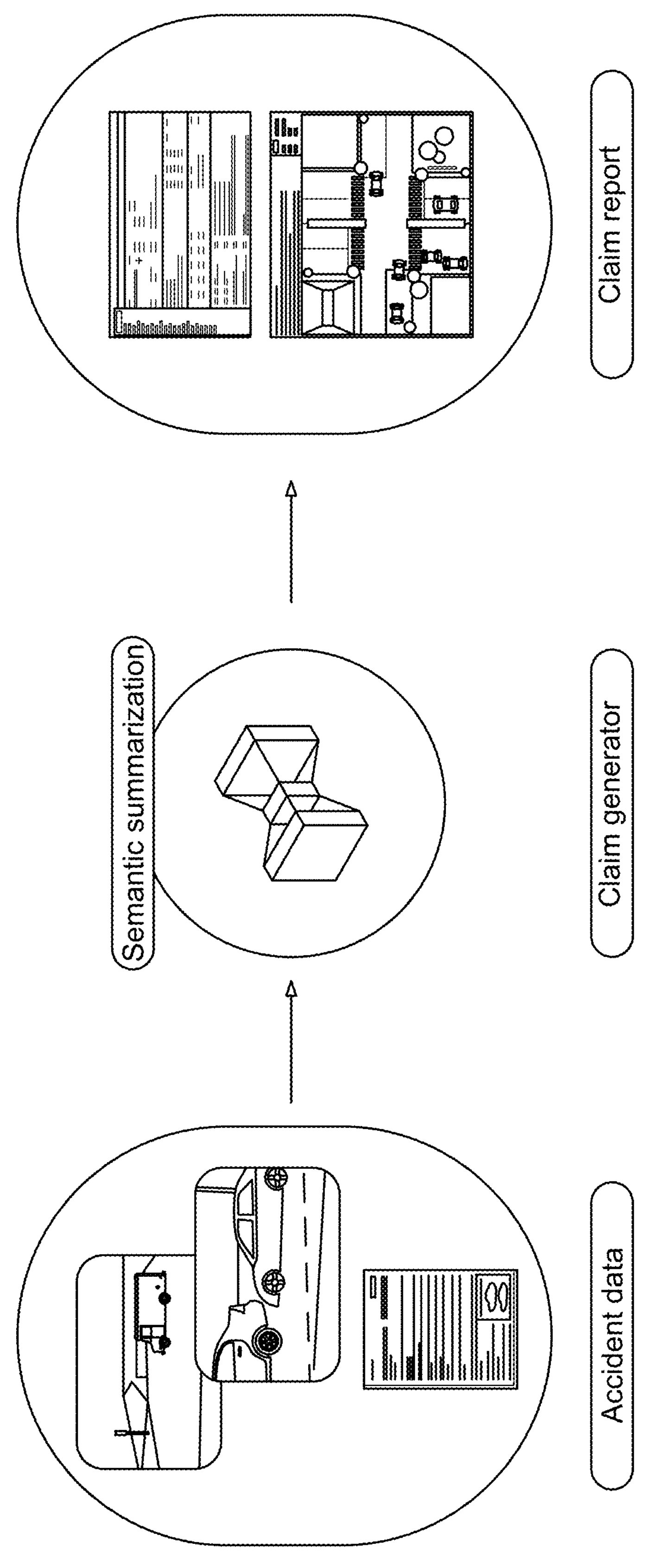
FIG. 28 illustrates a use case for generating a summary for insurance claim generation, in accordance with some implementations.
Figure 29:
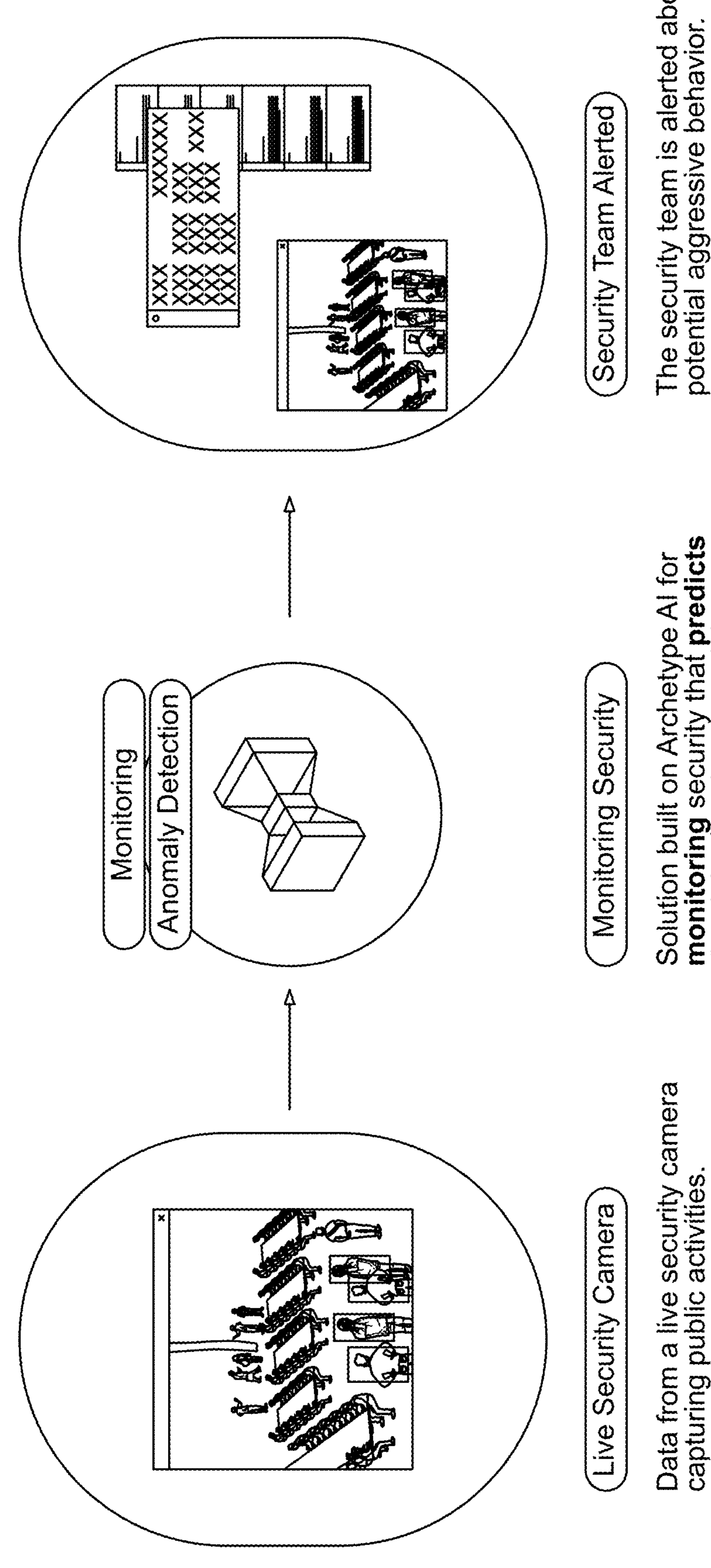
FIG. 29 illustrates a use case for detecting an anomaly in real time for security, in accordance with some implementations.

FIG. 27 illustrates a use case 926A for monitoring for spatial computing and context AI, in accordance with some implementations. FIG. 28 illustrates a use case 926B for generating a summary for insurance claim generation, in accordance with some implementations. FIG. 29 illustrates a use case 926C for detecting an anomaly in real time for security, in accordance with some implementations. These three example use cases 926 apply primitives 922 (FIG. 9B) like a formula to compose a customer use case solution. In some implementations, these use cases 926 (FIG. 9B) are linked to the agent module 940. For example, referring to FIG. 28, a summarization primitive 922A (FIG. 9B) to summarize an auto insurance claim into a claim report. The agent module 940 acts as a claim generation agent to repeatedly manage this task.

Figure 30:
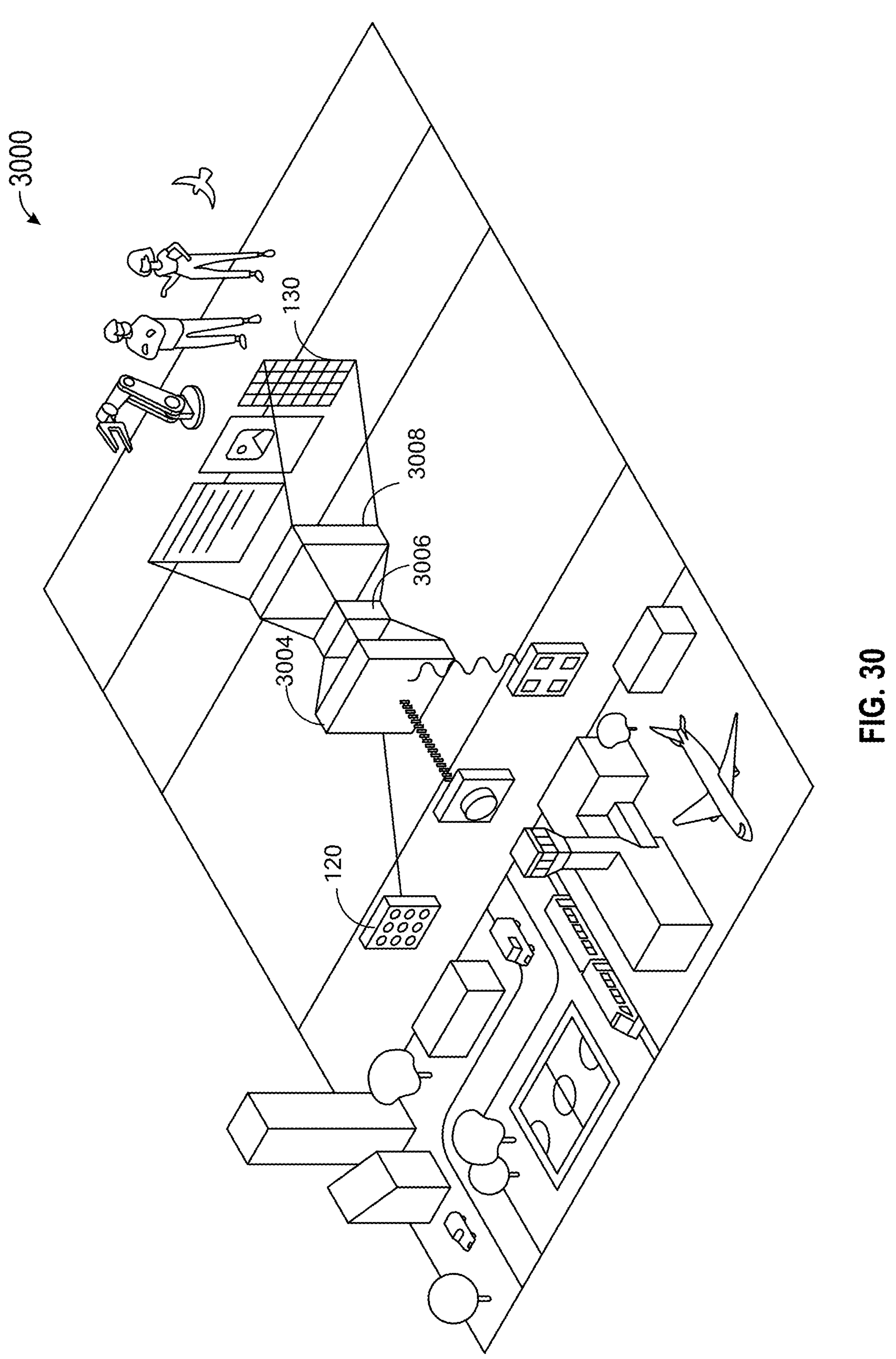
FIG. 30 is a block diagram of an example multimodal neural network platform 3000, in accordance with some implementations.

FIG. 30 is a block diagram of an example multimodal neural network platform 3000, in accordance with some implementations. The platform 3000 is implemented by a computer system (e.g., including a server system 106 (FIG. 1)) and coupled to a plurality of sensor devices 102 (FIG. 1) disposed in a physical environment. Examples of the sensor devices 102 include, but are not limited to, one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor. Each sensor device 102 is configured to measure sensor data 120 (FIG. 2), e.g., time series data including a temporal sequence of respective sensor samples, during a time duration. The platform 3000 further includes an encoder 3004, a universal embedding space 3006, and a decoder 3008. The encoder 3004 is configured to generate one or more information items 240 (FIG. 2) characterizing one or more signature events detected in the sensor data 120, e.g. independently of sensor types of the plurality of sensor devices. Stated in another way, in some implementations, the same signature event may be detected by different sensors, and is associated with the same information item 240.

The one or more information items 240 are processed in the universal embedding space 3006, e.g., in response to a natural language prompt 214 (FIG. 2), and the decoder 3008 is configured to generate a multimodal output 130 (FIG. 2) according to one of a plurality of predefined output modalities. In some implementations, the decoder 3008 includes a large behavior model (LBM). The time-series data of the sensor data 120 are represented by the information items 240 in the universal embedding space 3006 to facilitate further processing.

In some implementations, the plurality of predefined output modalities correspond to a plurality of user applications. The decoder 3008 is coupled to a plurality of Application Programming Interfaces (APIs) for connecting to the plurality of user applications and presenting the multimodal output 130. In some implementations, the multimodal output 130 includes one or more of: description, timestamp, numeral information, statistic summary, warning message, and recommended action associated with one or more signature events. In some implementations, the plurality of output modalities include one or more of: textual statements, software code, an image or video, an information dashboard having a predefined format, a user interface, a heatmap, and an API hook.

Figure 31:
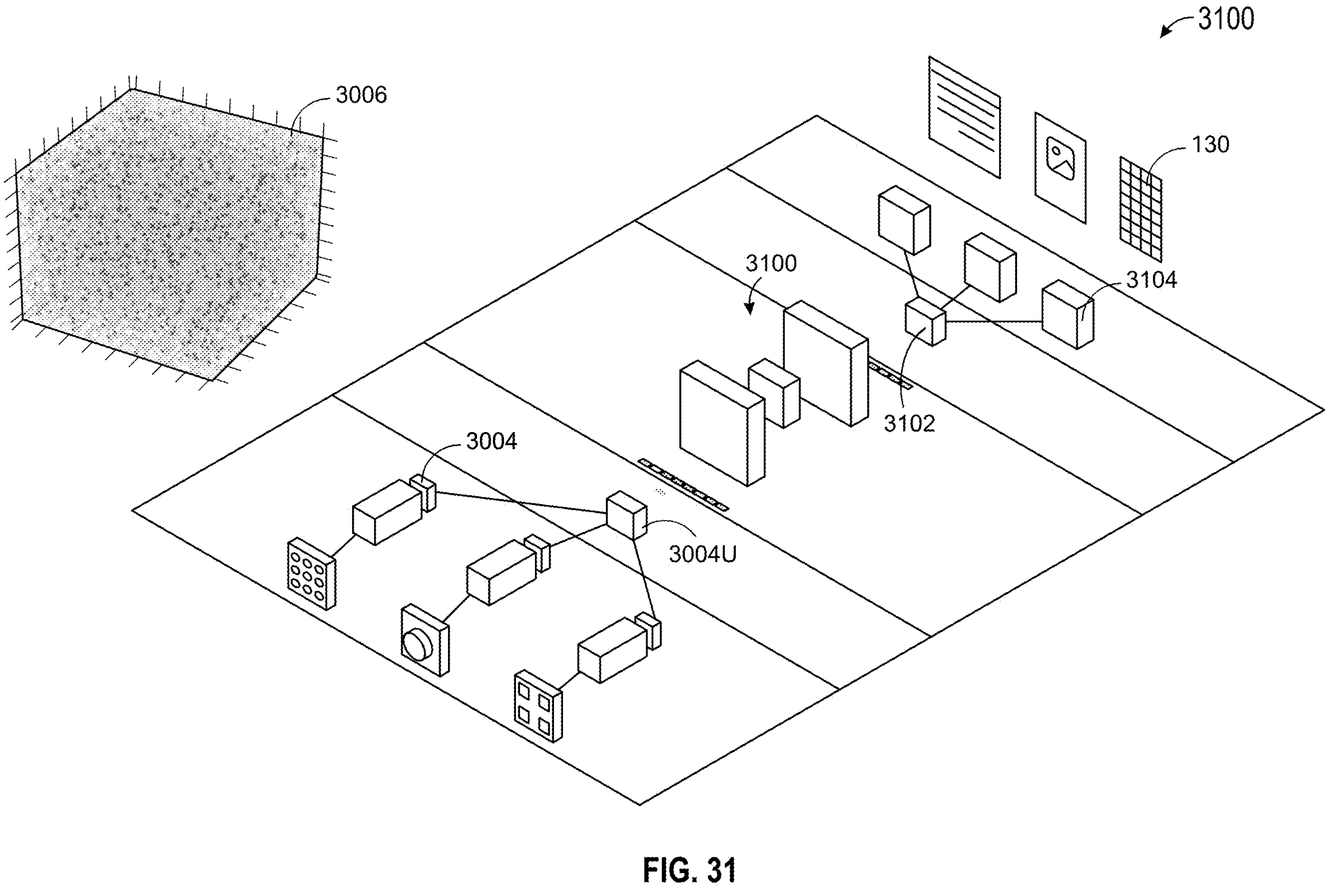
FIG. 31 is a block diagram of another example multimodal neural network platform 3000, in accordance with some implementations.

FIG. 31 is a block diagram of another example multimodal neural network platform 3000, in accordance with some implementations. The platform 3000 combines a plurality of sensor data streams 102 into one or more information items 240 characterizing the one or more signature events detected in the sensor data 120, independently of the sensor types of the plurality of sensor devices 102. The information items 240 form a single compressed representation of the physical world, and are updated in real-time. In some implementations, the platform 3000 includes a universal time series encoder 3004 configured to learn directly from sensor data 120 to understand common underlying structures of time-varying physical signals. The universal time series encoder 3004 may be applied to new sensor types and domains for which the encoder 3004 has not been trained.

In some implementations, the sensor data 120 include time series data having numerical patterns that are repeated in different sensor types of the plurality of sensor devices 102. The universal time series encoder 3004 may be trained based on a cross-modal and cross-domain corpus of data. Further, semantic meaning of time series data is modality-specific. The universal time series encoder 3004 is fine-tuned for each sensor type in order to align embeddings of different sensor types with the universal embedding space 3006. For example, a training signal is paired with an information item (e.g., text describing a signature event) or an anchor modality (e.g., a sensor type) and used to train the encoder 3004 for each modality. More specifically, in some implementations, a foundation time series encoder is trained, e.g., based on a large amount of training data. For each device type, the foundation time series encoder is further trained with a small amount of specific semantic data, and can be conveniently re-configured to infer data for a sensor device 102 having the respective device type. By these means, the encoder 3006 does not need to be trained as an entirely new encoder for each device type of a time series sensor device 102, thereby conserving resources for machine learning. More details on the encoder 3004 are discussed below with respect to FIGS. 32A, 32B, and 33A-33C.

In some implementations, when sensor data 120 are converted into sensor-agnostic physical world insights (e.g., information items 240), the platform 300 projects real time sensor data 120 to a single compressed mathematical representation of the physical world that is updated in real time. This sensor abstraction allows the platform 3000 to fuse a large number of sensors 102, including new sensors for which the encoder 3004 has not been trained. In some implementations, inputs and outputs of the universal embedding space 3006 include universal tokens corresponding to discrete representations of the universal embedding space 3006, enabling the platform 3000 to support both multimodal sensor data 120 and a multimodal output 130, such as text, visualizations, or machine code. The universal embedding space 3006 is aligned with natural language, and enables the platform 3000 to reason and fuse sensor data 120 with semantic knowledge across space and time.

In some implementations, the encoder 3004, the universal embedding space 3006, the decoder 3008 are trained jointly as an encoder-decoder model, designed to transform a sequence of universal tokens representing low-level sensor signals into a new sequence of universal tokens representing human-interpretable meaning. In some implementations, data from open-source LLMs are applied as a seed for the model's text modality during training of the encoder-decoder model. The model's capacity goes beyond language tokens to learn our Universal Tokens, followed by fine-tuning on a wide range of proprietary physical AI tasks. This results in a single foundation model that customers can use out-of-the-box or additionally fine-tune for their custom use cases.

In some implementations, the platform 3000 leverages the universal embedding 3006 to fuse sensors 102 across space and time, combining this with semantic reasoning to transform signals into customer value. The platform 3000 proposes a "semantic lens" interaction metaphor for physical AI. A semantic lens encapsulates specific functionality that customers want the AI to perform. It is defined by the customer using a natural language prompt 214 (FIG. 2) to specify what the platform 3000 should focus on in the physical world and how it should interpret sensor data, e.g. "monitor for anomalies" or "describe what is happening." Once set up, the semantic lens continuously monitors sensor streams and provides output 130 to the customer as a stream of insights, suggestions, and actions. Multiple lenses can be set up at the same time. The customer can further "re-focus" semantic lenses on-the-fly by changing the prompt 214 or "focus" of the lens.

In some implementations, an encoder 3004 encodes sensor data 302 (e.g., time series data) into a common representation. Sensor data 302 or natural language prompt 214 are compressed into a single mathematical representation with a universal token encoding in a universal embedding space 3006, allowing universal tokens to be used as inputs and outputs in an LBM 3100. The LBM 3100 fuses spatiotemporal sensor data with semantic knowledge, transforming signals into semantic meaning (e.g., represented by a multimodal output 130 having one of a plurality of predefined output modalities). In some embodiments, universal output tokens 3102 are parsed and sent to custom multimodal rendering modules 3104 (e.g., APIs associated with user applications), allowing the LBM 3100 to dynamically output multiple modalities.

In some implementations, unsupervised training is applied to the LBM 3100 based on a vast dataset of universal tokens, which is represented as follows:

$$-\sum_{n-1}^{N}\sum_{k=1}^{K} p(y_{nk}) \log p(\hat{y}_{nk}) \quad (1)$$

The dataset includes temporal sequences of sensor samples provided by different types of sensors 102, and does not include truth labels. The temporal sequences of sensor samples may not be synchronized or result in a task-specific multimodal output.

In some implementations, supervised training is applied to the LBM 3100. The LBM 3100 may be fine-tuned using a set of physical AI tasks. Templated outputs may be applied to mitigate hallucinations of the LBM 3100. Supervised training of the LBM 3100 requires explicit ground truth targets, explicit language and sensor pairs, synchronized multimodal input (e.g., sensor data 102), and task-specific multimodal output 130.

Figure 32A:
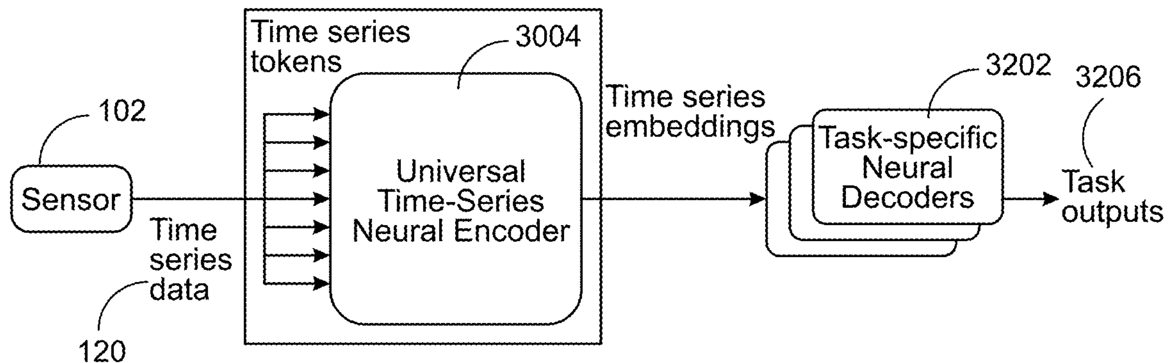
FIG. 32A is a block diagram of a sensor data processing system, in accordance with some implementations.
Figure 32B:
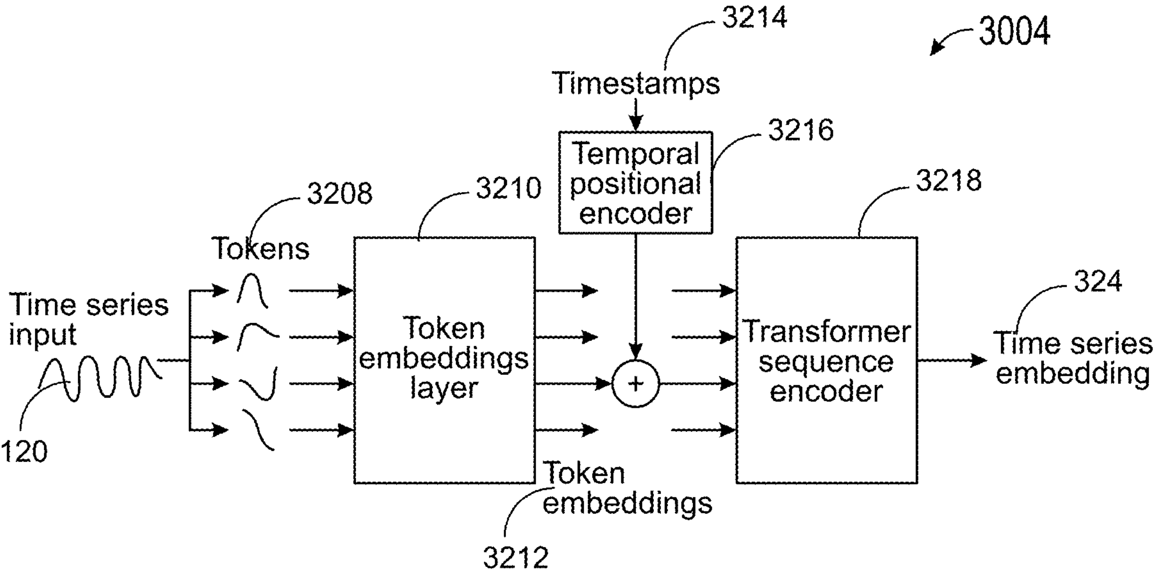
FIG. 32B is a block diagram of an example universal time series encoder, in accordance with some implementations.

FIG. 32A is a block diagram of a sensor data processing system 3200, in accordance with some implementations, and FIG. 32B is a block diagram of an example universal time series encoder 3004, in accordance with some implementations. The sensor data processing system 3200 includes a universal time series encoder 3004 and one or more decoders 3202. The universal time series encoder 3004 obtains sensor data 120 (e.g., time series data) from a plurality of sensor devices 102, and generates time series embeddings 3204. The one or more decoders 3202 are coupled to the universal time series encoder 3004, and configured to generate task outputs 3206 based on the time series embeddings 3204. In some implementations, each decoder 3202 is specific to a respective task, independently of a sensor type of a respective sensor device 102 associated with the sensor data 120 inputted to the encoder 3004.

The universal time series encoder 3004 learns directly from sensor data 102 to understand the common underlying structures of time-varying physical signals. Referring to FIG. 32B, in some implementations, a time series input is divided into a plurality of tokens 3208, each token 3208 may include a respective temporal sequence of sensor samples 3208. For each sensor device 120, a token 3208 is processed by a token embedding layer 3210 to generate token embeddings 3212 defining a respective parametric representation of the token 3208. For example, the temporal sequence of respective sensor samples 3208 is processed to generate an ordered sequence of respective sensor data features corresponding to the token embeddings 3212 defining the respective parametric representation of the temporal sequence of respective sensor samples, independently of a sensor type of the respective sensor device 120. Each token 3208 is associated with a respective timestamp 3214 by a temporal positional encoder 3216. The token embeddings 3210 and associated timestamps are processed by a transformer sequence encoder 3218 to generate the time series embedding 3204.

In some embodiments, each token 3208 corresponds to a distinct segment of sensor samples. Stated another way, the sensor data 102 is segmented to a plurality of segments of sensor samples. Each segment can be conveniently represented by a respective parametric representation constructed based on the ordered sequence of respective sensor data features (e.g., token embeddings 3212). In some embodiments, each segment has a fixed number of sensor samples. Alternatively, in some embodiments, each segment is dynamically extracted from the sensor data 102, e.g., based on a temporal curvature of the sensor data 102 corresponding to the second derivative of the sensor samples with respect to time. For example, in accordance with a determination the temporal curvature changes its sign (e.g., from positive to negative) at a first time, the sensor data 120 are segmented at the first time.

In some implementations, the temporal sequence of respective sensor samples 3208 are received at an input of a sensor data encoder model (e.g., an encoder 3004), which generates the ordered sequence of respective sensor data features (e.g., token embeddings 3212) based on at least the temporal sequence of respective sensor samples. Further, in some implementations, temporal data (e.g., timestamps 3214) are further received at the input of the sensor data encoder model jointly with the temporal sequence of respective sensor samples 3208. The temporal data include one or more of: a sequence of time stamps 3214, a temporal length of the time duration, and a sampling rate of the temporal sequence of respective sensor samples. In some implementations, the sensor data encoder model is applied based on a mathematical representation, independently of a type of each of the one or more sensor devices 102.

In some implementations, the respective parametric representation is a combination of a subset of: a polynomial curve, a linear curve, a logarithmic curve, an exponential curve, a power-law curve, a sigmoid or logistic curve, a Gaussian (normal) curve, and a spline curves, a Fourier series, a rational functions, and a hyperbolic curve In some implementations, the respective parametric representation includes an N-th degree polynomial representation having the highest power of a sampling time equal to N, where N is a positive integer, and the ordered sequence of respective sensor data features corresponding to the token embedding 3210 includes N+1 data features each of which corresponds to a distinct coefficient of the N-th degree polynomial representation. Stated in another way, each token 3208 is associated with a respective polynomial representation as defined by the respective token embeddings 3210. As such, the universal time series encoder 3004 may be applied independently of sensor types and domains, e.g., to some sensor types or domains that were not used in training.

In an example, a time duration associated with a respective temporal sequence of sensor samples 3208 corresponds to a large number of samples (e.g., >1,000 samples). The samples 3208 are fitted by the parametric representation, which is represented by the ordered sequence of respective sensor data features having a smaller number of features (e.g., 10-20 features). Sensor samples measured by the same sensor device 102 during time durations having different lengths may be represented by the same number of features, so are sensor samples measured by different types of sensor devices having different sampling rates during the same time durations. Application of these sensor data features facilitate further processing to generate the one or more information items 240 in the universal embedding space 3006. By these means, computation and storage of the temporal sequence of sensor samples 3208 are simplified, and resources are conserved during the course of managing the large number of samples obtained for different time durations.

In other words, in some implementations, the encoder 3004 includes a neural network (e.g., a token embedding layer 3210) that converts sensor data streams into a common mathematical representation (also broadly called a parametric representation). The parametric representation is defined by the token embeddings 3212 (also called sensor data features), and operated upon to extract meaning or perform tasks (e.g., generate the one or more information items 240 characterizing the one or more signature events detected in the sensor data). This encoder 3004 can analyze any physical time series sensor data 102, e.g. measured by radars, accelerometers, chemical sensors, and so on. This encoder 3004 solves one of the most critical problems of AI deployment in the physical world, when the encoder 3004 uses a parametric representation to unify the wide diversity of sensor device, thereby making the LBM applicable to every sensor type and use case.

In some implementations, the encoder 3004 can analyze sensor data 102 obtained from a sensor device 102, independently of whether training of the encoder 3004 has been implemented for the sensor device 102. For example, the encoder 3004 was never trained on predicting household electrical consumption, and may correctly predict household electrical consumption. This dramatically simplifies and accelerates deployment of AI solutions in the physical world, and opens AI use cases to customers with unique sensor requirements.

In some implementations, temporal structure of physical data is modality-agnostic. Given neighboring or preceding data points, the conditional probability of an unknown data point is common across modalities. A single foundation encoder 3004 may be pre-trained on a cross-modal/cross-domain corpus of data. No new encoder 3004 is trained from scratch for every kind of time series sensor device 102. In some implementations, numerical patterns in time series data are modality-agnostic. Semantic meaning of time series data is modality-specific. The physical behavior underlying the numerical data depends on the physical source of data. For example, accelerometer data and camera data corresponding to a person walking may be different from each other.

FIG. 33 is a flow diagram of an example method 3300 for compressing sensor data, in accordance with some implementations. In some implementations, the method 3900 is governed by instructions that are stored in a non-transitory computer readable storage medium and are executed by one or more processors of a computer system (e.g., a server system 106). Each of the operations shown in FIG. 33 may correspond to instructions stored in the computer memory or computer readable storage medium (e.g., the memory 306 in FIG. 3) of the computer system. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 3300 may be combined and/or the order of some operations may be changed.

The computer system obtains (operation 3302) the sensor data 120 from a plurality of sensor devices 102 disposed in a physical environment during a time duration. Each sensor device 102 corresponds (operation 3304) to a temporal sequence of respective sensor samples. For each of the plurality of sensor devices 102, the computer system processes (operation 3306) the temporal sequence of respective sensor samples to generate an ordered sequence of respective sensor data features defining a respective parametric representation of the temporal sequence of respective sensor samples, independently of a sensor type of the respective sensor device 102. The computer device detects (operation 3308) one or more signature events within the time duration based on the respective parametric representations of the plurality of sensor devices 102. The computer system generates (operation 3310) one or more information items 240 characterizing the one or more signature events detected in the sensor data 120.

In some implementations, the computer system receives the temporal sequence of respective sensor samples (e.g., corresponding to a token 3208 in FIG. 32B) at an input of a sensor data encoder model (e.g., encoder 3004 in FIG. 30), which generates the ordered sequence of respective sensor data features (e.g., token embeddings 3212 in FIG. 32B) based on at least the temporal sequence of respective sensor samples. Further, in some implementations, the computer system receives temporal data (e.g., timestamps 3214 in FIG. 32B) at the input of the sensor data encoder model jointly with the temporal sequence of respective sensor samples. The temporal data include one or more of: a sequence of time stamps, a temporal length of the time duration, and a sampling rate of the temporal sequence of respective sensor samples. In some implementations, the sensor data encoder model (e.g., encoder 3004 in FIG. 30) is applied, independently of a sensor type of each of the one or more sensor devices 102.

In some implementations, the respective parametric representation includes an N-th degree polynomial representation having the highest power of a sampling time equal to N, where N is a positive integer, and the ordered sequence of respective sensor data features includes N+1 data features each of which corresponds to a distinct coefficient of the N-th degree polynomial representation.

In some implementations, the sensor data 120 includes a temporal sequence of sensor data 120. The computer system obtains a stream of context data measured continuously by the plurality of sensor devices 102. The stream of context data includes the temporal sequence of respective sensor samples that are grouped for each sensor device 102 based on a temporal window that is configured to move with a time axis. The computer system associates each sensor data 120 item of the temporal sequence of sensor data 120 with a respective timestamp and a subset of respective sensor samples that are grouped based on the temporal window.

In some implementations, the computer system stores, in the memory (e.g., memory 306 in FIG. 3), the one or more information items 240 associated with the one or more signature events, the one or more information items 240 including a timestamp and a location of each of the one or more signature events.

In some implementations, a universal event projection model (e.g., model 3004U in FIG. 31) is applied to process the respective parametric representations of the plurality of sensor devices 102 and generate the one or more information items 240 characterizing the one or more signature events. In some implementations, each of the respective parametric representations is associated with a sensor tag indicating a type of a respective sensor device, and the respective parametric representations are inputted into the universal event projection model jointly with the sensor tag of each of the plurality of sensor devices 102 in a predefined data format. In some implementations, the respective parametric representations of the plurality of sensor devices 102 are inputted into the universal event projection model in a predefined order determined based on respective types of the respective sensor devices 102 (e.g., without using sensor tags).

In some implementations not shown, for each of a subset of the plurality of sensor devices 102, an individual projection model is applied to process the respective parametric representation and generate a subset of the one or more information items 240.

In some implementations, for a temporal window corresponding to a subset of sensor data 120, the computer system detects the one or more signature events by using machine learning to process the subset of sensor data 120 within the respective temporal window and detect one or more signature events.

In some implementations, the plurality of sensor devices 102 include one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor.

In some implementations, the computer system stores the ordered sequence of respective sensor data features or the one or more information items 240 in a database, in place of the sensor data 120 obtained from the plurality of sensor devices 102. Further, in some implementations, after obtaining the sensor data 120, the computer system processes the sensor data 120 to generate one or more sets of intermediate items successively and iteratively, until generating the one or more information items 240. Additionally, in some implementations, the computer system processes the sensor data 120 to generate a first set of intermediate items at a first time, stores the first set of intermediate items in the database, processes the first set of intermediate items to generate one or more second sets of intermediate items successively at one or more successive second times following the first time, successively stores the one or more second sets of intermediate items in the database, deletes the first set of intermediate items from the database, and processes a most recent intermediate set of the one or more second sets of intermediate items to generate the one or more information items 240 at a third time following the one or more successive second times.

In some implementations, the computer system applies a large behavior model to process the one or more information items 240 and generate a multimodal output 130 associated with the sensor data 120. The multimodal output 130 describes the one or more signature events associated with the sensor data 120 in one of a plurality of predefined output modalities.

In some implementations, the large behavior model includes a large language model (LLM).

In some implementations, the multimodal output 130 includes one or more of: description, timestamp, numeral information, statistic summary, warning message, and recommended action associated with one or more signature events.

In some implementations, the plurality of predefined output modalities include one or more of: textual statements, software code, an image or video, an information dashboard having a predefined format, a user interface, and a heatmap.

Figure 34A:
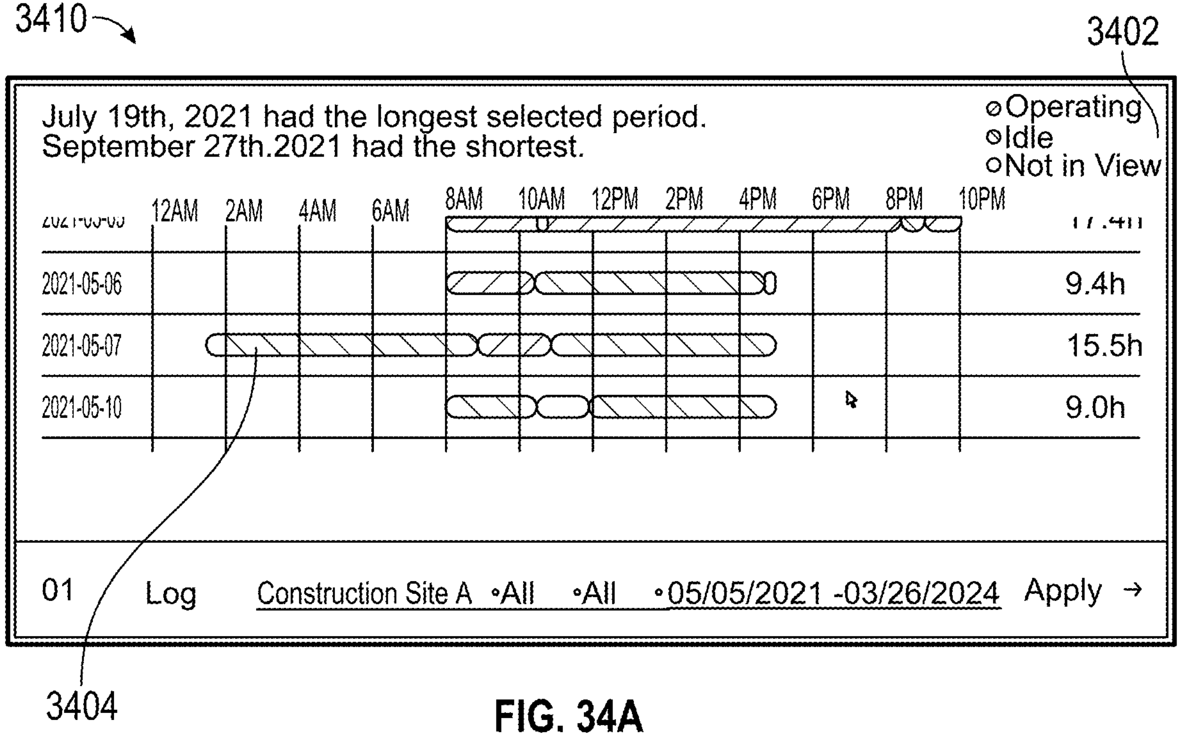
FIGS. 34A-34D are example user interfaces for remote site management, in accordance with some implementations.
Figure 34B:
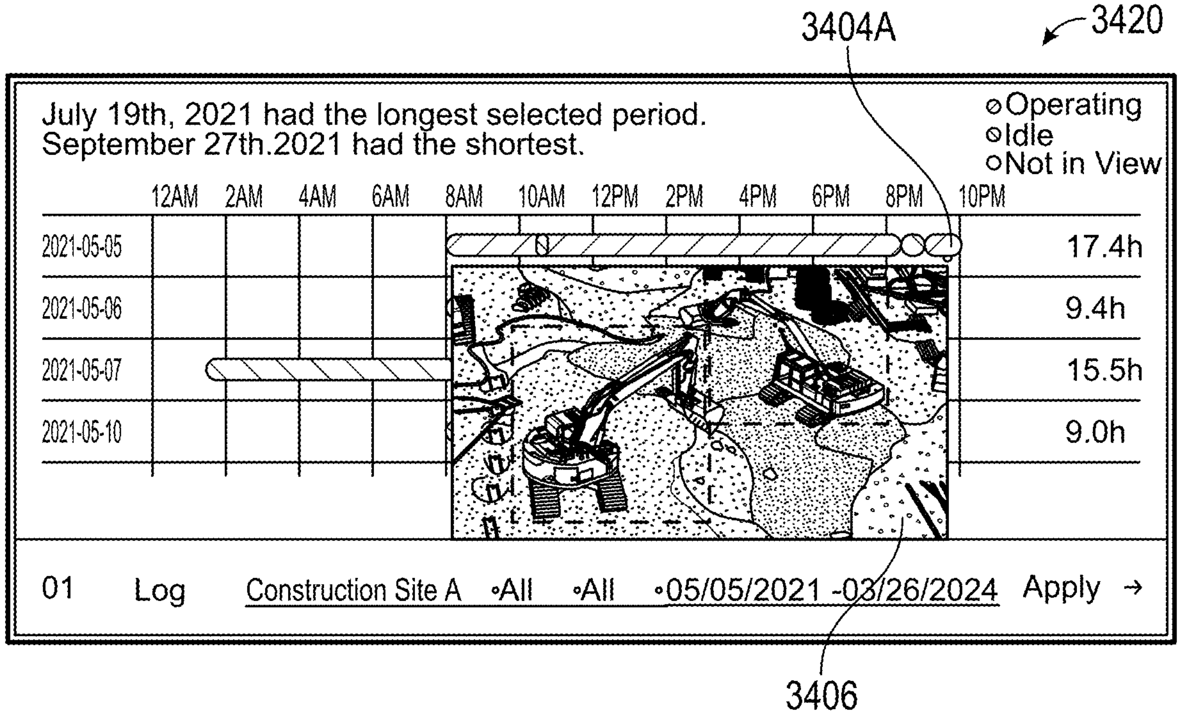
Figure 34C:
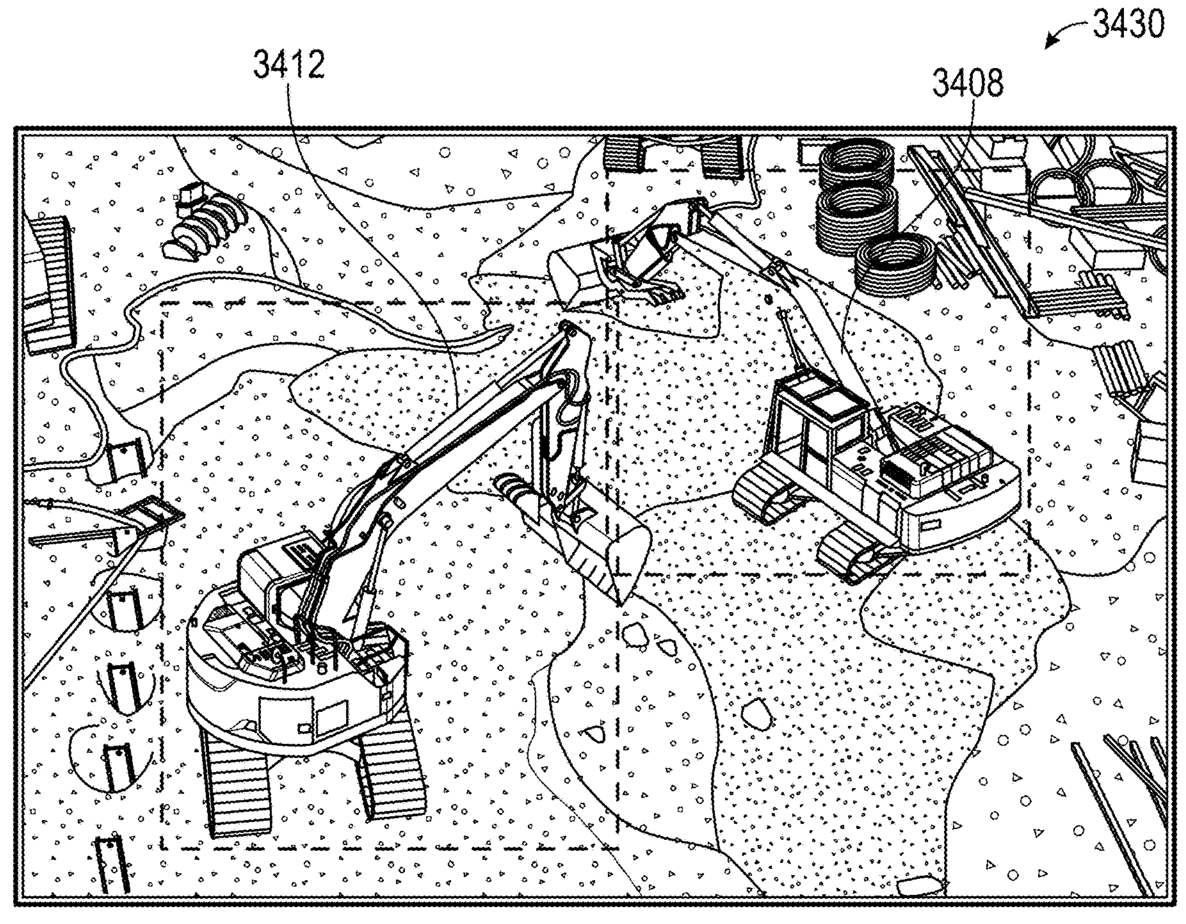
Figure 34D:
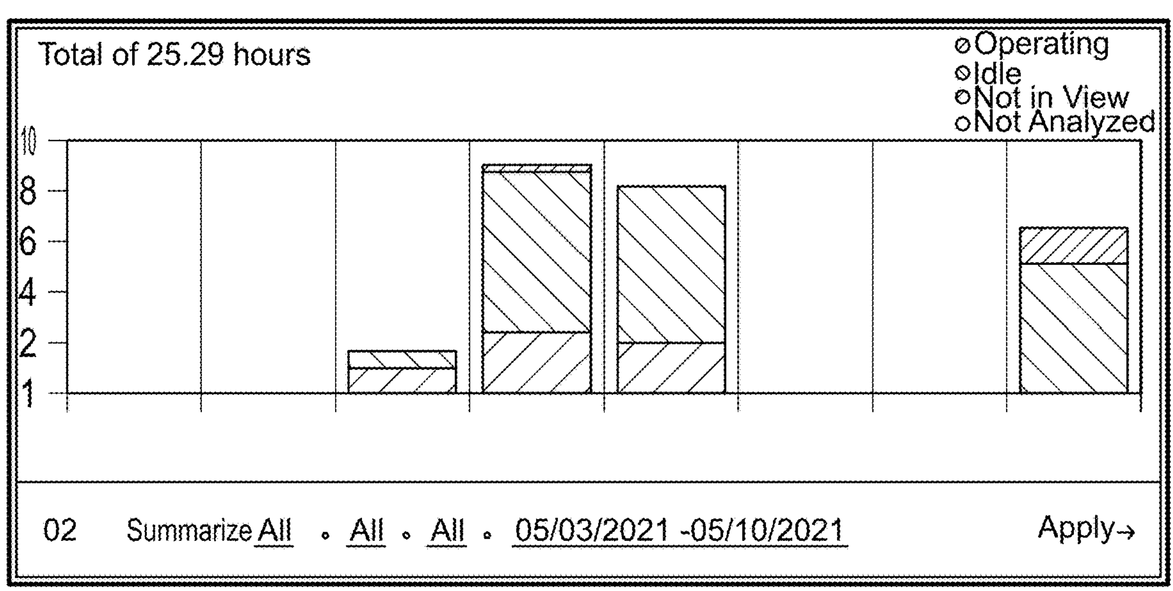

FIGS. 34A-34D are example user interfaces 3410, 3420, 3430, and 3440 for remote site management, in accordance with some implementations. Construction suffers major delays and cost overruns due to limited oversight. Cameras and sensors are deployed to collect sensor data 102 from a remote construction site. An LBM analyzes sensor data 102 at scale to generate daily reports for delivering accountability, enhancing operation efficiency, and reducing waste. For example, the LBM analyzes years of real world video (petabytes) across dozens of cameras to generate daily productivity reports. Referring to FIG. 34A, the user interface 3410 indicates three types of site states (e.g., operating, idle, and not in view) that are represented with rounded bars 3404 having different lengths for four days (e.g., 2021 May 5, 2021 May 6, 2021 May 7, and 2021 May 10). Referring to FIG. 34B, in response to a user action of moving a cursor on top of a rounded bar 3404A, a video clip 3406 captured by a camera disposed at the remote construction site is displayed in an overlaid window, showing some activities associated with the rounded bar 3404A. Referring to FIG. 34C, an image frame of the video clip 3406 is displayed with two boxes showing two regions of interest 3408 and 3412 where two diggers are identified. Referring to FIG. 34D, the user interface 3440 summarizes analysis results regarding the above four days based on activities recorded by the camera disposed at the remote construction site. In some implementations, a natural language prompt 214 was processed with the video data recorded by the on-site camera.

FIGS. 35A-35D are example image frames 3510, 3520, 3530, and 3540 captured by a camera for vehicle ingress prediction or human behavior prediction, in accordance with some implementations. Vehicles lack contextual awareness for automating everyday functionality. Automakers may need to invest heavily in expensive narrow-use advanced driver-assistance systems (ADAS) sensors. The LBM applied on the platform 3000 may rapidly build context awareness based on ADAS cameras and other sensors, e.g., by predicting the intent of people around the vehicle and actuating the right response (e.g. open the trunk for the driver with a suitcase). In some implementations, a vehicle has a plurality of exterior cameras facing different directions for monitoring conditions surrounding the vehicle in real time. For examples, the image frames 3510, 3520, 3530, and 3540 are captured substantially concurrently to monitor what happens around the vehicle from four different directions.

Figures 35A, 35B, 35C, 35D:
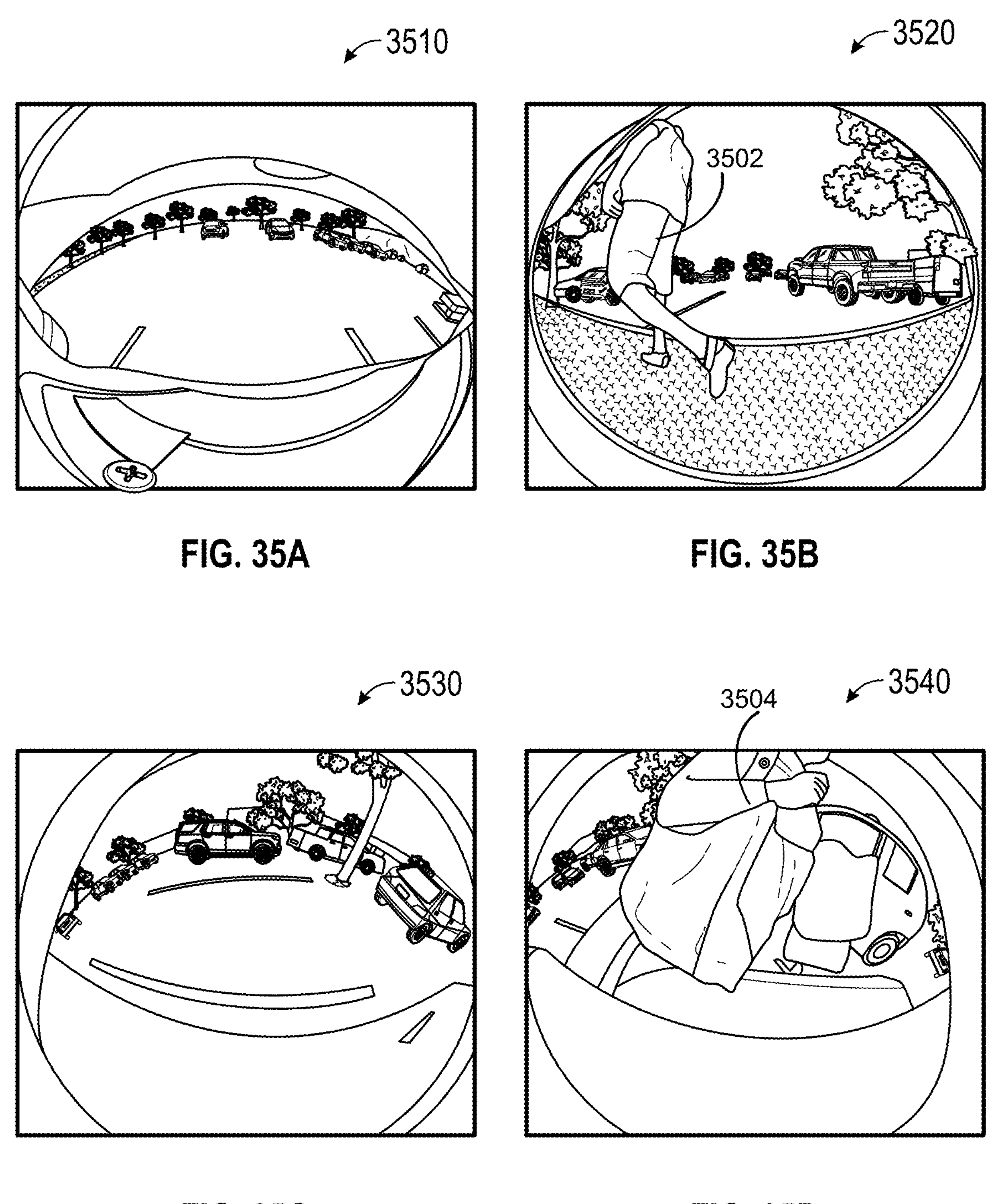
FIGS. 35A-35D are example images captured by a camera for vehicle ingress prediction or human behavior prediction, in accordance with some implementations.

Referring to FIG. 35B, in some situations, one of the exterior camera faces a door side of the vehicle and records a first video clip including a pedestrian 3502 passing by the vehicle. Under some circumstances, the pedestrian 3502 is a thief that tries to damage the vehicle and steal personal items from the vehicle. The modality output 130 includes an alarm signal (e.g., an electronic message, a vehicle alarm) alerting an owner of the vehicle of the vehicle being damaged.

Referring to FIG. 35D, in some situations, another exterior camera faces a rear side and record a second video clip includes a car driver carrying a plurality of grocery bags. The LBM receives the second video clip, determines that the car driver 3504 needs to put down the grocery bags in the trunk, and generates a vehicle control instruction to control the vehicle to open a vehicle trunk automatically.

Figure 36A:
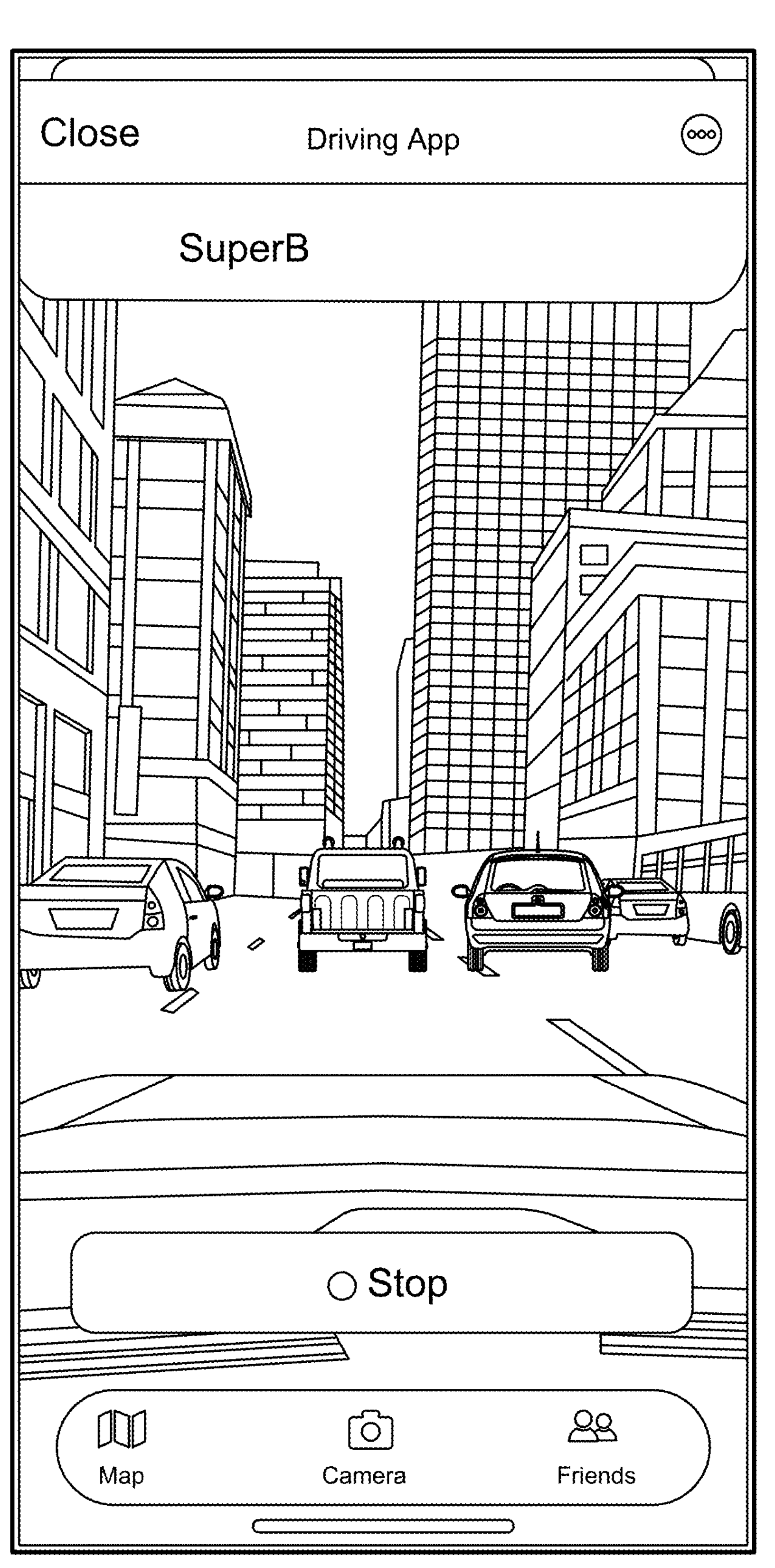
FIGS. 36A-36C are example user interfaces for fleet mapping and navigation, in accordance with some implementations.
Figures 36B, 36C:
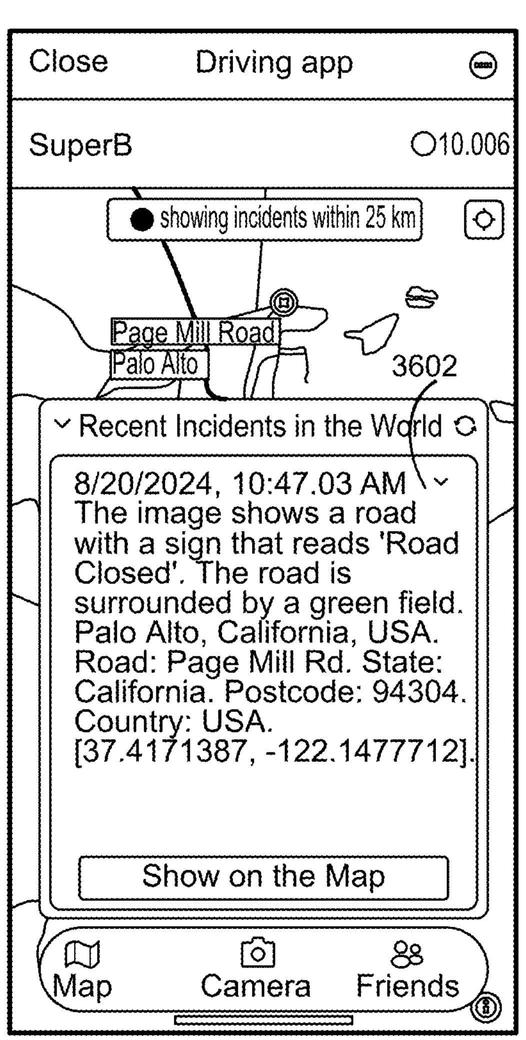

FIGS. 36A-36C are example user interfaces 3610, 3620, and 3640 for fleet mapping, in accordance with some implementations. Fleets of vehicles need to be routed as efficiently as possible. Navigation software lacks awareness of real time road conditions. The platform 3000 using an LBM can enable a fleet of vehicles to share real time situational awareness of traffic and road hazards. The platform 3000 collects sensor data of real time dash camera video data (e.g., shown in FIG. 36A) across the fleet, analyze the video data, and plot pins on a shared navigational map. Information of hazards, traffic, and point of interest is determined based on the video data collected from the fleet. Referring to FIG. 36C, a message 3602 describing "Recent Incidents in the World" is displayed on the user interface 3640.

Figure 37A:
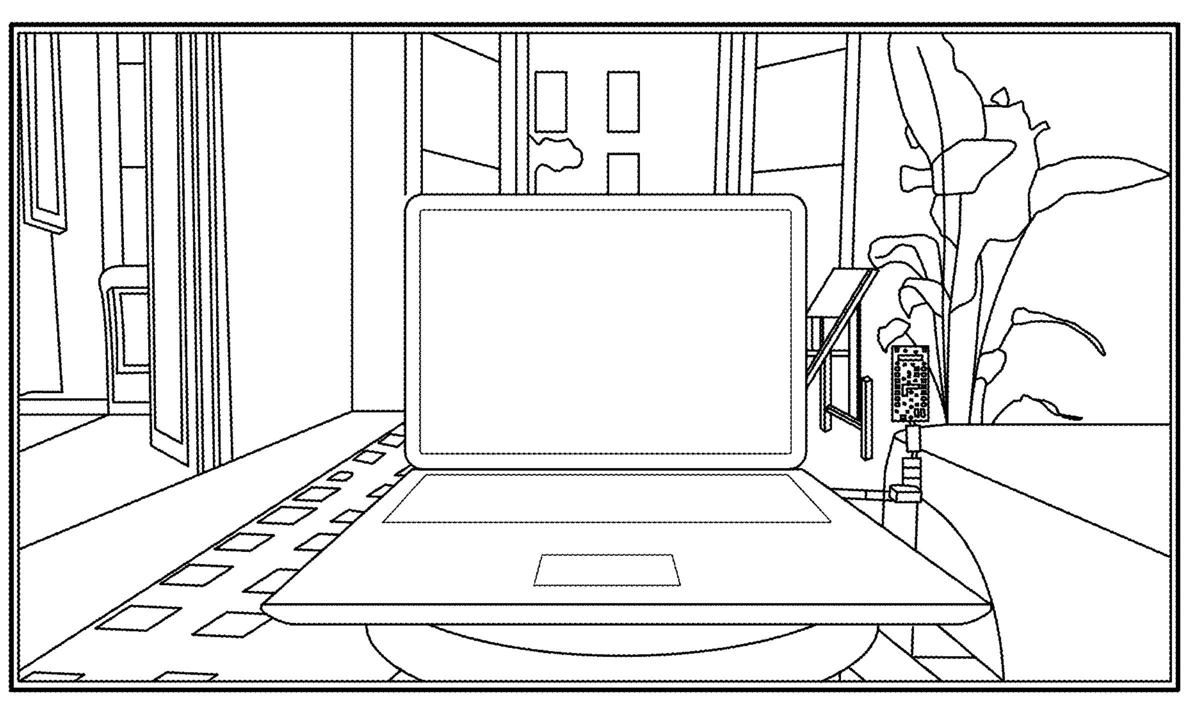
FIG. 37A and FIG. 37B are example user interfaces displayed in response to detection of a human presence of absence, in accordance with some implementations.
Figure 37B:
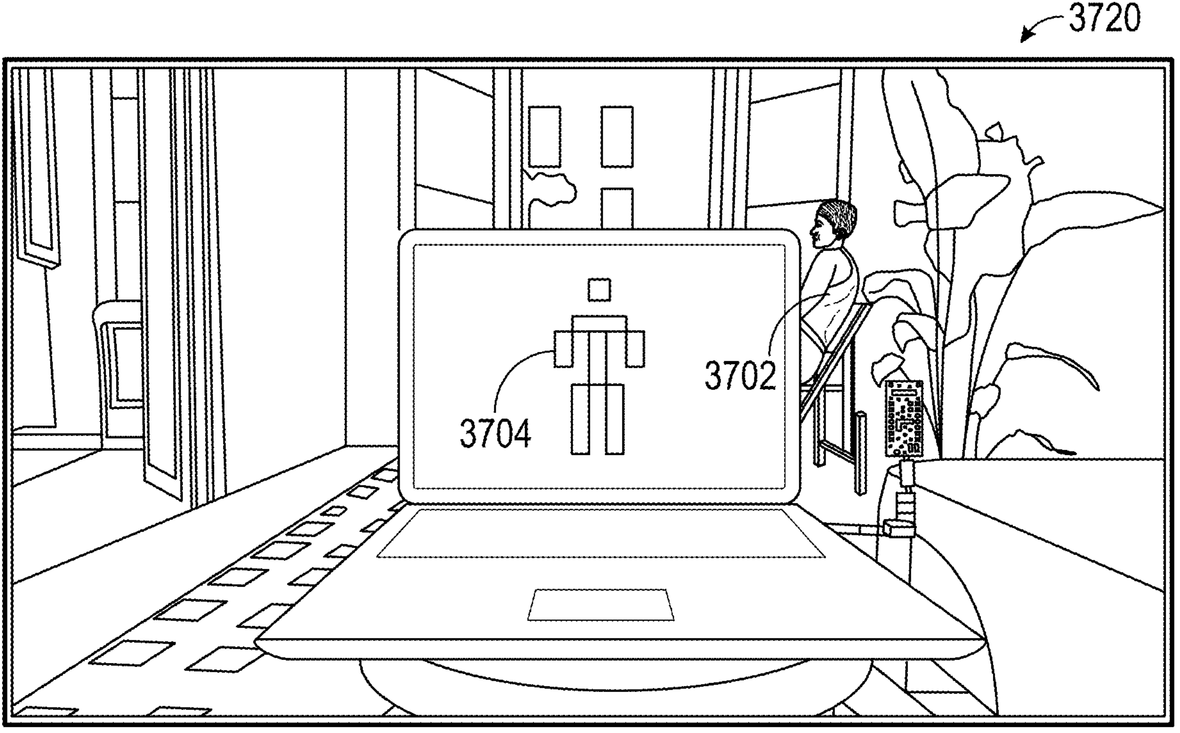

FIG. 37A and FIG. 37B are example user interfaces 3710 and 3720 displayed in response to detection of a human presence of absence, in accordance with some implementations. Radar is applied. The platform 3000 uses the LBM to meet home radar presence detection requirements. The LBM (particularly, its encoder 3004) is rapidly fine-tuned for new scenarios. A laptop displays an avatar 3704 in response to detection of the person entering in the room, and aborts display of the avatar 3704 in response to detection of the absence of the person. When the laptop is remote from the room, the LBM enables the user interfaces 3710 and 3720 to track whether the room is occupied by the person. In some embodiments not shown in FIGS. 37A and 37B, the multimodal output 130 includes an instruction used to generate a control signal for a home device or appliance. In accordance with a determination that the person 3702 appears or disappears in the room, the instruction is generated and used to control the home device or appliance (e.g. to turn on a light, turn off a television device, change a temperature of an air conditioner).

Figure 38A:
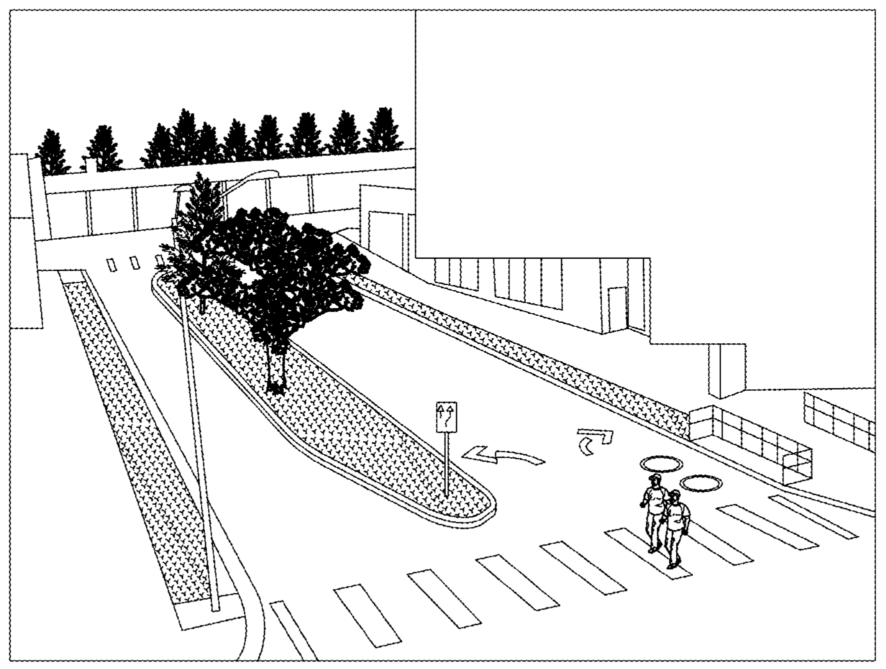

FIGS. 38A and 38B are two example user interfaces 3810 and 3820 for analyzing traffic conditions or traffic patterns of regions of interest, in accordance with some implementations. Many physical AI applications cannot run in the cloud because of connectivity, latency, security, or cost. In some implementations, the platform 3000 includes a client-side module to run a multimodal LBM on a client device (e.g., a mobile device). In an example, the client device includes a graphics processing unit (GPU), and the client-side module of the multimodal LBM is executed by the GPU to implement real time traffic analysis and chart generation. As a proxy for any combination of sensors, a camera was connected to the platform 3000 via a private 5G network.

Referring to FIG. 38A, in some implementations, in response to a natural language prompt 214 requesting "live data" for a camera feed, a user interface 3810 is displayed to summarize a detection time, a number of pedestrians on a cross walk, and three numbers of vehicles on three lanes, while presenting a live camera feed. Referring to FIG. 38B, in some implementations, in response to a natural language prompt 214 requesting "how many cars went east" for a camera feed associated with a location, a user interface 3820 is displayed to plot two curves (e.g., corresponding to multimodal output 130) measuring two numbers of cars that went "east right" and "east left" during the past eight hours.

FIG. 39 is a flow diagram of an example method 3900 for presenting sensor data with one of a plurality of predefined output modalities, in accordance with some implementations. In some implementations, the method 3900 is governed by instructions that are stored in a non-transitory computer readable storage medium and are executed by one or more processors of a computer system (e.g., a server system 106). Each of the operations shown in FIG. 39 may correspond to instructions stored in the computer memory or computer readable storage medium (e.g., the memory 306 in FIG. 3) of the computer system. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 3900 may be combined and/or the order of some operations may be changed.

A computer system obtains (operation 3902) the sensor data 120 from a plurality of sensor devices 102 during a time duration. The plurality of sensor devices 102 includes (operation 3904) at least two distinct senor types and disposed in a physical environment. The computer system detects (operation 3904) one or more signature events in the sensor data 120, and generates (operation 3906) one or more information items 240 characterizing the one or more signature events detected in the sensor data 120, independently of the sensor types of the plurality of sensor devices 102. The computer system applies (operation 3908) a large behavior model to process the one or more information items 240 and generate a multimodal output 130 associated with the sensor data 120. The multimodal output 130 describes (operation 3910) the one or more signature events associated with the sensor data 120 in one of a plurality of predefined output modalities. The computer system presents (operation 3912) the multimodal output 130 according to the one of the plurality of predefined output modalities.

In some implementations, a subset of sensor data 120 corresponds to a first signature event, and includes a first temporal sequence of sensor samples obtained from a first sensor device 102 and a second temporal sequence of sensor samples obtained from a second sensor device. A first sensor type of the first sensor device 102 is different from a second sensor type of the second sensor device. A first information item is generated based on the subset of sensor data 120 to characterize the first signature event. Further, in some implementations, the first temporal sequence of sensor samples and the second temporal sequence of sensor samples are concurrently measured. The first temporal sequence of sensor samples has a first sampling rate, and the second temporal sequence of sensor samples has a second sampling rate that is different from the first sampling rate.

In some implementations, the computer device applies at least a universal event projection model to process the first temporal sequence of sensor samples and the second temporal sequence of sensor samples jointly to generate the first information item.

In some implementations, the computer device applies at least a first event projection model to process the first temporal sequence of sensor samples to generate the first information item, and at least a second event projection model to process the second temporal sequence of sensor samples to generate the first information item. The first event projection model is distinct from the second event projection model. Further, in some implementations, the computer device selects each of the first event projection model and the second event projection model based on a respective device type of the first sensor device 102 and the second sensor device.

In some implementations, each sensor device 102 corresponds to a temporal sequence of respective sensor samples. For each sensor device, the computer device generates an ordered sequence of respective sensor data features defining a respective parametric representation of the temporal sequence of respective sensor samples, independently of a sensor type of the respective sensor device, and provides the ordered sequence of respective sensor data features to an event projection model.

In some implementations, the sensor data 120 includes a temporal sequence of sensor data 120. The computer device obtains a stream of context data measured continuously by the plurality of sensor devices 102. The stream of context data includes the temporal sequence of respective sensor samples that are grouped for each sensor device 102 based on a temporal window. The temporal window is configured to move with a time axis. The computer device associates each sensor data 120 item of the temporal sequence of sensor data 120 with a respective timestamp and a subset of respective sensor samples that are grouped based on the temporal window.

In some implementations, the computer device stores the one or more information items 240 associated with the one or more signature events. The one or more information items 240 include a timestamp and a location of each of the one or more signature events.

In some implementations, the computer device determines a behavior pattern based on the one or more signature events for the time duration, generates a subset of the one or more information items 240 describing the behavior pattern, and provides the subset of the one or more information items 240 of the behavior pattern associated with the sensor data 120.

In some implementations, the computer device obtains a plurality of training inputs. Each training input includes a training text prompt and an information item associated with a training signature event. The computer device obtains ground truth corresponding to each training input. The ground truth includes a sample multimodal output 130 preferred for the training input. Based on a predefined loss function, the computer device trains the large behavior model using the plurality of training inputs and associated ground truths.

In some implementations, the computer device obtains a plurality of training inputs. Each training input includes one or more test tags of a sequence of signature events, and the one or more test tags have a predefined description format in which one or more information items 240 and an associated timestamps of each signature event is organized.

In some implementations, for a temporal window corresponding to a subset of sensor data 120, the computer device applies at least a universal event projection model to process the subset of sensor data 120 within the respective temporal window and detect one or more signature events.

In some implementations, the plurality of sensor devices 102 include one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor.

In some implementations, the computer device stores the one or more information items 240 or the multimodal output 130 in a database, in place of the sensor data 120 measured by the plurality of sensor devices 102. Further, in some implementations, the computer device processes the sensor data 120 to generate one or more sets of intermediate items successively and iteratively, until generating the one or more information items 240. Additionally, in some implementations, the computer device processes the sensor data 120 to generate a first set of intermediate items at a first time, stores the first set of intermediate items in the database, processes the first set of intermediate items to generate one or more second sets of intermediate items successively at one or more successive second times following the first time, successively stores the one or more second sets of intermediate items in the database, and deletes the first set of intermediate items from the database, and processes a most recent intermediate set of the one or more second sets of intermediate items to generate the one or more information items 240 at a third time following the one or more successive second times.

In some implementations, the large behavior model includes a large language model (LLM).

In some implementations, the multimodal output 130 includes one or more of: description, timestamp, numeral information, statistic summary, warning message, and recommended action associated with one or more signature events.

In some implementations, the plurality of predefined output modalities include one or more of: textual statements, software code, an image or video, an information dashboard having a predefined format, a user interface, and a heatmap.

FIG. 40 is a flow diagram of an example method 4000 for presenting sensor data 120 in response to a natural language prompt 214, in accordance with some implementations. In some implementations, the method 4000 is governed by instructions that are stored in a non-transitory computer readable storage medium and are executed by one or more processors of a computer system (e.g., a server system 106). Each of the operations shown in FIG. 40 may correspond to instructions stored in the computer memory or computer readable storage medium (e.g., the memory 306 in FIG. 3) of the computer system. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 4000 may be combined and/or the order of some operations may be changed.

The computer system obtains (operation 4002) the sensor data 120 from a plurality of sensor devices 102 disposed in a physical environment during a time duration, and generates (operation 4004) one or more information items 240 characterizing one or more signature events detected within the time duration in the sensor data 120. The computer system obtains (operation 4006) a natural language prompt 214. In response to the natural language prompt 214, the computer system applies (operation 4008) a large behavior model (LBM) to process the one or more information items 240 and the natural language prompt 214 jointly and generate a multimodal output 130 associated with the sensor data 120, and presents (operation 4010) the multimodal output 130 associated with the sensor data 120.

In some implementations, the sensor data 120 is divided into a plurality of temporal windows, and each temporal window corresponds to at least a subset of sensor data 120. For each of a subset of temporal windows, the computer system processes the subset of sensor data 120 to detect a respective signature event within each respective temporal window and generates a respective information item associated with the respective signature event. The computer system stores the one or more information items 240 associated with the one or more signature events, and the one or more information items 240 includes a timestamp and a location of each of the one or more signature events.

In some implementations, the computer system determines a behavior pattern based on the one or more signature events for the time duration of the sensor data 120, generates a subset of the one or more information items 240 describing the behavior pattern, and provides the subset of the one or more information items 240 of the behavior pattern associated with the sensor data 120.

In some implementations, the computer system provides, to the LBM, the natural language prompt 214 and the one or more information items 240 associated with one or more signature events. In response to the natural language prompt 214, the computer system obtains, from the LBM, the multimodal output 130 describing the one or more signature events associated with the sensor data 120.

In some implementations, the natural language prompt 214 includes a predefined mission, the predefined mission including a trigger condition. Further, in some implementations, the plurality of sensor devices 102 are configured to monitor a condition of a patient. The predefined mission is defined in advance before the sensor data 120 are obtained, the trigger condition including a first health condition associated with a first pattern of the sensor data 120. Additionally, in some implementations, the computer system analyzes the sensor data 120 to identify the first pattern, and detects the first health condition based on the first pattern. In response to detection of the first health condition, the natural language prompt 214 and the one or more information items 240 are provided to the LBM.

In some implementations, the natural language prompt 214 includes a user query entered on a user interface of an application executed on a client device, and the user query is received, in real time while or after the sensor data 120 are collected. Further, in some implementations, the user query includes information defining the time duration. The computer system determines the time duration based on the user query, and extracts the one or more information items 240 characterizing the sensor data 120 for each temporal window that are included in the time duration. The user query, the one or more information items 240 in the time duration, and respective temporal timestamps are provided to the LBM.

In some implementations, the user query includes information defining a location. The computer system selects one of the plurality of sensor devices 102 based on the user query, identifies a subset of sensor data 120 captured the selected one of the plurality of sensor devices 102, and extracts the one or more information items 240 characterizing the sensor data 120 associated with the selected one of the plurality of sensor devices 102.

In some implementations, the user query includes information defining a location. The computer system identifies a region of interest corresponding to the location in the sensor data 120 captured by a first sensor, and extracts the one or more information items 240 characterizing the sensor data 120 associated with the region of interest. Further, in some implementations, in response to the user query, the computer system extracts the one or more information items 240 characterizing the sensor data 120. The user query, the one or more information items 240, and respective timestamps are provided to the LBM. Additionally, in some implementations, the user query is entered in a query language. The computer system provides the user query to the LBM, which is configured to translate the user query to English, and obtains a translated user query from the LBM, wherein the one or more information items 240 associated with the sensor data 120 is extracted in response to the translated user query.

In some implementations, the method 4000 is implemented by a server system, and the server system is coupled to a client device that executes an application. The computer system enables display of a user interface on the application by receiving the natural language prompt 214 via the user interface and providing the multimodal output 130 characterizing the sensor data 120.

In some implementations, the natural language prompt 214 defines a reply language, and the multimodal output 130 is provided by the LBM in the reply language.

In some implementations, the multimodal output 130 includes one or more of: description, timestamp, numeral information, statistic summary, warning message, and recommended action associated with one or more signature events.

In some implementations, the multimodal output 130 includes one or more of: textual statements, software code, an image or video, an information dashboard having a predefined format, a user interface, and a heatmap.

In some implementations, for a temporal window corresponding to a subset of sensor data 120, the computer system uses at least an event projection model to detect one or more signature events based on the subset of sensor data 120 within the temporal window.

In some implementations, the computer system stores the one or more information items 240 and/or the multimodal output 130 in a database, in place of the sensor data 120 measured by the plurality of sensor devices 102.

Further, in some implementations, the computer system processes the sensor data 120 to generate one or more sets of intermediate items successively and iteratively, until generating the one or more information items 240.

In some implementations, the LBM includes a large language model (LLM).

In some implementations, each sensor device 102 corresponds to a temporal sequence of respective sensor samples. For each of the plurality of sensor devices 102, the computer system processes the temporal sequence of respective sensor samples to generate an ordered sequence of respective sensor data features defining a respective parametric representation of the temporal sequence of respective sensor samples, independently of a sensor type of the respective sensor device. The one or more information items 240 are generated based on ordered sequences of respective sensor data features corresponding to the plurality of sensor devices 102.

In some implementations (FIGS. 34A-34D), the sensor data include video data streamed by cameras that are disposed at a venue, and the multimodal output includes a chart or snapshot, the chart indicating a plurality of site states or durations when the feature events occur, the snapshot associated with respective feature events.

In some implementations (FIGS. 35A-35D), the sensor data include video data provided by a plurality of sensors of a vehicle that include at least an exterior camera. The one or more information items identify human activities surrounding the vehicle. The multimodal output includes a vehicle control instruction for controlling the vehicle in response to detection of the human activities.

In some implementations (FIGS. 36A-36C), the sensor data are provided by cameras of a plurality of vehicles, and the multimodal output includes at least one of a map, an audio message, and a text message, indicating a traffic condition or a road condition generated by the LBM based on the sensor data.

In some implementations (FIGS. 37A and 37B), the sensor data are provided by a radar disposed in a room, and the multimodal output includes an avatar that is enabled for display in accordance with a determination that the radar detects a presence of a person in the room.

In some implementations (FIG. 38A), the natural language prompt includes a location of a camera and requests live information associated with the location, and the sensor data include video data provided by the camera installed at the location. The multimodal output is generated based on the video data and includes a natural language text list including at least one of a number of people on a cross walk and a number of vehicles on each of a plurality of lanes.

In some implementations (FIG. 38B), the natural language prompt includes a location of a camera and requests a count of vehicles associated with a road direction, and the sensor data include video data provided by the camera installed at the location. The multimodal output is generated based on the video data and includes a plot including a temporal curve of the count of vehicles associated with the road direction.

It should be understood that the particular order in which the operations in FIGS. 33, 40, and 41 have been described are merely exemplary and are not intended to indicate that the described order is the only order in which the operations could be performed. One of ordinary skill in the art would recognize various ways to compressing or presenting sensor data as described herein. Additionally, it should be noted that details described above with respect to any of FIGS. 33, 40, and 41 are also applicable in an analogous manner to the methods described above with respect to the other two of FIGS. 33, 40, and 41. For brevity, these details are not repeated.

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Clause 1. A method for compressing sensor data, comprising: at a computer system having one or more processors and memory: obtaining the sensor data from a plurality of sensor devices disposed in a physical environment during a time duration, each sensor device corresponding to a temporal sequence of respective sensor samples; for each of the plurality of sensor devices, processing the temporal sequence of respective sensor samples to generate an ordered sequence of respective sensor data features defining a respective parametric representation of the temporal sequence of respective sensor samples, independently of a sensor type of the respective sensor device; detecting one or more signature events within the time duration based on the respective parametric representations of the plurality of sensor devices; and generating one or more information items characterizing the one or more signature events detected in the sensor data.

Clause 2. The method of clause 1, wherein processing the temporal sequence of respective sensor samples further comprises: receiving the temporal sequence of respective sensor samples at an input of a sensor data encoder model; and generating, by the sensor data encoder model, the ordered sequence of respective sensor data features based on at least the temporal sequence of respective sensor samples.

Clause 3. The method of clause 2, wherein processing the temporal sequence of respective sensor samples further comprises: receiving temporal data at the input of the sensor data encoder model jointly with the temporal sequence of respective sensor samples, wherein the temporal data include one or more of: a sequence of time stamps, a temporal length of the time duration, and a sampling rate of the temporal sequence of respective sensor samples.

Clause 4. The method of clause 2 or 3, wherein the sensor data encoder model is applied, independently of a type of each of the one or more sensor devices.

Clause 5. The method of any of clauses 1-4, wherein the respective parametric representation includes an N-th degree polynomial representation having the highest power of a sampling time equal to N, where N is a positive integer, and the ordered sequence of respective sensor data features includes N+1 data features each of which corresponds to a distinct coefficient of the N-th degree polynomial representation.

Clause 6. The method of any of clauses 1-5, wherein the sensor data includes a temporal sequence of sensor data, and obtaining the sensor data further comprises: obtaining a stream of context data measured continuously by the plurality of sensor devices, the stream of context data including the temporal sequence of respective sensor samples that are grouped for each sensor device based on a temporal window, the temporal window configured to move with a time axis; and associating each sensor data item of the temporal sequence of sensor data with a respective timestamp and a subset of respective sensor samples that are grouped based on the temporal window.

Clause 7. The method of any of clauses 1-6, further comprising storing, in the memory, the one or more information items associated with the one or more signature events, the one or more information items including a timestamp and a location of each of the one or more signature events.

Clause 8. The method of any of clauses 1-7, wherein a universal event projection model is applied to process the respective parametric representations of the plurality of sensor devices and generate the one or more information items characterizing the one or more signature events.

Clause 9. The method of clause 8, wherein each of the respective parametric representations is associated with a sensor tag indicating a type of a respective sensor device, and the respective parametric representations are inputted into the universal event projection model jointly with the sensor tag of each of the plurality of sensor devices in a predefined data format.

Clause 10. The method of clause 8 or 9, wherein the respective parametric representations of the plurality of sensor devices are inputted into the universal event projection model in a predefined order determined based on respective types of the respective sensor devices.

Clause 11. The method of any of clauses 1-10, wherein, for each of a subset of the plurality of sensor devices, an individual projection model is applied to process the respective parametric representation and generate a subset of the one or more information items.

Clause 12. The method of any of clauses 1-11, wherein for a temporal window corresponding to a subset of sensor data, detecting the one or more signature events further comprises: using machine learning to process the subset of sensor data within the respective temporal window and detect one or more signature events.

Clause 13. The method of any of clauses 1-12, wherein the plurality of sensor devices include one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor.

Clause 14. The method of any of clauses 1-13, further comprising: storing the ordered sequence of respective sensor data features or the one or more information items in a database, in place of the sensor data obtained from the plurality of sensor devices.

Clause 15. The method of clause 14, further comprising, after obtaining the sensor data: processing the sensor data to generate one or more sets of intermediate items successively and iteratively, until generating the one or more information items.

Clause 16. The method of clause 15, further comprising: processing the sensor data to generate a first set of intermediate items at a first time; storing the first set of intermediate items in the database; processing the first set of intermediate items to generate one or more second sets of intermediate items successively at one or more successive second times following the first time; successively storing the one or more second sets of intermediate items in the database, and deleting the first set of intermediate items from the database; and processing a most recent intermediate set of the one or more second sets of intermediate items to generate the one or more information items at a third time following the one or more successive second times.

Clause 17. The method of any of clauses 1-16, further comprising: applying a large behavior model to process the one or more information items and generate a multimodal output associated with the sensor data, the multimodal output describing the one or more signature events associated with the sensor data in one of a plurality of predefined output modalities, wherein the large behavior model includes a large language model (LLM).

Clause 18. The method of clause 17, wherein the multimodal output includes one or more of: description, timestamp, numeral information, statistic summary, warning message, and recommended action associated with one or more signature events, and the plurality of predefined output modalities include one or more of: textual statements, software code, an image or video, an information dashboard having a predefined format, a user interface, and a heatmap.

Clause 19. A method for presenting sensor data, comprising: at a computer system having one or more processors and memory: obtaining the sensor data from a plurality of sensor devices during a time duration, the plurality of sensor devices including at least two distinct senor types and disposed in a physical environment; detecting one or more signature events in the sensor data; generating one or more information items characterizing the one or more signature events detected in the sensor data, independently of the sensor types of the plurality of sensor devices; applying a large behavior model to process the one or more information items and generate a multimodal output associated with the sensor data, the multimodal output describing the one or more signature events associated with the sensor data in one of a plurality of predefined output modalities; and presenting the multimodal output according to the one of the plurality of predefined output modalities.

Clause 20. The method of clause 19, wherein: a subset of sensor data corresponds to a first signature event, and includes a first temporal sequence of sensor samples obtained from a first sensor device and a second temporal sequence of sensor samples obtained from a second sensor device; a first sensor type of the first sensor device is different from a second sensor type of the second sensor device; and a first information item is generated based on the subset of sensor data to characterize the first signature event.

Clause 21. The method of clause 20, wherein the first temporal sequence of sensor samples and the second temporal sequence of sensor samples are concurrently measured, and wherein the first temporal sequence of sensor samples has a first sampling rate, and the second temporal sequence of sensor samples has a second sampling rate that is different from the first sampling rate.

Clause 22. The method of clause 20 or 21, further comprising: applying at least a universal event projection model to process the first temporal sequence of sensor samples and the second temporal sequence of sensor samples jointly to generate the first information item.

Clause 23. The method of clause 20 or 21, further comprising: applying at least a first event projection model to process the first temporal sequence of sensor samples to generate the first information item; and applying at least a second event projection model to process the second temporal sequence of sensor samples to generate the first information item, the first event projection model distinct from the second event projection model.

Clause 24. The method of clause 23, further comprising: selecting each of the first event projection model and the second event projection model based on a respective device type of the first sensor device and the second sensor device.

Clause 25. The method of any of clauses 19-24, wherein each sensor device corresponds to a temporal sequence of respective sensor samples, the method further comprising, for each sensor device: generating an ordered sequence of respective sensor data features defining a respective parametric representation of the temporal sequence of respective sensor samples, independently of a sensor type of the respective sensor device; and providing the ordered sequence of respective sensor data features to an event projection model.

Clause 26. The method of any of clauses 19-25, wherein the sensor data includes a temporal sequence of sensor data, and obtaining the sensor data further comprises: obtaining a stream of context data measured continuously by the plurality of sensor devices, the stream of context data including the temporal sequence of respective sensor samples that are grouped for each sensor device based on a temporal window, the temporal window configured to move with a time axis; and associating each sensor data item of the temporal sequence of sensor data with a respective timestamp and a subset of respective sensor samples that are grouped based on the temporal window.

Clause 27. The method of any of clauses 19-26, further comprising: storing the one or more information items associated with the one or more signature events, the one or more information items including a timestamp and a location of each of the one or more signature events.

Clause 28. The method of any of clauses 19-27, further comprising: determining a behavior pattern based on the one or more signature events for the time duration; generating a subset of the one or more information items describing the behavior pattern; and providing the subset of the one or more information items of the behavior pattern associated with the sensor data.

Clause 29. The method of any of clauses 19-28, further comprising: obtaining a plurality of training inputs, each training input including a training text prompt and an information item associated with a training signature event; obtaining ground truth corresponding to each training input, the ground truth including a sample multimodal output preferred for the training input; and based on a predefined loss function, training the large behavior model using the plurality of training inputs and associated ground truths.

Clause 30. The method of any of clauses 19-29, further comprising: obtaining a plurality of training inputs, each training input including one or more test tags of a sequence of signature events, the one or more test tags having a predefined description format in which one or more information items and an associated timestamps of each signature event is organized.

Clause 31. The method of any of clauses 19-30, wherein for a temporal window corresponding to a subset of sensor data, the method further comprising: applying at least a universal event projection model to process the subset of sensor data within the respective temporal window and detect one or more signature events.

Clause 32. The method of any of clauses 19-31, wherein the plurality of sensor devices include one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor.

Clause 33. The method of any of clauses 19-32, further comprising: storing the one or more information items or the multimodal output in a database, in place of the sensor data measured by the plurality of sensor devices.

Clause 34. The method of clause 33, further comprising: processing the sensor data to generate one or more sets of intermediate items successively and iteratively, until generating the one or more information items.

Clause 35. The method of clause 34, further comprising: processing the sensor data to generate a first set of intermediate items at a first time; storing the first set of intermediate items in the database; processing the first set of intermediate items to generate one or more second sets of intermediate items successively at one or more successive second times following the first time; successively storing the one or more second sets of intermediate items in the database, and deleting the first set of intermediate items from the database; and processing a most recent intermediate set of the one or more second sets of intermediate items to generate the one or more information items at a third time following the one or more successive second times.

Clause 36. The method of any of clauses 19-35, wherein the large behavior model includes a large language model (LLM).

Clause 37. The method of any of clauses 19-36, wherein the multimodal output includes one or more of: description, timestamp, numeral information, statistic summary, warning message, and recommended action associated with one or more signature events.

Clause 38. The method of any of clauses 19-37, wherein the plurality of predefined output modalities include one or more of: textual statements, software code, an image or video, an information dashboard having a predefined format, a user interface, and a heatmap.

Clause 39. A method for presenting sensor data, comprising: at a computer system having one or more processors and memory: obtaining the sensor data from a plurality of sensor devices disposed in a physical environment during a time duration; generating one or more information items characterizing one or more signature events detected within the time duration in the sensor data; obtaining a natural language prompt; and in response to the natural language prompt: applying a large behavior model (LBM) to process the one or more information items and the natural language prompt jointly and generate a multimodal output associated with the sensor data; and presenting the multimodal output associated with the sensor data.

Clause 40. The method of clause 39, wherein: the sensor data is divided into a plurality of temporal windows, the method further comprising, each temporal window corresponding to at least a subset of sensor data; generating the one or more information items further includes, for each of a subset of temporal windows, processing the subset of sensor data to detect a respective signature event within each respective temporal window and generating a respective information item associated with the respective signature event; and storing the one or more information items associated with the one or more signature events, the one or more information items including a timestamp and a location of each of the one or more signature events.

Clause 41. The method of clause 39 or 40, further comprising: determining a behavior pattern based on the one or more signature events for the time duration of the sensor data; generating a subset of the one or more information items describing the behavior pattern; and providing the subset of the one or more information items of the behavior pattern associated with the sensor data.

Clause 42. The method of any of clauses 39-41, applying the LBM further comprising: providing, to the LBM, the natural language prompt and the one or more information items associated with one or more signature events; and in response to the natural language prompt, obtaining, from the LBM, the multimodal output describing the one or more signature events associated with the sensor data.

Clause 43. The method of any of clauses 39-42, wherein the natural language prompt includes a predefined mission, the predefined mission including a trigger condition.

Clause 44. The method of clause 43, wherein: the plurality of sensor devices are configured to monitor a condition of a patient; and the predefined mission is defined in advance before the sensor data are obtained, the trigger condition including a first health condition associated with a first pattern of the sensor data.

Clause 45. The method of clause 44, further comprising: analyzing the sensor data to identify the first pattern; and detecting the first health condition based on the first pattern; wherein in response to detection of the first health condition, the natural language prompt and the one or more information items are provided to the LBM.

Clause 46. The method of any of clauses 39-45, wherein the natural language prompt includes a user query entered on a user interface of an application executed on a client device, and the user query is received, in real time while or after the sensor data are collected.

Clause 47. The method of clause 46, wherein the user query includes information defining the time duration, the method further comprising: determining the time duration based on the user query; and extracting the one or more information items characterizing the sensor data for each temporal window that are included in the time duration; wherein the user query, the one or more information items in the time duration, and respective temporal timestamps are provided to the LBM.

Clause 48. The method of clause 46, wherein the user query includes information defining a location, the method further comprising: selecting one of the plurality of sensor devices based on the user query; identifying a subset of sensor data captured the selected one of the plurality of sensor devices; and extracting the one or more information items characterizing the sensor data associated with the selected one of the plurality of sensor devices.

Clause 49. The method of clause 46, wherein the user query includes information defining a location, the method further comprising: identifying a region of interest corresponding to the location in the sensor data captured by a first sensor; and extracting the one or more information items characterizing the sensor data associated with the region of interest.

Clause 50. The method of clause 46, further comprising: in response to the user query, extracting the one or more information items characterizing the sensor data, wherein the user query, the one or more information items, and respective timestamps are provided to the LBM.

Clause 51. The method of clause 50, wherein the user query is entered in a query language, the method further comprising: providing the user query to the LBM, which is configured to translate the user query to English; and obtaining a translated user query from the LBM, wherein the one or more information items associated with the sensor data is extracted in response to the translated user query.

Clause 52. The method of any of clauses 39-51, wherein the method is implemented by a server system, and the server system is coupled to a client device that executes an application, the method further comprising: enabling display of a user interface on the application, including receiving the natural language prompt via the user interface and providing the multimodal output characterizing the sensor data.

Clause 53. The method of any of clauses 39-52, wherein the natural language prompt defines a reply language, and the multimodal output is provided by the LBM in the reply language.

Clause 54. The method of any of clauses 39-53, wherein the multimodal output includes one or more of: description, timestamp, numeral information, statistic summary, warning message, and recommended action associated with one or more signature events.

Clause 55. The method of any of clauses 39-54, wherein the multimodal output includes one or more of: textual statements, software code, an image or video, an information dashboard having a predefined format, a user interface, and a heatmap.

Clause 56. The method of any of clauses 39-55, wherein for a temporal window corresponding to a subset of sensor data, the method further comprising: using at least an event projection model to detect one or more signature events based on the subset of sensor data within the temporal window.

Clause 57. The method of any of clauses 39-56, further comprising: storing the one or more information items and/or the multimodal output in a database, in place of the sensor data measured by the plurality of sensor devices.

Clause 58. The method of clause 57, further comprising: processing the sensor data to generate one or more sets of intermediate items successively and iteratively, until generating the one or more information items.

Clause 59. The method of any of clauses 39-58, wherein the LBM includes a large language model (LLM).

Clause 60. The method of any of clauses 39-59, wherein each sensor device corresponds to a temporal sequence of respective sensor samples, the method further comprising: for each of the plurality of sensor devices, processing the temporal sequence of respective sensor samples to generate an ordered sequence of respective sensor data features defining a respective parametric representation of the temporal sequence of respective sensor samples, independently of a sensor type of the respective sensor device; wherein the one or more information items are generated based on ordered sequences of respective sensor data features corresponding to the plurality of sensor devices.

Clause 61. The method of any of clauses 39-60, wherein the sensor data include video data streamed by cameras that are disposed at a venue, and the multimodal output includes a chart or snapshots, the chart indicating a plurality of site states or durations when the feature events occur, the snapshots associated with respective feature events.

Clause 62. The method of any of clauses 39-60, wherein the sensor data include video data provided by a plurality of sensors of a vehicle that include at least an exterior camera; the one or more information items identify human activities surrounding the vehicle; and the multimodal output includes a vehicle control instruction for controlling the vehicle in response to detection of the human activities.

Clause 63. The method of any of clauses 39-60, wherein, the sensor data are provided by cameras of a plurality of vehicles, and the multimodal output includes at least one of a map, an audio message, and a text message, indicating a traffic condition or a road condition generated by the LBM based on the sensor data.

Clause 64. The method of any of clauses 39-60, wherein the sensor data are provided by a radar disposed in a room, and the multimodal output includes an avatar that is enabled for display in accordance with a determination that the radar detects a presence of a person in the room.

Clause 65. The method of any of clauses 39-60, wherein the natural language prompt includes a location of a camera and requests live information associated with the location, and the sensor data include video data provided by the camera installed at the location, and wherein the multimodal output is generated based on the video data and includes a natural language text list including at least one of a number of people on a cross walk and a number of vehicles on each of a plurality of lanes.

Clause 66. The method of any of clauses 39-60, wherein the natural language prompt includes a location of a camera and requests a count of vehicles associated with a road direction, and the sensor data include video data provided by the camera installed at the location, and wherein the multimodal output is generated based on the video data and includes a plot including a temporal curve of the count of vehicles associated with the road direction.

Clause 67. A computer system, comprising: one or more processors; and memory having instructions stored thereon, which when executed by the one or more processors cause the processors to perform a method of any of clauses 1-66.

Clause 68. A non-transitory computer-readable storage medium, having instructions stored thereon, which when executed by one or more processors cause the one or more processors to perform a method of any of clauses 1-66.

In some embodiments, any of the above clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for compressing sensor data, comprising:

at a computer system having one or more processors and memory:

obtaining the sensor data from a plurality of sensor devices disposed in a physical environment during a time duration, each sensor device corresponding to a temporal sequence of respective sensor samples;

for each of the plurality of sensor devices, processing the temporal sequence of respective sensor samples to generate an ordered sequence of respective sensor data features defining a respective parametric representation of the temporal sequence of respective sensor samples, independently of a sensor type of the respective sensor device, wherein the respective parametric representation includes an N-th degree polynomial representation having the highest power of a sampling time equal to N, where N is a positive integer, and the ordered sequence of respective sensor data features includes N+1 data features each of which corresponds to a distinct coefficient of the N-th degree polynomial representation;

detecting one or more signature events within the time duration based on the respective parametric representations of the plurality of sensor devices; and generating one or more information items characterizing the one or more signature events detected in the sensor data.

2. The method of claim 1, wherein processing the temporal sequence of respective sensor samples further comprises:

receiving the temporal sequence of respective sensor samples at an input of a sensor data encoder model; and generating, by the sensor data encoder model, the ordered sequence of respective sensor data features based on at least the temporal sequence of respective sensor samples.

3. The method of claim 2, wherein processing the temporal sequence of respective sensor samples further comprises:

receiving temporal data at the input of the sensor data encoder model jointly with the temporal sequence of respective sensor samples, wherein the temporal data include one or more of: a sequence of time stamps, a temporal length of the time duration, and a sampling rate of the temporal sequence of respective sensor samples.

4. The method of claim 2, wherein the sensor data encoder model is applied, independently of the sensor type of each of the respective sensor device.

5. The method of claim 1, further comprising:

applying a large behavior model to process the one or more information items and generate a multimodal output associated with the sensor data, the multimodal output describing the one or more signature events associated with the sensor data in one of a plurality of predefined output modalities, wherein the large behavior model includes a large language model (LLM).

6. The method of claim 1, wherein the sensor data includes a temporal sequence of sensor data, and obtaining the sensor data further comprises:

obtaining a stream of context data measured continuously by the plurality of sensor devices, the stream of context data including the temporal sequence of respective sensor samples that are grouped for each sensor device based on a temporal window, the temporal window configured to move with a time axis; and associating each sensor data item of the temporal sequence of sensor data with a respective timestamp and a subset of respective sensor samples that are grouped based on the temporal window.

7. The method of claim 1, further comprising:

storing, in the memory, the one or more information items associated with the one or more signature events, the one or more information items including a timestamp and a location of each of the one or more signature events.

8. The method of claim 1, wherein a universal event projection model is applied to process the respective parametric representations of the plurality of sensor devices and generate the one or more information items characterizing the one or more signature events.

9. The method of claim 8, wherein each of the respective parametric representations is associated with a sensor tag indicating a type of a respective sensor device, and the respective parametric representations are inputted into the universal event projection model jointly with the sensor tag of each of the plurality of sensor devices in a predefined data format.

10. The method of claim 8, wherein the respective parametric representations of the plurality of sensor devices are inputted into the universal event projection model in a predefined order determined based on respective types of the plurality of sensor devices.

11. The method of claim 1, wherein, for each of a subset of the plurality of sensor devices, an individual projection model is applied to process the respective parametric representation and generate a subset of the one or more information items.

12. The method of claim 1, wherein for a temporal window corresponding to a subset of sensor data, detecting the one or more signature events further comprises:

using machine learning to process the subset of sensor data within the respective temporal window and detect one or more signature events.

13. A computer system, comprising:

one or more processors; and memory having instructions stored thereon, which when executed by the one or more processors cause the processors to perform:

obtaining sensor data from a plurality of sensor devices disposed in a physical environment during a time duration, each sensor device corresponding to a temporal sequence of respective sensor samples;

for each of the plurality of sensor devices, processing the temporal sequence of respective sensor samples to generate an ordered sequence of respective sensor data features defining a respective parametric representation of the temporal sequence of respective sensor samples, independently of a sensor type of the respective sensor device, wherein the respective parametric representation includes an N-th degree polynomial representation having the highest power of a sampling time equal to N, where N is a positive integer, and the ordered sequence of respective sensor data features includes N+1 data features each of which corresponds to a distinct coefficient of the N-th degree polynomial representation;

detecting one or more signature events within the time duration based on the respective parametric representations of the plurality of sensor devices; and generating one or more information items characterizing the one or more signature events detected in the sensor data.

14. The computer system of claim 13, wherein the plurality of sensor devices include one or more of: a presence sensor, a proximity sensor, a microphone, a motion sensor, a gyroscope, an accelerometer, a Radar, a Lidar scanner, a camera, a temperature sensor, a heartbeat sensor, and a respiration sensor.

15. The computer system of claim 13, further comprising instructions for:

storing the ordered sequence of respective sensor data features or the one or more information items in a database, in place of the sensor data obtained from the plurality of sensor devices.

16. The computer system of claim 15, further comprising instructions for, after obtaining the sensor data:

processing the sensor data to generate one or more sets of intermediate items successively and iteratively, until generating the one or more information items.

17. The computer system of claim 16, further comprising instructions for:

processing the sensor data to generate a first set of intermediate items at a first time;

storing the first set of intermediate items in the database;

processing the first set of intermediate items to generate one or more second sets of intermediate items successively at one or more successive second times following the first time;

successively storing the one or more second sets of intermediate items in the database, and deleting the first set of intermediate items from the database; and processing a most recent intermediate set of the one or more second sets of intermediate items to generate the one or more information items at a third time following the one or more successive second times.

18. A non-transitory computer-readable storage medium, having instructions stored thereon, which when executed by one or more processors cause the one or more processors to perform:

obtaining sensor data from a plurality of sensor devices disposed in a physical environment during a time duration, each sensor device corresponding to a temporal sequence of respective sensor samples;

for each of the plurality of sensor devices, processing the temporal sequence of respective sensor samples to generate an ordered sequence of respective sensor data features defining a respective parametric representation of the temporal sequence of respective sensor samples, independently of a sensor type of the respective sensor device, wherein the respective parametric representation includes an N-th degree polynomial representation having the highest power of a sampling time equal to N, where N is a positive integer, and the ordered sequence of respective sensor data features includes N+1 data features each of which corresponds to a distinct coefficient of the N-th degree polynomial representation;

detecting one or more signature events within the time duration based on the respective parametric representations of the plurality of sensor devices; and generating one or more information items characterizing the one or more signature events detected in the sensor data.

19. The non-transitory computer-readable storage medium of claim 18, further comprising instructions for:

applying a large behavior model to process the one or more information items and generate a multimodal output associated with the sensor data, the multimodal output describing the one or more signature events associated with the sensor data in one of a plurality of predefined output modalities, wherein the large behavior model includes a large language model (LLM).

20. The non-transitory computer-readable storage medium of claim 19, wherein the multimodal output includes one or more of: description, timestamp, numeral information, statistic summary, warning message, and recommended action associated with one or more signature events, and the plurality of predefined output modalities include one or more of: textual statements, software code, an image or video, an information dashboard having a predefined format, a user interface, and a heatmap.

* * * * *